US011228814B2

(12) United States Patent
Stern et al.

(10) Patent No.: US 11,228,814 B2
(45) Date of Patent: Jan. 18, 2022

(54) CONTENT CONSUMPTION AND NOTIFICATION IN A NETWORK

(71) Applicant: Time Warner Cable Enterprises LLC, New York, NY (US)

(72) Inventors: Peter Stern, Greenwich, CT (US); Ethan Wolf, Aurora, CO (US); Craig Vanderborgh, Golden, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 1346 days.

(21) Appl. No.: 14/058,934

(22) Filed: Oct. 21, 2013

(65) Prior Publication Data

US 2015/0113548 A1 Apr. 23, 2015

(51) Int. Cl.
*H04N 21/482* (2011.01)
*H04N 21/25* (2011.01)
*H04N 21/258* (2011.01)
*H04N 7/173* (2011.01)
*H04N 21/475* (2011.01)
*H04N 21/2385* (2011.01)
*H04N 21/431* (2011.01)
*H04N 21/239* (2011.01)
*H04N 21/658* (2011.01)
(Continued)

(52) U.S. Cl.
CPC ..... *H04N 21/4826* (2013.01); *H04N 7/17309* (2013.01); *H04N 21/231* (2013.01); *H04N 21/2385* (2013.01); *H04N 21/2393* (2013.01); *H04N 21/252* (2013.01); *H04N 21/25891* (2013.01); *H04N 21/2665* (2013.01); *H04N 21/4314* (2013.01); *H04N 21/4316* (2013.01); *H04N 21/44222* (2013.01); *H04N 21/4753* (2013.01); *H04N 21/4756* (2013.01); *H04N 21/6582* (2013.01); *H04N 21/84* (2013.01); *H04N 21/25875* (2013.01); *H04N 21/25883* (2013.01)

(58) Field of Classification Search
CPC ....................... H04N 21/4826; H04N 21/4756
See application file for complete search history.

(56) References Cited

U.S. PATENT DOCUMENTS 8,495,697 B1 * 7/2013 Goldfeder ........ H04N 21/23424
725/41
2002/0104099 A1 * 8/2002 Novak ............... H04N 7/17318
725/136
(Continued)

*Primary Examiner* — Junior O Mendoza
(74) *Attorney, Agent, or Firm* — Armis IP Law, LLC

(57) ABSTRACT

A data analyzer engine can be configured to receive feedback indicating different content currently consumed by subscribers in a cable network environment. The data analyzer engine analyzes the feedback to identify most popular consumed content amongst the different content and produces a content guide to include multiple selectable channels from which content is available for retrieval over a shared communication link in the cable network environment. The content guide can include one or more selectable viewing options to view a rendition of content being identified as more or most popular. Each of one or more playback devices or other suitable resources retrieves and initiates display of the content guide on a display screen. Accordingly, a subscriber can view different available content options as well as an identification of content that is currently the most popular consumed content amongst viewers.

40 Claims, 28 Drawing Sheets

(51) Int. Cl.
*H04N 21/2665* (2011.01)
*H04N 21/442* (2011.01)
*H04N 21/84* (2011.01)
*H04N 21/231* (2011.01)

(56) References Cited

U.S. PATENT DOCUMENTS

| | | | | |
|---|---|---|---|---|
| 2004/0123318 A1* | 6/2004 | Lee | .................... | H04N 5/44543 725/46 |
| 2005/0047752 A1* | 3/2005 | Wood | ................. | H04N 21/4826 725/58 |
| 2006/0190971 A1* | 8/2006 | Sakao | .................. | H04N 5/4403 725/80 |
| 2008/0222106 A1* | 9/2008 | Rao | .................... | G06F 17/30696 |
| 2008/0276279 A1* | 11/2008 | Gossweiler | .......... | H04N 21/435 725/46 |
| 2010/0235852 A1* | 9/2010 | Mears | .................... | H04H 60/33 725/9 |
| 2010/0287587 A1* | 11/2010 | Patten | ................. | H04N 21/478 725/39 |
| 2011/0093897 A1* | 4/2011 | Gerba | ................ | H04N 21/4314 725/42 |
| 2012/0117599 A1* | 5/2012 | Jin | .................... | H04N 21/41407 725/41 |
| 2012/0222056 A1* | 8/2012 | Donoghue | ......... | H04N 5/44543 725/5 |
| 2013/0055304 A1* | 2/2013 | Kirby | ................ | H04N 21/2365 725/31 |
| 2013/0086618 A1* | 4/2013 | Klein | ............... | H04N 21/43615 725/80 |
| 2013/0091524 A1* | 4/2013 | Hong | ................ | H04N 21/4332 725/49 |
| 2013/0283318 A1* | 10/2013 | Wannamaker | ......... | H04H 20/30 725/56 |
| 2013/0311408 A1* | 11/2013 | Bagga | ................ | G06N 99/005 706/12 |
| 2014/0359668 A1* | 12/2014 | Nagahama | ....... | H04N 21/26283 725/40 |
| 2015/0195624 A1* | 7/2015 | Gossweiler, III | .. | H04N 21/4826 725/40 |

\* cited by examiner

| CONTENT RANKING INFORMATION 244-1 | |
|---|---|
| DIGITAL ASSET | COUNT INFORMATION |
| CONTENT X | 255 |
| CONTENT A | 243 |
| CONTENT G | 159 |
| CONTENT Y | 121 |
| ... | ... |

| CONTENT RANKING INFORMATION 244-2 | |
|---|---|
| DIGITAL ASSET | COUNT INFORMATION |
| CONTENT Z | 25 |
| CONTENT K | 24 |
| CONTENT W | 15 |
| CONTENT B | 11 |
| ... | ... |

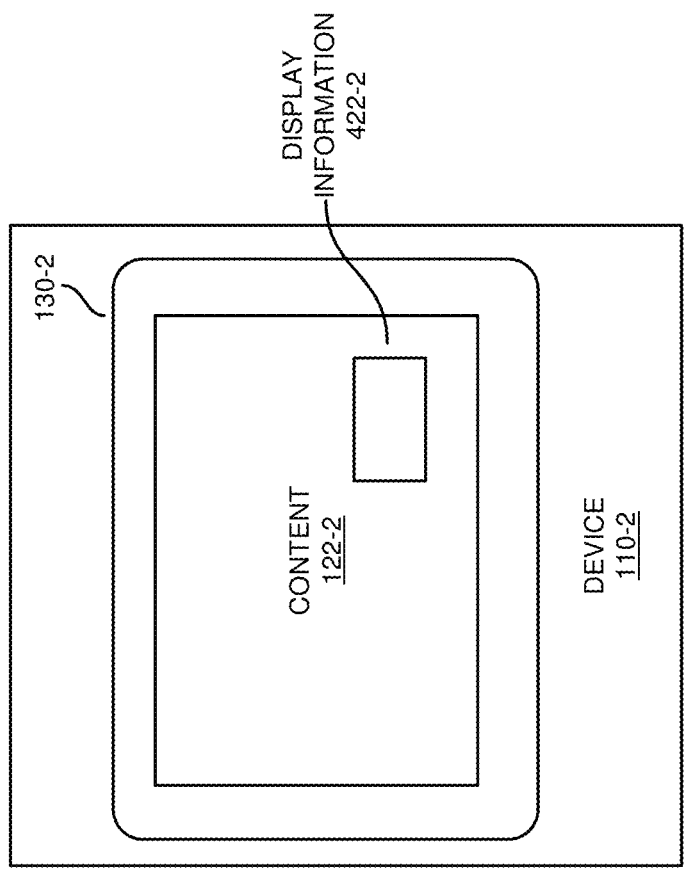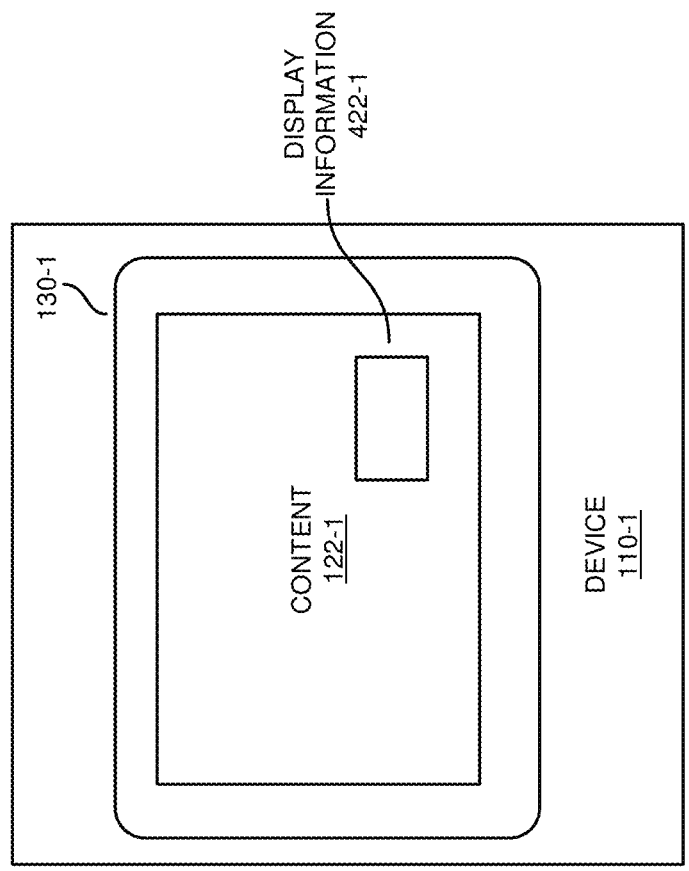
FIG. 4

CONTENT CONSUMPTION AND NOTIFICATION IN A NETWORK

BACKGROUND

In general, conventional techniques have been used to monitor a popularity of content selected for retrieval from a website. For example, conventional techniques enable a respective web user to access a web page to view information such as current financial news articles (e.g., text-based articles). The web page may include identities of multiple text-based articles available for retrieval by web users. Delivery of the article may take less than a second to be streamed over an Internet connect from a server to a corresponding client device used to view the retrieved article.

In certain instances, a server application distributing the articles keeps track of successful retrieval (or distribution) of the different articles. The server resource can be configured to rank the available articles based on popularity of how many times each article has been successfully retrieved over a time period such as the past 24 hours, last week, etc. Web users can view the ranking of articles by visiting a respective website where the articles are available for retrieval. The users then select amongst the ranking to view different popular articles.

BRIEF DESCRIPTION OF EMBODIMENTS

The multiple embodiments as discussed herein deviate with respect to conventional techniques.

First Embodiments

In one embodiment, a data analyzer engine receives content consumption feedback associated with delivery of content to multiple subscribers in a cable network environment. The data analyzer engine analyzes the content consumption feedback to identify a current content consumption trend (such as consumption of streaming content) by the multiple subscribers. A notification resource notifies one or more subscribers in the cable network environment of the identified current content consumption trends. Accordingly, a respective subscriber can be apprised of popular as indicated by the content consumption trends. In certain embodiments, if desired, subscribers can initiate playback of popular content as specified by the content consumption trends.

This first embodiment can include any of one or more limitations as discussed herein.

In one embodiment, the content consumption feedback indicates different content currently selected by the multiple subscribers for viewing on respective playback devices operated by the multiple subscribers. Analysis of the content consumption feedback can include producing a popularity ranking of the different content. The popularity ranking can indicate which of the different content is currently most popular amongst the multiple subscribers. Notification to a given subscriber in the cable network environment can include content ranking information.

In accordance with another embodiment, the data analyzer engine can be configured to receive attributes associated with a given subscriber in the cable network environment. The data analyzer engine can assign, based at least in part on the attributes, the given subscriber to a class amongst multiple viewer classes. The data analyzer engine then generates a popularity ranking of content for the class in which the given subscriber is assigned. By way of a non-limiting example, the popularity ranking of content can be based on different content currently consumed by other subscriber members in the class.

In yet another embodiment, the data analyzer engine can be configured to classify each member based on one or more of the following attributes: i) a type of playback device operated by the given subscriber to playback content, ii) a genre of content currently played back on the playback device operated by the given subscriber, iii) a history of a respective type of content previously consumed by the given subscriber, iv) a geographical location of the given subscriber in the cable network environment, v) a time of day, etc.

In accordance with still further embodiments, the data analyzer engine can be configured to analyze the content consumption feedback to identify a current content consumption trend by the multiple subscribers and notify a given subscriber in the cable network environment of the current content consumption trend by the multiple subscribers in the subscriber class assigned to the given subscriber.

In accordance with yet further embodiments, the data analyzer engine can be configured to monitor the content consumption feedback and detect a rate at which subscribers in the cable network environment switch to tuning to a channel to view playback of particular content. In response to detecting that the rate of switching to streaming content such as video is above a threshold value, the notification resource can provide a corresponding notification to the given subscriber. The corresponding notification can indicate a respective popularity of the particular content amongst the multiple subscribers.

In accordance with further embodiments, the notification resource can be configured to initiate display of the notification as an overlay message on less popular content currently played back on a display screen operated by the given subscriber. Accordingly, a respective subscriber can be apprised of popular content while viewing less popular content. The notification can specify a most popular title of content currently consumed amongst the multiple subscribers. In many instances, the most popular title of content (as detected by the data analyzer engine) is different than the content currently played back on the display screen.

In yet further embodiments, the overlay message can be or include a selectable viewing option. In response to receiving selection of the most popular title of content as specified in a respective overlay message specifying popular streaming content, a subscriber playback device can be configured to initiate tuning to an appropriate channel or display screen in the cable network environment to retrieve and consume the most popular title of content for playback on the display screen.

In accordance with further embodiments, receipt of feedback associated with delivery of content to the multiple subscribers in the cable network environment can include receiving status information associated with each of the multiple subscribers. The status information can indicate an identity of respective content currently consumed by that subscriber.

In another embodiment, the data analyzer engine can be configured to receive historical information indicating content previously consumed by the given subscriber. The data analyzer engine also can receive current information indicating content currently consumed by the given subscriber. Based at least in part on the historical content consumption information and the current content consumption information (such as switching to view different channels in the last fifteen minutes) associated with the given subscriber, the data analyzer engine can be configured to assign a respective given subscriber to an appropriate subscriber class. The assigned class can include multiple subscriber members. The feedback can indicate different content currently consumed by the multiple subscriber members. In response to detecting inclusion of the given subscriber in the class, the data analyzer engine can be configured to provide a recommendation to the given subscriber based on current streaming of content by other members in the same class. The recommendation can specify a degree of popularity associated with the different content currently consumed by the multiple members in the class.

In accordance with yet further embodiments, the notification resource associated with the data analyzer engine can be configured to provide notification to the given subscriber indicating that the given subscriber is currently playing back, on a display screen, a rendition of most popular selected content amongst the multiple subscribers. The notification can be displayed as an overlay message on the rendition of content currently displayed on the display screen. Accordingly, a subscriber can be notified if they are currently watching most popular available content.

In accordance with another embodiment, the notification resource associated with the data analyzer engine can be configured to provide notification to a given subscriber indicating that the given subscriber is not currently playing back a title of most popular selected content amongst the multiple subscribers. The notification can be displayed as an overlay message on a rendition of content currently played back on a display screen operated by the given subscriber. Accordingly, a subscriber can be notified if they are currently not watching most popular available content.

In accordance with another embodiment, the data analyzer engine can be configured to classify each of the multiple subscribers as being a member of one of multiple classes. As mentioned, subscriber members in a same class share common attributes and likely are interested in consumption of the same or similar type of content. The data analyzer engine processes the feedback in substantially real-time to identify degrees of popularity associated with different content viewed by members in each of the classes. For each respective class, the data analyzer engine produces a popularity ranking of content selected for viewing by members in the respective class. The notification resource associated with the data analyzer engine then notifies members, who are assigned to a same respective class, of the popularity ranking associated with different content viewed by other members in that class.

In accordance with another embodiment, subsequent to monitoring and determining top trending content, the data analysis engine can receive a corresponding description (e.g., image, text, audio, etc.) representative of the top trending content. The data analyzer engine can be configured to produce a notification to a given subscriber to include the corresponding description (e.g., image, text, audio, etc.) to indicate an identity of the top trending content.

In yet further embodiments, the data analyzer engine can be configured to assign a given subscriber as being a member of a first class of multiple classes. As previously discussed, subscriber members in the first class may share common attributes. Inclusion of the subscriber member in the first class can be based at least in part on a channel to which each of the members in the same class are (or were) all tuned. In response to detecting that the given subscriber changes from one channel to another in the cable network environment, the data analyzer engine can be configured to assign the given subscriber member to a second class of the multiple classes instead of the first class. Accordingly, current content consumption selection information such as channel selection can be used to profile a particular subscriber and identify an appropriate subscriber class in which to place the member.

Note that the data analyzer engine can be configured to filter the received feedback to include events that occur within a predetermined moving window of time (such as a last half hour, last 15 minutes, last few minutes, etc.) with respect to present time. The data analyzer engine then utilizes the filtered feedback to identify the current content consumption trend for notifying one or more subscribers in the cable network environment.

In yet another embodiment, while a given subscriber tunes to and plays back first content in the cable network environment, the data analyzer engine can receive notification that second content is most popular for viewing amongst the multiple subscribers. In response to receiving the notification, the data analyzer engine or other suitable resource such as subscriber device can be configured to record the second content in a repository accessible to the given subscriber while the given subscriber plays back the first content on a respective display screen.

Second Embodiments

In accordance with further embodiments, a data analyzer engine can be configured to receive feedback indicating different content currently consumed by subscribers in a cable network environment. The data analyzer engine analyzes the feedback to identify most popular consumed content amongst the different content and produces a content guide to include multiple selectable channels (such as channels of broadcasted content, video on demand content, IPTV content, etc.) from which content is available for retrieval over a shared communication link in the cable network environment. The content guide can include one or more selectable viewing options to view a rendition of content being identified as more or most popular.

In one embodiment, a particular selectable viewing option in the content guide can indicate the most (or more) popular available content for viewing. Each of one or more playback devices (or other suitable resources) can retrieve and initiate display of the content guide on a display screen. Accordingly, each subscriber can view different available content options as well as an identification of content that is currently the most popular consumed content amongst viewers.

This embodiment can include any of one or more limitations as discussed herein.

In one embodiment, the display screen or other suitable resource displays the selectable viewing option (indicating more popular content) as a particular selectable channel amongst the multiple selectable channels. If desired, the selectable viewing option (such as a "hot" channel) in the content guide of popular content can appear as an available channel in the content guide.

In accordance with further embodiments, the selectable viewing option can be a supplemental channel with respect to multiple selectable channels referenced in the content guide. Subscribers can tune to the supplemental channel to view most popular content. For example, the supplemental channel can be allocated to transmit a copy of most popular consumed content amongst multiple standard selectable channels at any given time. In response to detecting that particular content is currently the most popular consumed content, a distribution resource can be configured to transmit a copy of the most popular consumed content on the supplemental channel in the cable network environment. Thus, popular content can be made available on a supplemental channel.

Because popularity of streaming content can change over time, a content distribution resource can be configured to transmit copies of content from different channels over time. For example, based on feedback, a data analyzer engine can be configured to detect that a first channel of the multiple selectable channels broadcasts most popular viewed content (first content) during a first hour. Based on further feedback at a later time, the data analyzer engine can be configured to detect that a second channel of the multiple selectable channels broadcasts most popular content (second content) during a second hour. The distribution resource can be configured to transmit a copy of the first content on the supplemental channel during the first hour and, thereafter, switch to transmitting a copy of the second content on the supplemental channel during the second hour. Accordingly, the supplemental channel (or hot channel transmitting the most popular content) can distribute copies of content from different channels over time. Subscribers can tune to the supplemental channel to retrieve the most popular content available at that time.

In accordance with another embodiment, in the above example, the first content is available for viewing by tuning to either the first channel or the supplemental channel during the first hour. The second content is available for viewing by tuning to either the second channel or the supplemental channel during the second hour. Accordingly, the supplemental channel can provide some amount of redundancy with respect to the standard channels.

In accordance with further embodiments, in response to receiving selection of the selectable viewing option (of most popular content) from the content guide, the receiving device can be configured to tune to a corresponding supplemental channel as specified in the content guide on which the most popular content is available.

In one embodiment, the playback device can be configured to automatically tune to the channel that is detected as being most popular. Accordingly, a subscriber need not switch between channels to view content detected as being most popular.

As an alternative to use of a supplemental channel to distribute a copy of popular content, embodiments herein can include redirecting a subscriber to tune to the appropriate channel in response to detecting selection of the selectable viewing option (most popular content) in the content guide. For example, as mentioned, the content guide can indicate most popular content amongst the multiple channels. In response to receiving selection of the selectable viewing option, the corresponding device can be configured to tune to a corresponding channel in the content guide that already broadcasts or transmits the popular content.

In accordance with still further embodiments, the most popular content can include first content and second content available for retrieval in the cable network environment. In response to receiving selection of the selectable viewing option from the content guide, a corresponding resource can be configured to: initiate display of a first symbol and a second symbol on a respective display screen. The first symbol can represent the first content; the first symbol can indicate that the first content is amongst the most popular content of the multiple selectable channels currently selected for viewing in the cable network environment. The second symbol can represent the second content; the second symbol can indicate that the second content is amongst the most popular content of the multiple selectable channels currently selected for viewing in the cable network environment.

In accordance with additional embodiments, in response to receiving selection of the selectable viewing option (indicating popular content) from the content guide, a corresponding resource can be configured to initiate display of multiple window regions including a first window region and a second window region on a respective display screen. The first window region can be configured to display playback of a rendition of the first content (at a first resolution); the second window region can be configured to display playback of a rendition of the second content (at the first resolution). In one embodiment, as indicated by appropriate entries in the content guide, the first content is available for retrieval over a first channel of the multiple selectable channels in the content guide; the second content can be available for retrieval over a second channel of the multiple selectable channels in the content guide.

Assume that the subscriber selects viewing of the second content on the display screen via selection of the second window region. In response to receiving selection of the second window region or second content, the playback device tunes to the second channel to retrieve (a higher resolution version of) the second content. In such an instance, in response to receiving the selection, the display screen initiates display of a substantially full screen playback rendition of the second content on the display screen. The substantially full screen rendition of the second content is displayed in accordance with a second resolution. The second resolution can be substantially greater that the first resolution used to playback a sample of the content.

Further embodiments herein can include receiving selection of a genre amongst multiple genres. After received selection of a genre, in response to receiving additional input such as selection of the selectable viewing option from the content guide, a respective display screen displays identities of the most popular content for the selected genre.

In accordance with further embodiments, the content guide can be displayed on a supplemental display screen that is disparately located with respect to a primary display screen controlled by a respective subscriber to view content selected for viewing from the content guide. For example, the supplemental display screen can be part of a remote controller device used to select content for viewing and playback of content on the primary display screen.

In accordance with yet another embodiment, a data analyzer engine receives feedback indicating content currently consumed amongst multiple subscribers in a cable network environment. As previously discussed, the data analyzer engine can be configured to rank the currently consumed content according to popularity. A notification resource affiliated with the data analyzer engine initiates distribution of selected content to a given subscriber in the cable network environment; the given subscriber plays back a rendition of the selected content on a respective display screen.

In one embodiment, the notification resource initiates display of an overlay notification on the rendition of the currently selected content. The notification can indicate popular content in the ranking. The popular content can be different than the selected content currently played back on the display screen. Accordingly, via a respective notification, a subscriber can be apprised when they are not currently tuned to view the most popular content.

By further way of a non-limiting example, in response to detecting that the selected content currently played back on the display screen is not the most popular content as indicated by ranking information, the notification resource initiates display of a respective notification on the display screen.

Further embodiments as explained herein include storing popular content in a repository while a respective subscriber views unpopular content. For example, a media management resource (such as a media player application, set-top box, cable modem, router, etc.) can be configured to receive first content (such as video data) over a shared communication link in a network environment. The media management resource facilitates playback of the first content on a respective playback device. In one embodiment, the media management resource receives a notification from a remote resource. In one embodiment, the notification is generated at the remote resource based on detecting that popularity of second content (such as video data) available over the shared communication link is above a threshold value in a popularity ranking. In other words, content can be detected as being popular based on consumption above a threshold value with respect to other available content.

In response to receiving the notification, the media management resource initiates storage of the second content (e.g., popular content) in a repository for subsequent selective playback on the playback device. Accordingly, a user operating a playback device may initially retrieve and playback unpopular content for viewing. The user may not be aware of the second content or that the second content is more popularly viewed amongst subscribers. In anticipation of the subscriber potentially wanting to view the more popular content, the media management resource stores the second content (popular content) for possible retrieval by the user at a later time. The second content can be stored locally or remotely with respect to a respective subscriber domain in which the user resides.

During playback of the first content, in response to detecting that the second content is quite popular amongst viewers, the media management resource or other suitable resource can be configured to initiate display of a message on a display screen of the playback device. The message can indicate the availability of the second content for playback from a local or remote storage resource (such as a digital video recorder). In one embodiment, the message displayed to the subscriber indicates that the second content available to the user is popularly viewed content amongst other viewers.

In response to receiving the message, assume that the user operating the playback device generates a request to play back the second content (i.e., content stored in response to detecting that it is popular) on the playback device instead of the first content (unpopular content). In response to receiving a request from a user of the playback device to playback the second content: the media management resource discontinues playback of the first content on the playback device and initiates streaming of the second content from the repository to the playback device. Assuming that the entirety of the second content has not yet been received and stored in the repository, the media management resource can continue to store the second content (streaming content) received over the shared communication link in the repository. Accordingly, a user may have access to content deemed as being most popular content in a network environment even though the content is not currently viewed.

Further embodiments herein can include storing a multiple available streams of content available over a shared communication link in a respective repository and modifying which streams of content are stored depending on received popularity ranking information. That is, a content storage manager can be configured to cancel certain recordings of content depending on popularity of the content.

More specifically, in one embodiment, a content storage manager in a network environment receives a set of multiple streams of content. The streams of content are selectable for viewing by respective subscribers. Initially, the content management resource initiates storage of the set of multiple streams of content in a respective repository. The repository (such as a digital video recorder) can be disposed locally in a respective subscriber domain or disposed remotely with respect to a subscriber domain.

Because storage may be limited, based on popularity ranking information indicating a popularity of the multiple streams of content amongst subscribers in a network environment, the content management resource discontinues storage of less popular content such as at least one of but fewer-than-all of the streams of content in the set.

As a more specific example, the set of multiple streams of content can include at least a first stream of content and a second stream of content. Because it may not be known yet whether content will be popular or not at an outset of recording the streams of content, the content management resource obtains and stores initial portions of the first stream of content in the repository; the content management resource stores initial portions of the second stream of content in the repository; and so on.

In response to detecting that a magnitude of the viewers (subscribers) in the network environment selecting the first stream of content for playback in a scheduled time slot is less than a magnitude of the viewers (subscribers) in the network environment selecting the second stream of content for playback in the scheduled time slot, the content management resource: i) discontinues storage of the first stream of content (non-popular content), and ii) continues storage of the second stream of content (popular content) in the repository. In other words, if streaming content is detected as being unpopular, embodiments herein include discontinuing storage of video data associated with that streaming content to avoid wasting storage resources.

Thus, the content management resource can be sure to store more popular content without knowing in advance which of the content will be most popular. Subsequent to storage of at least a portion of a respective popular stream of content, the subscribers can access the repository at any point in the data stream (such as from the beginning up to a current point of recording linear content). The subscribers therefore have access to most popular content. As mentioned, storage resources are not wasted (such as to store non-popular content) because only popular content saved for retrieval by respective subscribers.

Additional embodiments herein can include identifying more popular content (such as content retrieved via video on demand) consumed in a respective network environment and then making the popular content available in a linear playback channel. For example, a media management resource can be configured to monitor consumption of multiple streams of content amongst multiple subscribers in a network environment. In a manner as previously discussed, based on the consumption, a data analyzer engine or other suitable resource can produce popularity ranking information indicating a popularity of the multiple streams of content amongst the multiple viewing subscribers.

The streams of content monitored by the media management resource can be any suitable type of content such as video on demand in which content is transmitted to subscribers in newly allocated channels (e.g., switched digital video channels, IPTV channels, etc.).

In one embodiment, the media management resource utilizes popularity ranking information to identify a subset of the multiple streams of content to make available in a playback channel, which is accessible to multiple subscribers over a respective shared communication link.

In a further example embodiment, a network manager resource allocates the playback channel to broadcast popular content as indicated by the popularity ranking information. Based on the popularity ranking information, the network manager resource schedules broadcast transmission of the subset of multiple streams of content (e.g., content deemed as being more popular amongst subscribers) over the allocated playback channel. Each of multiple subscribers can simultaneously tune to the same broadcast signal transmitted over the playback channel view respective content.

Third Embodiments

A data analyzer engine receives feedback associated with delivery of content (such as streaming content) to multiple subscriber domains in a cable network environment. The data analyzer engine analyzes the feedback to identify attributes of current content consumption by playback devices operated in the subscriber domains. Based on the analyzed feedback, the data analyzer engine produces control information specifying data flow control rates in which the playback devices are assigned to retrieve content over a shared communication link in the cable network environment. Accordingly, data flow rates in a network environment (such as a subscriber domain) can be controlled to promote fairness and optimal use of available bandwidth amongst multiple playback devices sharing a respective communication link.

This embodiment can include any of one or more limitations as discussed herein.

In one embodiment, the feedback includes status information specifying, for each of the subscriber domains, usage or attempted usage of available bandwidth in the shared communication link. The available bandwidth can be allocated for delivery of content, which is made available by a cable network service provider. Each of the multiple subscriber domains (or subscribers) subscribe to services provided by the cable network service provider.

In accordance with another embodiment, the control information specifies allocation of portions of available bandwidth to multiple playback devices in a respective subscriber domain.

In accordance with yet further embodiments, the feedback received by the data analyzer engine can indicate different content (such as adaptive bit rate encoded content) currently transmitted over the shared communication link and consumed by the playback devices in the subscriber domains. The data analyzer engine can be configured to produce the data flow control information to control retrieval of adaptive bit rate encoded content by the playback devices. Thus, otherwise greedy algorithms in corresponding playback devices can be controlled to retrieve content within specified data flow rates.

In accordance with still further embodiments, the feedback received by the data analyzer engine can indicate attributes of the playback devices. The data analyzer engine can be configured to assign the data flow control rates to the playback devices based on a type (e.g., IPAD™, IPOD™, personal computer, set-top box, etc.) and/or settings associated with each playback device. Accordingly, excess bandwidth in the network environment is not needlessly wasted playback devices that do not require or benefit from such high data rates.

In yet further embodiments, a particular playback device in a subscriber domain of the cable network environment can receive the control information. In such an instance, the playback device utilizes the control information to control a data rate of retrieving content over the shared communication link.

In accordance with another embodiment, a distribution resource (such as a control mode resource, server resource, router, etc.) disposed in a subscriber domain of the cable network environment can be configured to receive the control information. The distribution resource facilitates distribution of content received over the shared communication link to a set of one or more playback devices in the subscriber domain. In one embodiment, the distribution resource utilizes the control information to control a rate of data conveyed to each of the one or more playback devices in the set. Accordingly, any of one or more different content consumption devices in a cable network environment can be configured to utilize received control information to control data rates of retrieving content over a shared communication link in the cable network environment.

In accordance with another embodiment, the feedback can indicate different content currently selected by the multiple subscribers for viewing on respective playback devices operated by the multiple subscribers. The data analyzer engine can be configured to analyze the feedback and produce a popularity ranking of the different content. The popularity ranking can indicate which of the different content is currently most popular amongst the multiple subscribers. The notification resource associated with the data analyzer engine can be configured to notify the given subscriber in the cable network environment of the current content consumption trend by forwarding the ranking information to the appropriate subscriber.

In accordance with further embodiments, the data flow control rates can specify maximum rates at which the playback devices in the subscriber domains are able to retrieve adaptive bit rate encoded content transmitted over an IP (Internet Protocol) channel of the shared communication link. Accordingly, otherwise greedy algorithms (which attempt to retrieve content at a highest possible bit rate) can be prevented from consuming excess bandwidth at the expense of other subscriber in a network environment.

In accordance with further embodiments, the feedback can include status information associated with each of the multiple subscribers and/or users. In one embodiment, the status information can include information such as an identity of respective content currently consumed by subscribers. Based on an identity of consumed content, embodiments herein can include assigning different flow rates to playback devices in a respective subscriber domain. Thus, an assigned flow rate can depend on a type or identity of content being retrieved for consumption (i.e., storage, playback, etc.).

Yet further embodiments herein include producing control information indicating bit rates at which respective members in a subscriber domain are able to retrieve content over a shared communication link to the respective subscriber domain in which the members reside. For example, a monitor resource can monitor a type of data consumed by a respective communication device. A control information generator can be configured to control a bit rate of transmitting data to a particular device based on a respective type of content streamed to a playback device. Portions of limited available bandwidth to a subscriber domain can be assigned for use by different members in the subscriber domain depending on types of content being streamed by each of the different playback devices in the subscriber domain.

More specifically, multiple playback devices can be operated in a subscriber domain to retrieve and playback content. For example, a first playback device operated by a parent in a given subscriber domain can retrieve and playback content such as a sports event (a high-definition football game) requiring a relatively high bit rate. A second playback device operated by a child in the given subscriber domain can retrieve and playback a cartoon targeted for consumption by pre-school children. In such an instance, based on the different types of content viewed by different playback devices, a respective controller can be configured to generate respective control information to allocate a substantially higher portion of available bandwidth on a shared communication link into the subscriber domain to the first playback device than an amount of available bandwidth allocated to the second playback device. Accordingly, embodiments herein include providing fair use of bandwidth amongst members in a subscriber domain based on knowing types of consumed content and assigning appropriate bit rates to convey each type of content.

In accordance with further embodiments, certain identified members in a subscriber domain can be allowed to retrieve data at a higher respective level of quality and/or higher bit rate than other members. For example, a parent in the subscriber domain operating a first playback device can be afforded a higher bit rate for retrieving content than a respective child operating a second playback device.

Detecting an identity of user operating a respective playback device can be achieved in any suitable manner. For example, embodiments herein can require users in a respective subscriber domain to login and provide identity information.

Based on the identity information, the users in the subscriber domain can be allocated different amounts of available bandwidth. For example, a first playback device can be operated by a first user (such as a parent) in a given subscriber domain. A second user operates a second playback device in the subscriber domain. As mentioned, the second user may be a child of the parent. In such an instance, based on a level assigned to the users, a controller can be configured to generate respective control information to allocate a substantially higher portion of available bandwidth on the shared communication link to the first playback device than allocation of an amount of available bandwidth allocated to the second playback device.

Accordingly, embodiments herein include providing fair use of bandwidth amongst members in a subscriber domain based on a level of delivery service assigned each of the users in the subscriber domain.

In one embodiment, as opposed to receiving login information such as username and/or password information, identities of the users can be determined based on device information such as unique network addresses assigned to the different devices operating in the subscriber domain. Stored configuration information can indicate the different levels of bit rates to be allocated to each of the corresponding devices operated by the users.

In yet further embodiments, the data analyzer engine (or other suitable distribution resource) can be configured to distribute the generated control information to one or more playback devices in respective subscriber domains. The control information can include control settings for a particular subscriber domain of the multiple subscriber domains in the cable network environment. In one embodiment, the control settings for the particular subscriber domain can include a first flow rate setting and a second flow rate setting. The first flow rate setting can specify a retrieval rate assigned to a first playback device in the particular subscriber domain. The second flow rate setting can specify a retrieval rate assigned to a second playback device in the particular subscriber domain. In one embodiment, the flow rate settings specify a maximum rate at which the corresponding assigned playback device is able to retrieve content. Accordingly, content consumption of otherwise greedy algorithms can be controlled to provide fairness and efficient use of available bandwidth.

Another embodiment herein includes generating, from a hardware resource (such as a control mode, server resource, router, playback device, etc.) in a subscriber domain of a cable network environment, feedback associated with current content consumption in the subscriber domain. The hardware resource in the subscriber domain forwards the feedback to a management resource (such as a data analyzer engine) in the cable network environment. Thereafter, the hardware resource receives control information from the management resource. The control information can specify data flow control rates assigned to one or more playback devices in the subscriber domain.

In one embodiment, the subscriber domain includes a first playback device and a second playback device operated therein. The control information specifies a first maximum flow rate at which the first playback device is able to retrieve content over a shared communication link to the subscriber domain. The control information further specifies a second maximum flow rate at which the second playback device is able to retrieve content over the shared communication link.

In accordance with further embodiments, a media player application (such as a media player application in the first playback device) limits the first playback device to retrieval of adaptive bit rate encoded content as specified by the first maximum flow rate. A media player application (such as a media player application in the second playback device) limits the second playback device to retrieval of adaptive bit rate encoded content as specified by the second maximum flow rate.

In yet further embodiments, the hardware resource in the subscriber domain generates the feedback to specify particular streaming content currently consumed by a given playback device in the subscriber domain. The management resource generates a magnitude of a respective data flow control setting assigned to the given playback device based on attributes of the particular streaming content. For example, content with relatively few scene changes can be assigned a lower data flow control rate. A higher flow rate can be assigned to action images requiring more data to properly reconstruct a good quality representation.

In one embodiment, streaming content retrieved by the playback devices can be encoded at multiple levels of quality. Higher levels of playback quality require transmission of larger amounts of data to the playback device. In one embodiment, a given playback device can generate requests (such as HTTP requests) for retrieval of adaptive bit rate encoded content. The given playback device limits a rate of retrieval of adaptive bit rate encoded content over a shared communication link of the cable network environment in accordance with the respective data flow control setting assigned to the playback device.

In accordance with further embodiments, a given playback device in a subscriber domain generating the feedback to the management resource specifies attributes of the given playback device. The management resource generates a magnitude of a respective data flow control setting assigned to the given playback device based on the attributes of the given playback device. For example, if the playback device has a small display screen, the management resource can be configured to assign the playback device less bandwidth. If the playback device has a larger display screen with high resolution (compared to the small display screen), the management resource can be configured to assign the playback device more available bandwidth. As discussed herein, a suitable resource can be configured to utilizing the respective data flow control settings to control a rate of retrieving streaming content over a shared communication link to the given playback device.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware, cause the computer processor hardware of the system to: receive feedback associated with delivery of content to multiple subscribers in a cable network environment; analyze the feedback to identify a current content consumption trend by the multiple subscribers; and notify a given subscriber in the cable network environment of the current content consumption trend.

Yet another embodiment herein includes a computer readable storage medium and/or system having instructions stored thereon. The instructions, when executed by computer processor hardware, cause the computer processor hardware to: receive feedback associated with delivery of content to multiple subscriber domains in a cable network environment; analyze the feedback to identify attributes of current content consumption by playback devices operated in the subscriber domains; and based on the analyzed feedback, produce control information specifying data flow control rates in which the playback devices are able to retrieve content over a shared communication link in the cable network environment.

Still another embodiment herein includes a computer readable storage medium and/or system having instructions stored thereon. Such instructions, when executed by computer processor hardware, cause the computer processor hardware to: receive feedback indicating different content currently consumed by subscribers in a cable network environment; analyze the feedback to identify most popular consumed content amongst the different content; produce a content guide to include multiple selectable channels from which content is available for retrieval over a shared communication link in the cable network environment, the content guide including a selectable viewing option to view a rendition of the most popular content, the selectable viewing option indicating the most popular content; and initiate display of the content guide on a display screen.

An additional embodiment herein includes a computer readable storage medium and/or system having instructions stored thereon. Such instructions, when executed by computer processor hardware, cause the computer processor hardware to: receive feedback indicating content currently consumed by subscribers in a cable network environment; rank the currently consumed content according to popularity; initiate distribution of selected content to a given subscriber in the cable network environment, the given subscriber playing back a rendition of the selected content on a display screen; and initiate display of an overlay notification on the rendition of the selected content, the notification indicating popular content in the ranking, the popular content different than the selected content played back on the display screen.

A further embodiment herein includes a computer readable storage medium and/or system having instructions stored thereon. Such instructions, when executed by computer processor hardware, cause the computer processor hardware to: receive feedback associated with consumption of content by multiple playback devices in a cable network environment; analyze the feedback; and based on analysis of the feedback, produce control information specifying data flow control rates in which the multiple playback devices are able to retrieve content over a shared communication link in the cable network environment.

A further embodiment herein includes a computer readable storage medium and/or system having instructions stored thereon. Such instructions, when executed by computer processor hardware, cause the computer processor hardware to: classify each of multiple subscribers in a network environment as being a member of one of multiple classes, members in a same class sharing common attributes; for each respective class of the multiple classes, produce a popularity ranking of content selected for viewing by members in the respective class; and notify members, in a same class, of the popularity ranking associated with different content viewed by members in that same class.

A yet further embodiment herein includes a computer readable storage medium and/or system having instructions stored thereon. Such instructions, when executed by computer processor hardware, cause the computer processor hardware to: generate feedback associated with current content consumption in the subscriber domain; forward the feedback to a management resource in the cable network environment; and receive control information from the management resource, the control information specifying data flow control rates assigned to one or more playback devices in the subscriber domain.

Further embodiments herein include a computer readable storage medium and/or system having instructions stored thereon. Such instructions, when executed by computer processor hardware, cause the computer processor hardware to: receive first content over a shared communication link in a network environment; initiate playback of the first content on a playback device; receive a notification, the notification generated based on detecting that popularity of second content available over the shared communication link is above a threshold value in a popularity ranking; and in response to receiving the notification, initiate storage of the second content in a repository for subsequent selective playback on the playback device.

Another embodiments herein includes a computer readable storage medium and/or system having instructions stored thereon. Such instructions, when executed by computer processor hardware, cause the computer processor hardware to: receive a set of multiple streams of content; initiate storage of the set of multiple streams of content in a repository; and based on popularity ranking information indicating a popularity of the multiple streams of content amongst viewers in a network environment, discontinue storage of at least one of but fewer-than-all of the streams of content in the set.

Yet further embodiments herein include a computer readable storage medium and/or system having instructions stored thereon. Such instructions, when executed by computer processor hardware, cause the computer processor hardware to: monitor consumption of multiple streams of content amongst multiple subscribers in a network environment; based on the consumption, produce popularity ranking information indicating a popularity of the multiple streams of content amongst the multiple subscribers; utilize the popularity ranking information to identify a subset of the multiple streams of content; and transmit the subset of the multiple streams of content over a playback channel accessible to the subscribers.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for processing content consumption information. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating rankings of current content consumption according to embodiments herein.

FIG. 4 is an example diagram illustrating display of one or more notification according to embodiments herein.

Figure 1:
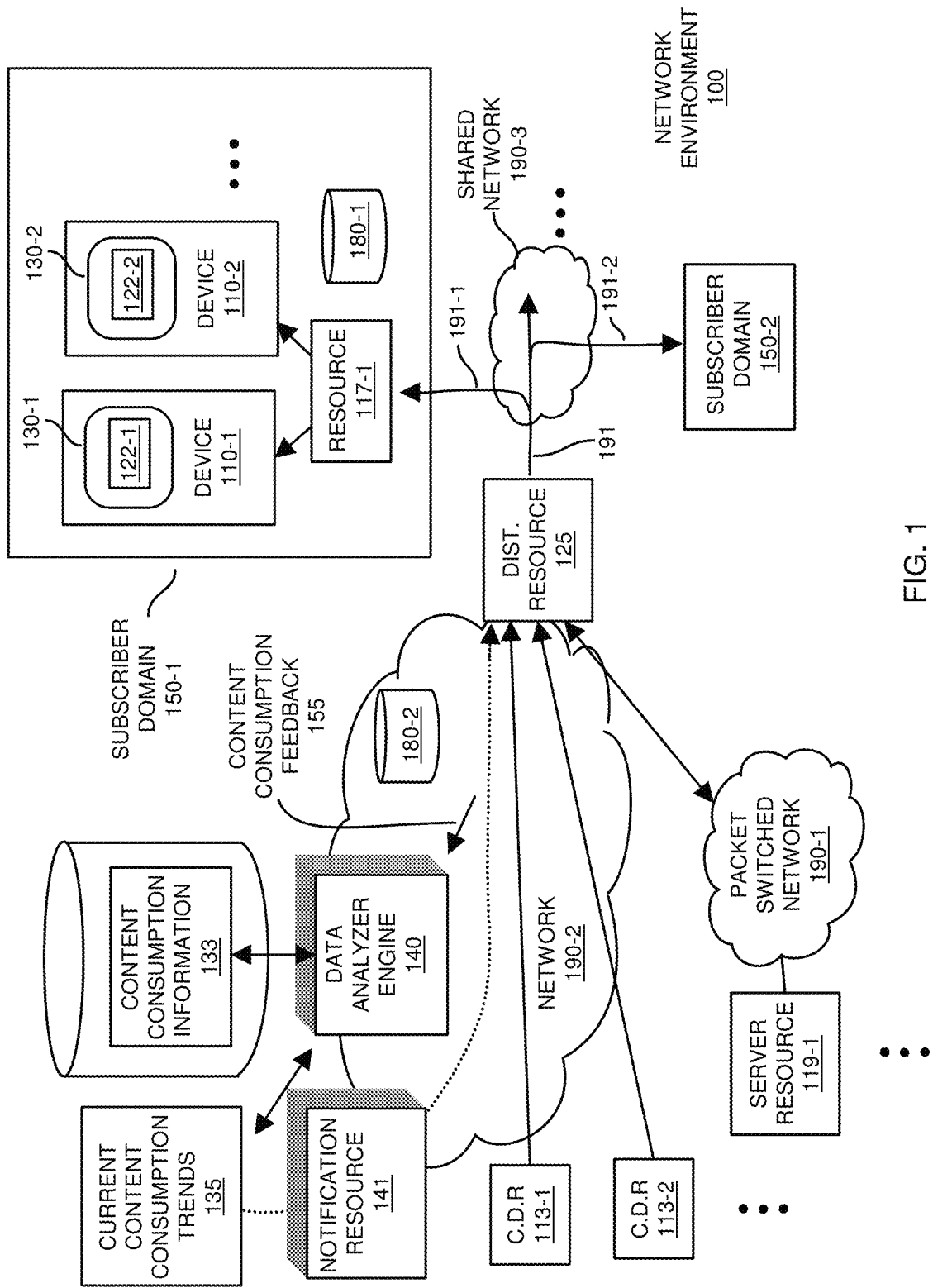
FIG. 1 is an example diagram illustrating a network environment including a data analyzer engine processing feedback according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment according to embodiments herein.

As shown, network environment 100 (such as a content delivery network) includes multiple networks 190 including a packet-switched network 190-1, a core network 190-2, shared network 190-3, etc.

Network environment 100 can include one or more repositories to store data. For example, subscriber domain 150-1 can include a repository 180-1 (such as a local digital video recorder) to store content for later playback. Network 190-2 can include a repository 180-2 (such as a remote digital video recorder) accessible to one or more subscribers in respective subscriber domains 150.

In general, via the different types of networks 190, respective subscribers and corresponding playback devices 110 in subscriber domains 150 are able to retrieve and playback different types of content such as over-the-top content, scheduled broadcast content, video on-demand content, etc.

More specifically, as shown in this example, subscriber domain 150-1 includes multiple content playback devices 110-1, 110-2, etc. Each subscriber domain can include one or more playback devices to retrieve and play back content.

In this example embodiment, playback device 110-1 includes display screen 130-1 and plays back a rendition of selected content 122-1; playback device 110-2 includes display screen 130-2 and plays back a rendition of selected content 122-2; and so on.

In addition to one or more playback devices 110 (collectively, device 110-1, device 110-2, etc.), subscriber domain 150-1 also includes resource 117-1 representing resources such as one or more set-top boxes, cable modems, WiFi™ networks, server resources, data router, etc.

In one embodiment, resource 117-1 facilitates distribution of content received over shared communication link 191 to the devices 110. For example, via communications through the resource 117-1 and over shared communication link 191 to distribution resource 125 (such as a cable modem termination system), the client devices 110 can initiate retrieval of content (such as video on demand content, over-the-top content, broadcast content, IPTV content, etc.).

Resource 117-1 can receive broadcast content (from content delivery resource 113-1, content delivery resource 113-2, etc.) transmitted over predetermined channels in shared network 190-3 to multiple subscriber domains 150. To play back broadcast content, the resource 117-1 tunes to one or more channels as indicated by users of devices 110-1.

In one embodiment, shared communication link 191 can be configured to support distribution of so-called over-the-top content. For example, a portion of bandwidth in shared communication link 191 can support data channels in accordance with DOCSIS (Data Over Cable Service Interface Specification) or any other suitable communication standard. Via the data channels, each of the subscribers can retrieve over-the-top content from respective server sources disposed in packet-switched network 190-1 such as the Internet. As its name suggests, packet-switched network 190-1 enables routing of data packets based on network address information.

By way of a non-limiting example, packet-switched network 190-1 can support client-server type communications. For example, a playback device can generate a request for content from a particular server resource such as server resource 119-1 using an appropriate network address of the server resource 119-1. In response to receiving the request for content, the server resource 119-1 transmits the requested content over packet-switched network 190-1 (as over-the-top content) to the respective client device in a subscriber domain using the network address of the client.

In one embodiment, cable network 190-2 supports services such as distribution of content via one or more cable television channels (e.g., QAM or quadrature amplitude modulated channels, IPTV channels, etc.) to subscribers in network environment 100.

As shown, shared network 190-3 supports final connectivity to subscribers or subscriber domains 150 and includes physical media such as one or more coaxial cables, optical fibers, twisted wire pairs, etc., to provide connectivity. In one embodiment, each subscriber domain connected to the shared communication link 191 in shared network 190-3 is part of a respective service group that receives a same set of signals transmitted by distribution resource 125. Any of the devices in the service group can tune to the streaming content broadcasted over shared communication link 191. Other content transmitted over the shared communication link 191 may be specifically addressed to each of the playback devices.

Network environment 100 includes data analyzer engine 140. In one embodiment, data analyzer engine 140 receives feedback 155 associated with delivery of different types of content to multiple subscriber domains 150 in a cable network environment.

The content consumption feedback 155 can be received from any suitable resource. For example, each of the devices 110 can transmit corresponding content selection information (indicating selected content consumed by a respective device) as feedback 155 to data analyzer engine 140. Additionally or alternatively, resource 117-1 can be configured to keep track of content currently consumed by the playback devices and transmit corresponding content selection information as feedback 155 to data analyzer engine 140. Additionally or alternatively, distribution resource 125 can be configured to keep track of content currently consumed by the playback devices and transmit corresponding content selection information as content consumption feedback 155 to data analyzer engine 140; and so on.

Accordingly, the data analyzer engine 140 (such as a management resource) can be configured to receive status information associated with each of the multiple subscribers from one or more different resources disposed in network environment. In one embodiment, the content consumption status information (such as feedback 155) directly or indirectly indicates an identity of respective content currently consumed by each of one or more playback devices in different subscriber domains.

In one embodiment, the data analyzer engine 140 stores the received content consumption feedback 155 as content consumption information 133.

The data analyzer engine 140 analyzes the content consumption feedback 155 (stored as content consumption information 133) to identify current content consumption trends 135 by the multiple subscribers in network environment 100. Current content consumption trend 135 can indicate which of the content is currently most popular consumed content in network environment 100. One way to detect current content consumption trending is measure how many playback devices or subscribers are tuned to play back each of different titles of available content.

Subsequent to identifying current content consumption trends 135, the data analyzer engine 140 (or other suitable resource such as notification resource 141) notifies one or more subscribers in a network environment 100 of the current content consumption trends 135.

As mentioned above, the content consumption feedback 155 can indicate different content currently selected by the multiple subscribers (in respective subscriber domains 150) for viewing on respective playback devices 110 operated by the multiple subscribers. Based on analyzing the content consumption feedback 155 in real-time or substantially real-time, the data analyzer engine 140 produces one or more popularity rankings of the different content available over shared communication link 191. The popularity rankings can indicate which of the different available content (broadcast content, over-the-top content, video on demand content, IPTV content, etc.) is currently most popular content consumed amongst the multiple subscribers in the subscriber domains 150.

Embodiments herein include notifying the subscribers of the rankings (current content consumption trend 135). For example, notification resource 141 (which may be part of a management resource) can be configured to communicate a content consumption message through distribution resource 125 and over shared communication link 191 to resource 117-1. Resource 117-1 forwards the content consumption notification to an appropriate device in subscriber domain 150-1. In one embodiment, the content consumption notification indicates the most popular currently viewed content amongst viewers in network environment 100. A corresponding device 110 initiates display of the notification on a respective display screen (such as display screen 130-1, display screen 130-2, and so on) to inform the subscriber of which content is currently most popular.

Accordingly, embodiments herein include: analyzing the content consumption feedback 155 to identify current content consumption trend 135 by the multiple subscribers; and notifying each of one or more corresponding subscribers in the cable network environment of the current content consumption trends 135.

Figure 2:
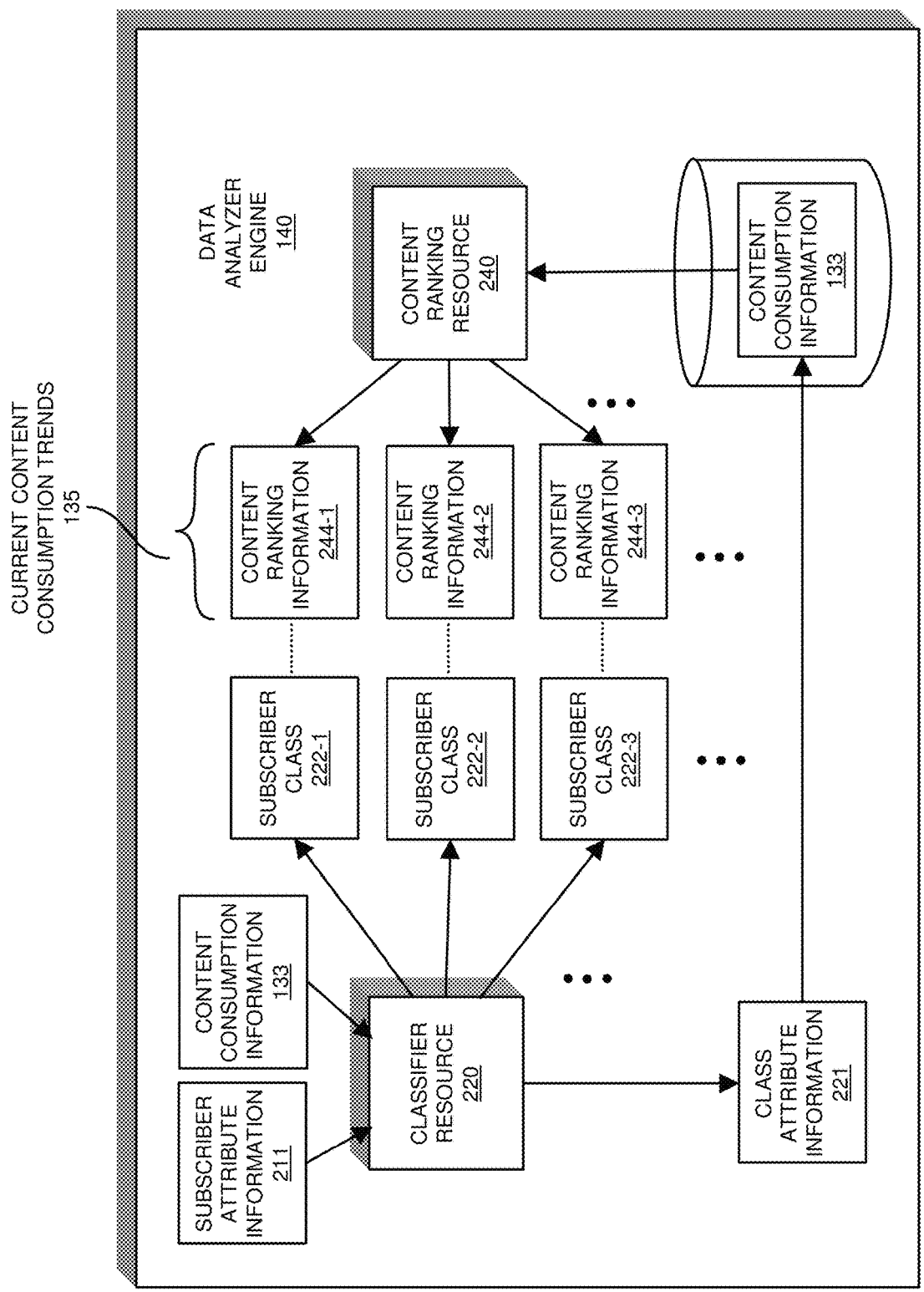
FIG. 2 is an example diagram illustrating classification of subscribers and generate of corresponding content ranking information according to embodiments herein

FIG. 2 is an example diagram illustrating more particular details of data analyzer engine and classification of subscribers according to embodiments herein.

As shown, data analyzer engine 140 can include classifier resource 220 and content ranking resource 240. As its name suggests, the classifier resource 220 classifies the subscribers into different subscriber classes 222 (e.g., subscriber class 222-1, subscriber class 222-2, subscriber class 222-3, etc.) based on subscriber attribute information 211 and potentially content consumption patterns associated with each of the subscribers.

In one embodiment, subscriber attribute information 211 indicates historical and/or current attributes of each respective subscriber. For example, the subscriber attribute information 211 can indicate historical information such as which channels, types of content, etc., are typically viewed by each of the subscribers over time. Content consumption information 133 can include information indicating current attribute information associated with subscribers such as recent tuning of content, channel selection, etc.

In one non-limiting example embodiment, the classifier resource 220 classifies each of the given subscribers based on one or more of the following attributes: i) a type of playback device operated by the given subscriber to playback content, ii) a genre of content currently or previously played back on the playback device operated by the given subscriber, iii) a history of a respective type of content previously consumed by the given subscriber, iv) a geographical location of the given subscriber in the cable network environment, v) a time of day, vi) current channel selection information, vii) past channel selection information, viii) subscriber viewing habits, ix) subscriber settings information, etc.

Thus, in accordance with one embodiment, for a given subscriber amongst multiple subscribers, the classifier resource 220 can receive attributes associated with the given subscriber. Based on the attributes (as specified by the subscriber attribute information 211), the classifier resource 220 of data analyzer engine 140 assigns the given subscriber to an appropriate subscriber class amongst multiple subscriber classes (viewer classes). As mentioned above, classification of subscribers can be based on any number of parameters. A given subscriber can be placed in one or more subscriber classes 222 depending on the scope of the respective subscriber's viewing habits.

The content ranking resource 240 generates content ranking information 244 for each subscriber class. For example, the content ranking resource 240 can be configured to receive class attribute information 221. The class attribute information 221 keeps track of the attributes associated with each of the respective subscriber classes 222. By way of a non-limiting example, the content ranking resource 240 can be configured to use the class attribute information 221 to analyze the content consumption information 133 and identify the most currently consumed content (or most likely to be consumed content) likely to be of interest by members the respective subscriber class.

In one embodiment, the class attribute information 221 includes information specifying identities of subscribers in each of the respective subscriber classes 222. Additionally or alternatively, the class attribute information can specify genres of content liked by members in the class, channels typically selected for viewing by the members in the class, etc.

In one embodiment, the content ranking resource 240 utilizes the identities of subscribers in a class as indicated by the class attribute information 221 to identify which available content is currently viewed by each of the members in the respective class. Such information can be used at least in part to determine which content is most relevant to the class. The content ranking resource 240 can be configured to generate content rankings of content based at least in part the content consumption by subscriber members in the same class.

Additionally or alternatively, the content ranking resource 240 can be configured to generate the content ranking information 244 to indicate a popularity ranking of different content that is most likely of interest to members assigned to the respective subscriber class.

In this example embodiment, assume that the content ranking resource 240 utilizes attributes associated with subscriber class 222-1 to identify currently consumed content (available in network environment 100) that would most likely be of interest to members in subscriber class 222-1. Based on such information (currently consumed content), the content ranking resource 240 generates content ranking information 244-1.

The content ranking resource 240 utilizes attributes associated with subscriber class 222-2 to identify currently consumed content (available in network environment 100) that would most likely be of interest to members in subscriber class 222-2. Based on such information (currently consumed content), the content ranking resource 240 generates content ranking information 244-2.

In this manner, the content ranking resource 240 generates respective content ranking information 244 for each of the subscriber classes 222.

In one embodiment, the content ranking resource 240 filters the content consumption feedback 155 (as stored in content consumption information 133) to include relevant content selection or content consumption events that occur within a predetermined moving window of time (such as the last 5 minutes, last 15 minutes, last half hour, etc.) with respect to present time. The content ranking resource 240 utilizes the filtered feedback of relevant content selection events to identify the current content consumption trends 135 amongst the subscriber classes.

Use of the moving window ensures that the content ranking information generated for each class is kept current for corresponding streaming content that is currently available for consumption. In other words, content may be transmitted within a particular time slot. In such an instance, the first several minutes of minutes of content consumption information can be most useful in generating the content ranking information because subscribers typically decide which of the available content to watch in the first few minutes of the content being broadcasted.

FIG. 3 is an example diagram illustrating rankings of current content consumption according to embodiments herein.

As previously discussed, the classifier resource 220 can be configured to classify each of the multiple subscribers as being a member of one or more of multiple subscriber classes 222. Each of the subscriber classes 222 can include as few as one member. Recall that subscriber members in the same subscriber class 222 share common attributes.

In one non-limiting example embodiment, the content ranking resource 240 processes the content consumption feedback 155 (stored as content consumption information 133) in substantially or approximately real-time (or within a recent window of time) to identify degrees of popularity associated with different content viewed by or likely to be of interest by members in each of the subscriber classes.

For example, for each respective subscriber class 222, the content ranking resource 240 produces a popularity ranking of content selected or recommended for possible viewing by members in the respective subscriber class. In this example, the content ranking resource 240 identifies content (such as one or more assets) that are most likely of interest to a given subscriber in subscriber class 222-1. For subscriber class 222-1, as shown, assume that the identified content includes content X, content A, content G, content Y, etc. The content consumption information 133 can include count information indicating a magnitude of subscribers in the class currently watch the different identified content (e.g., content X, content A, content G, content Y, . . . ).

Any suitable type of metric can be used to indicate popularity. In one embodiment, the count information represents a percentage of members in the corresponding subscriber class that view each of the different available content.

Assume in this example embodiment that based on analyzing content consumption information 133, and the respective count information, the content ranking resource 240 identifies that content X is most popular currently viewed content amongst the identified content for subscriber class 222-1; the content ranking resource 240 identifies that content A is next most popular amongst the identified content for the class; the content ranking resource 240 identifies that content G is next most popular amongst the identified content for the class; the content ranking resource 240 identifies that content Y is next most popular amongst the identified content; and so on.

For subscriber class 222-2, assume that the identified content includes content Z, content K, content W, content B, etc. The content consumption information 133 can include count information indicating a magnitude of subscribers in the class currently watch the different identified content (e.g., content Z, content K, content W, content B, . . . ). If desired, the count information can be presented as a percentage consuming respective content.

Assume in this example embodiment that based on analyzing content consumption information 133, and the respective count information, the content ranking resource 240 identifies that content Z is most popular currently viewed content amongst the identified content for subscriber class 222-2; the content ranking resource 240 identifies that content K is next most popular amongst the identified content for subscriber class 222-2; the content ranking resource 240 identifies that content W is next most popular amongst the identified content for subscriber class 222-2; the content ranking resource 240 identifies that content B is next most popular amongst the identified content for subscriber class 222-2; and so on.

In one embodiment, the notification resource 141 notifies subscriber members, in a same subscriber class, of the popularity ranking associated with different content viewed by other members in that class. For example, a subscriber may request to view a ranking or recommendation of relevant most popularly viewed content. In response to detecting inclusion of the given subscriber in a corresponding subscriber class, the notification resource 141 provides a recommendation to the given subscriber based on the appropriate content ranking information for the class in which the subscriber has been assigned.

If desired, each subscriber can control which class they are placed by providing personal information indicating desired shows they wish to watch, times of day they watch television, gender information associated with the subscriber, age information associated with the subscriber, etc.

In one embodiment, in accordance with the appropriate content ranking information, the recommendation can be configured to specify a degree of popularity associated with the different content currently consumed by the multiple members in the class. For example, the notification resource 141 can be configured to transmit content ranking information 244-1 to one or more respective subscribers in subscriber class 222-1 for viewing on a respective display screen; the notification resource 141 can be configured to transmit content ranking information 244-2 to one or more respective subscriber in subscriber class 222-2 for viewing on a respective display screen; and so on.

Referring again to FIG. 2, note that a given subscriber can be dynamically assigned to a different class depending on current or most recent content selection habits. For example, the classifier resource 220 can be configured to initially assign the given subscriber as being a member of a first subscriber class 222-1 based on corresponding subscriber attribute information 211 associated with the subscriber. As previously discussed, members in the first subscriber class 222-1 share common attributes. Inclusion in the first class can be based at least in part on a currently selected channel to which the members in the same class are or were at least briefly tuned during the moving window.

As an example, all members in the first subscriber class 222-1 may have tuned at least briefly to view a football sports event. In response to detecting a change in subscriber attribute information 211 such as that a given subscriber initially assigned to subscriber class 222-1 changes from one channel (e.g., a channel broadcasting football) to another channel (e.g., a channel broadcasting financial news), the classifier resource 220 can be configured to reassign the given subscriber to a different subscriber class such as subscriber class 222-2 of the multiple classes 222 instead of the first subscriber class 222-1. Thus, the recently detected change in viewing habits such as switching channels to content of a different genre may indicate that the subscriber is no longer interested in viewing sports events. In such an instance, the classifier resource 220 can be configured to assign the respective subscriber to a different subscriber class such as subscriber class 222-2.

As previously discussed, the content ranking resource 240 generates respective content ranking information for each of the subscriber classes 222. In this instance, because the subscriber has been reassigned to the different subscriber class 222-2, when forwarding content ranking information, the notification resource 141 forwards content ranking information 244-2 (instead of content ranking information 244-1) to notify the given subscriber of most popular content in which the subscriber may be interested.

In this way, changes in the subscriber attribute information 211 (such as most recent tuning habits, long term viewing habits, etc.) can be used as an aid to determine which type of content is most likely to be appealing to a subscriber at any given time. The distribution of appropriate content ranking information 244 (depending on which of the different subscriber classes the subscriber is currently assigned) helps to ensure that the given subscriber receives most relevant content ranking information. Otherwise, the usefulness of the content ranking information may be diminished. In other words, if the content ranking information includes a ranking of all possible content available in the cable network environment, the content ranking information may not be useful because the subscriber may not be interested in certain types of content even though such content is quite popular amongst other viewers. Use of subscriber attribute information 211 to classify subscribers and generation of respective content ranking information provides a more targeted ranking of content that is more likely to be of interest to different classes of viewers.

In addition to or as an alternative to analyzing current content consumption by a grouping of subscribers, embodiments herein can include analyzing the content consumption information 133 to detect a rate at which subscribers in the cable network environment switch to tuning to a target channel to view playback of particular content. For example, in response to detecting that the rate of channel switching amongst a specific group of subscribers or across all subscribers in general is above a threshold value, the content ranking information can be updated to indicate corresponding popular content. As discussed herein, the notification resource 141 can be configured to provide a notification indicating a respective popularity level of the particular content amongst the multiple subscribers.

FIG. 4 is an example diagram illustrating display of content popularity information according to embodiments herein.

As previously discussed, a respective user in subscriber domain 150-1 operates playback device 110-1. In this example embodiment, assume that the playback device 110-1 plays back a rendition of content 122-1 on corresponding display screen 130-1.

Assume further in this example that the user of playback device 110-1 (client device) in subscriber domain 150 is assigned to subscriber class 222-1 based on an analysis as previously discussed. Assume that the user of playback device 110-2 (client device) in subscriber domain 150-1 is assigned to subscriber class 222-2 based on an analysis as previously discussed. Based on habits of consuming content, the users of respective playback devices are assigned to different subscriber classes.

Assume that the playback device 110-1 currently does not play back the most popular content as specified by content ranking information 244-1. In one embodiment, the playback device 110-1 receives content ranking information 244-1 from a resource such as notification resource 141. The playback device 110-1 initiates display of display information 422-1 (such as a symbol, text, etc.) as an overlay onto the rendition of content 122-1 (assumed to be content Y in this example).

In one embodiment, the display information 422-1 is a notification specifying a most popular title of content (e.g., content X) currently consumed amongst the multiple subscribers in the corresponding subscriber class 222-1. In this example, the content 122-1 may be content Y, which is not the most popular title of content in content ranking information 244-1. Accordingly, a user of playback device 110-1 can be notified if they do not playback the most popular content for their assigned class.

Assume that the playback device 110-2 currently does not play back the most popular content as specified by content ranking information 244-2. In one embodiment, the playback device 110-2 receives content ranking information 244-2 from a resource such as notification resource 141. The playback device 110-2 initiates display of display information 422-2 (such as a symbol, text, etc.) as an overlay onto the rendition of content 122-2. In one embodiment, the display information 422-2 is a notification specifying a most popular title of content (e.g., content Z) currently consumed amongst the multiple subscribers in the corresponding subscriber class 222-2. In this example, the content 122-2 may be content K, which is not the most popular title of content in content ranking information 244-1. Accordingly, a user of playback device 110-2 can be notified if they do not playback the most popular content for their assigned class.

In one embodiment, the display information 422-1 is a selectable viewing option enabling a respective user of playback device 110-1 to view the most popular content X. For example, in response to receiving selection of the most popular title of content as specified in the display information 422-1 (such as an overlay message), the playback device 110-1 tunes to an appropriate channel or communicates with a appropriate server resource in the cable network environment to retrieve the most popular title of content (content X) for playback on the display screen 130-1. Accordingly, a user can be notified that they are not currently watching the most popular content in their respective assigned subscriber class. Based on input from the user, the most popular content can be selected for viewing in lieu of currently played back content.

In certain instances, the content 122-1 currently played back on display screen 130-1 may already be the most popular content viewed for a particular subscriber class. One embodiment herein includes providing notification (via display information 422-1 on display screen 130-1) to the given subscriber (user) indicating that the given subscriber is currently playing back a rendition of most popular selected content X. As previously discussed, the notification that the user watches the most popular content can be displayed as an overlay message on a small portion of the display screen rendering content X. In one embodiment, a portion of the display screen 130-1 such as a field of 50×50 pixels is used to render display information 422-1 while a balance of the pixels (such as 1000×2000 pixels) is used to lay back original content 122-1. Accordingly, the display information 422 can be rendered in a fairly small portion of the display screen 130-1 so as not to hinder viewing of currently played back content.

In accordance with another embodiment, a playback device 110-1 may be tuned to play back first content (such as content Y) as previously discussed. The playback device 110-1 or other suitable resource can receive notification that content X is more popular for viewing amongst the multiple subscribers in subscriber class 222-1. In response to receiving the notification, embodiments herein include recording the content X in a repository accessible to the given subscriber while the given subscriber plays back the originally selected content Y on respective display screen 130-1. The content X can be recorded in response to receiving a command while playing back the content Y. Alternatively, the user of playback device 110-1 can configure automatic recording of the most popular content so that the user need note that provide input each time they receive a notification of popular content.

In accordance with yet further embodiments, the top trending content may be breaking news available on a different channel. In one embodiment, the data analyzer engine 140 can receive a corresponding textual description of the top trending content. The textual description can be received from a curator (hired by the cable network service provider or a subscriber) that views the content and creates a description. As an example, the textual description may specify details of the breaking news available on the alternative channel. In one embodiment, the notification resource 141 produces a notification to a given subscriber to include an identity of the top trending content as well as the corresponding textual description. Display of the textual description enables the viewer to determine whether they would like to tune to the alternative channel to view the detected top trending content.

Figure 5:
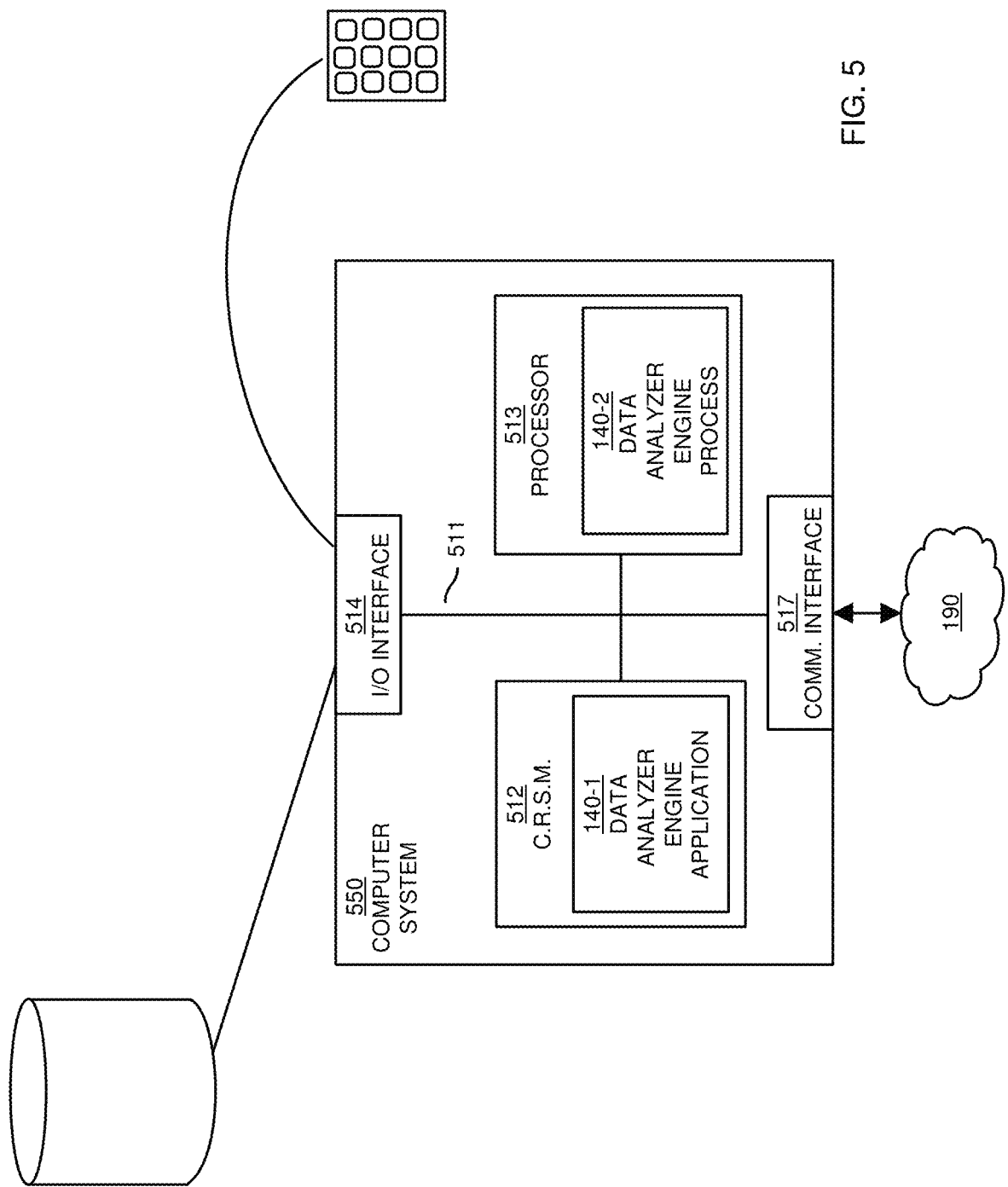
FIG. 5 is a diagram illustrating an example computer architecture in which to execute any of the functionality according to embodiments herein.

FIG. 5 is a diagram illustrating an example computer architecture in which to execute any of the functionality according to embodiments herein. Any of the different processing techniques can be implemented via execution of software code on a computer system.

For example, as shown, computer system 550 (e.g., a computer device) of the present example can include an interconnect 511 that couples computer readable storage media 512 such as a non-transitory type of media (i.e., any type of hardware storage medium) in which digital information can be stored and retrieved. The computer system 550 can further include processor resource 513 (i.e., computer processor hardware such as one or more processor co-located or disparately located processor devices), I/O interface 514, communications interface 517, etc.

As its name suggests, I/O interface 514 provides connectivity to external resources such as storage devices, control devices, one or more display screens, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 enables the computer system 550 and processor resource 513 to communicate over a resource such as networks 190. I/O interface 514 enables processor resource 513 to perform access data, control a respective display screen, receive input, etc.

As shown, computer readable storage media 512 can be encoded with data analyzer engine application 140-1 (e.g., software, firmware, etc.) executed by processor resource 513. Data analyzer engine application 140-1 can be configured to include instructions to implement any of the operations as discussed herein.

During operation of one embodiment, processor resource 513 accesses computer readable storage media 512 via the use of interconnect 511 in order to launch, run, execute, interpret or otherwise perform the instructions in data analyzer engine application 140-1 stored on computer readable storage medium 512.

Execution of the data analyzer engine application 140-1 produces processing functionality such as data analyzer engine process 140-2 in processor resource 513. In other words, the data analyzer engine process 140-2 associated with processor resource 513 represents one or more aspects of executing data analyzer engine application 140-1 within or upon the processor resource 513 in the computer system 550.

Those skilled in the art will understand that the computer system 550 can include other processes and/or software and hardware components, such as an operating system that controls allocation and use of hardware resources to execute data analyzer engine application 140-1.

In accordance with different embodiments, note that computer system may be any of various types of devices, including, but not limited to, a set-top box, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 550 may reside at any location or multiple locations in network environment 100. The computer system 550 can be included in any suitable resource in network environment 100 to implement functionality as discussed herein.

Note that each of the other functions as discussed herein can be executed in a respective computer system based on execution of corresponding instructions.

Figure 6:
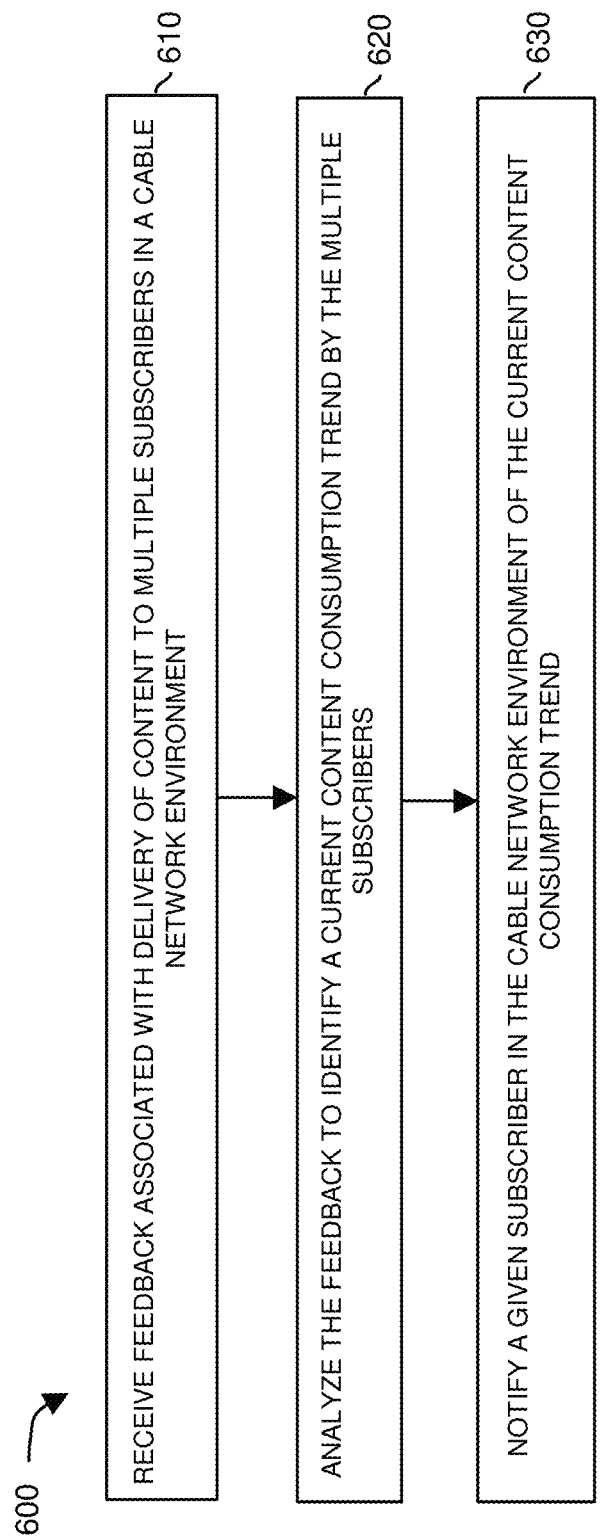
FIG. 6 is an example diagram illustrating a method of providing notification of current content consumption trends according to embodiments herein.

FIG. 6 is a flowchart 600 illustrating an example method according to embodiments. Note that there will be some overlap with respect to concepts as discussed above. The processing in the flowcharts below can be executed in any suitable order.

In processing block 610, the data analyzer engine 140 receives content consumption feedback 155 associated with delivery of content to multiple subscribers in a cable network environment.

In processing block 620, the data analyzer engine 140 analyzes the content consumption feedback 155 to identify a current content consumption trend by the multiple subscribers in network environment 100.

In processing block 630, the data analyzer engine 140 notifies a given subscriber in the cable network environment of the current content consumption trend.

Referring again to FIG. 1, note that in accordance with yet further embodiments, the data analyzer engine 140 1 can be configured to receive additional types of feedback associated with consumption of content by multiple playback devices in a cable network environment. For example, a subscriber can receive content at a corresponding location in the network environment 100 under certain network operating conditions. Among other information, the feedback from the subscriber can include subscriber-generated information such as a quality rating associated with the delivery. Thus, feedback can include user-generated information such as whether a corresponding viewing experience was excellent, good, fair, or bad. Feedback to the data analyzer engine 140 from one or more resources can include additional information such as status information from other resources facilitating delivery of the content.

More specifically, for each of multiple content deliveries, based on received feedback, the data analyzer engine 140 can be configured to receive and keep track of information such as a corresponding quality rating (such as thumbs up, thumbs down, graded rating from one to ten, number of stars, etc.) from a respective subscriber for a given content delivery, a location (e.g., in home, out-of-home, mobile, etc.) of the subscriber in the network environment 100 where the subscriber receives the given content delivery, a type of playback device (such as large screen playback device, iPod™, iPad™, personal computer, phone device, etc.) used by the subscriber to receive and play back content for the given content delivery, bandwidth availability during the given content delivery, etc.

A given subscriber may wish to retrieve content from the network environment 100. In one embodiment, the data analyzer engine 140 is able to predict a level of delivery quality that may be provided by the network to the given subscriber for the future content delivery. For example, one embodiment herein includes receiving a request for content from the given subscriber. Based on analysis of the previously received feedback (e.g., ratings and corresponding status information), the data analyzer engine 140 predicts a quality of service of streaming content that may be provided to the given subscriber in the subscriber domain for the requested content delivery.

In one embodiment, to predict a delivery quality for the future delivery of content, the data analyzer engine 140 compares attributes (such as location of subscriber, type of device, etc.) associated with the current content request from the given subscriber and maps the attributes to attributes of previous content deliveries. Based on subscriber-generated ratings for the previous content deliveries that are similar to the future content delivery, the data analyzer engine 140 predicts stream quality associated with delivering the requested content to the given subscriber.

In one embodiment, the predicted stream quality information can be transmitted to the given subscriber for viewing on a respective display screen or playing back as audio. Accordingly, a respective user can be notified of a likely quality of content delivery they may expect to receive while at a particular location in accordance with present network operating conditions. As mentioned, the prediction can be based at least in part on subscribers' past experience ratings and corresponding circumstances in which the subscribers received the previous deliveries.

Accordingly, based on feedback from subscribers to data analyzer engine 140, it is possible to learn what constitutes sufficient video stream quality from each of multiple subscribers' perspectives and predict a quality of future delivery for one or more subscribers.

In accordance with yet further embodiments, the data analyzer engine 140 can be used to measure content delivery performance metrics and corresponding viewer behavioral patterns of subscribers across network environment 100. Measurements enable the data analyzer engine 140 to correlate delivery (quality) metrics experienced by subscribers to their corresponding behavior. For example, the data analyzer engine 140 can receive feedback from one or more resources in network environment 110 indicating corresponding operational conditions associated with delivery of content. For such deliveries, the data analyzer engine 140 can be configured to receive further behavioral based feedback indicating how the subscriber reacted to the different deliveries. For example, a subscriber may discontinue streaming content if a respective data flow rate falls below a threshold value; a subscriber may watch an entirety of streaming content if there are no pauses during delivery of respective content; and so on.

Embodiments herein can include moving beyond correlations to determine causality such as how stream quality and other important performance metrics affect subscriber behavior. In accordance with one embodiment, the data analyzer engine 140 or other suitable resource in network environment 100 implements software (such as Quasi Experimental Design) that provides a statistical foundation for inferring causality from observed data. Accordingly, the data analyzer engine 140 can be configured to determine what causes different subscriber behavior.

Figure 7:
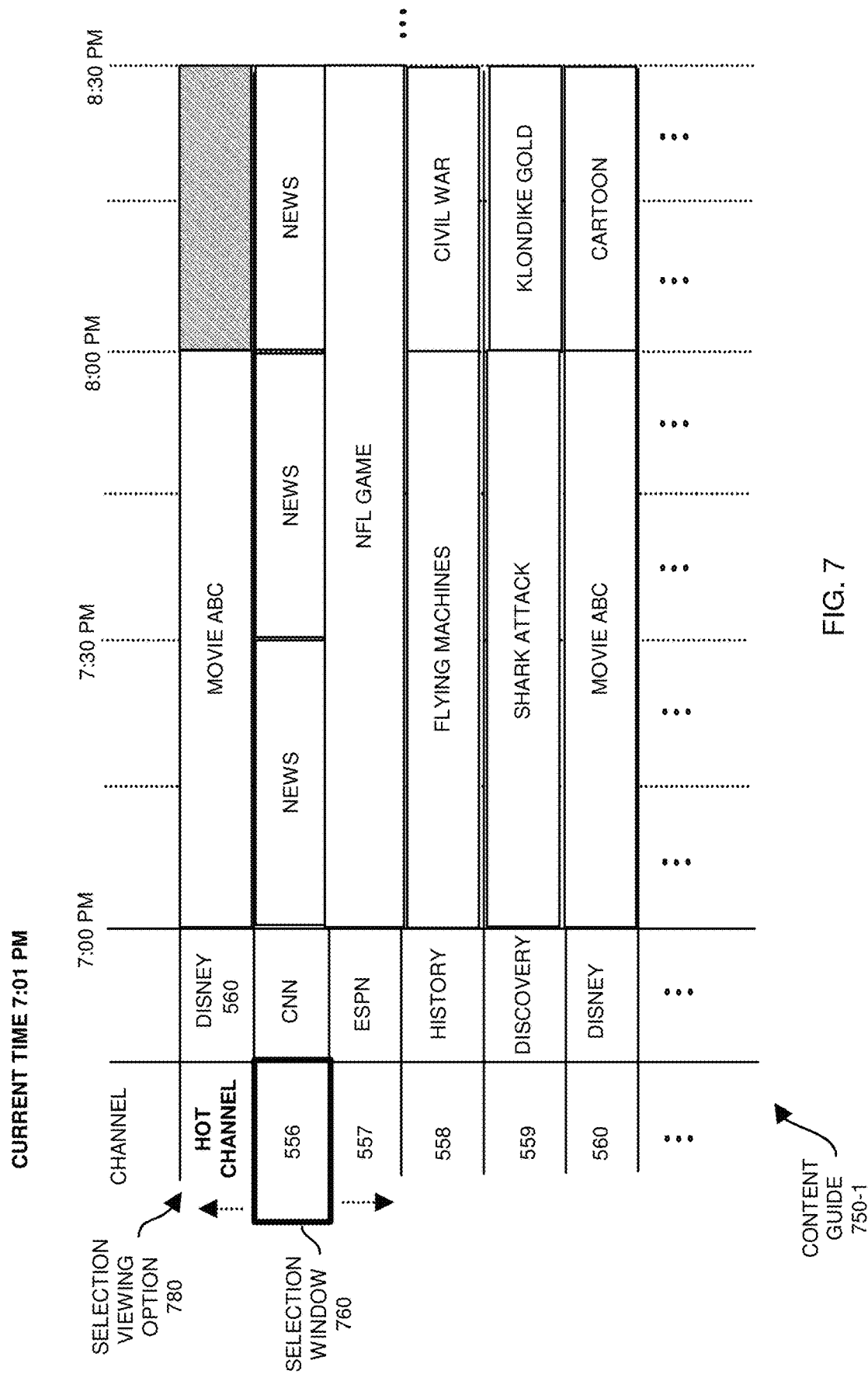
FIG. 7 is an example diagram illustrating notification of popular consumed content in a content guide according to embodiments herein.

FIG. 7 is an example diagram illustrating notification of popular consumed content in a content guide according to embodiments herein. Note that the following discussion occasionally refers back to matter also discussed in FIGS. 1 and 4 as well as potentially other figures.

In one embodiment, notification resource 141 (or other suitable resource) in network environment 100 generates a respective content guide 750-1 to notify corresponding subscribers of available content. Subscribers initiate display of the content guide 750-1 on a respective display screen of their playback device to view availability of content on different channels. Each channel in the content guide 750-1 can represent a selectable viewing option for viewing corresponding content. For example, in one embodiment, selection of a respective channel causes a media management resource to tune to the respective channel to playback corresponding content to a user.

As shown in this example embodiment, content guide 750-1 includes a partial listing of available channels such as channel 556, channel 557, channel 558, etc. Channels can include any type of content such as broadcast content, video on demand content, etc.

In this example embodiment, a respective row of information for each channel indicates names of the available content for viewing in respective time slots. Thus, at least certain viewing options in the displayed content guide 750-1 correspond to available television channels or content that can be selected by the subscriber for viewing.

Selection of content in content guide 750-1 can be achieved in any suitable manner. By way of a non-limiting example, content guide 750-1 as displayed on a respective display screen can include selection window 760. The selection window 760 can be navigated up, down, left, right, etc., via respective arrow buttons on a control device operated by the subscriber (user). After moving the selection window 760 to a respective entry in content guide 750-1, the subscriber can press a corresponding OK button or selection button on the controller device to confirm a selection.

Embodiments herein include any suitable manner of selecting respective content for playback on a respective playback device.

Assume in this example that the current time is 7:01 pm. Assume further that some amount of data has already been collected indicating which of the content on the available in channels of content guide 750-1 is more popular than others. Via selection window 760 overlaid on a respective content guide 750-1, the respective subscriber can select content to be consumed. For example, selection of channel 556 causes the respective playback device to tune to and playback content (NEWS) available on channel 556; selection of channel 557 causes the respective playback device to tune to and playback content (NFL GAME) available on channel 557; selection of channel 558 causes the respective playback device to tune to and playback content (SHARK ATTACK) available on channel 559; and so on.

If desired, a window region (such as row of information associated with the hot channel) of content guide 750-1 can be dedicated to constantly display corresponding HOT CHANNEL information while the group of window regions below (such as the window region including channel 556, channel 557, channel 558, channel 559, channel 560) changes depending on a segment of channels viewed by the subscriber. In other words, while displaying HOT CHANNEL in a display region that is static (such as the row specified by HOT CHANNEL), the content guide 750-1 can be configured to display any range of channels in the display region currently displaying channels 556 through 560. More specifically, while row of HOT CHANNEL information is constantly displayed in content guide 750-1, the user can move selection window 760 to view different ranges of channels such as channels 557 through 561, channels 557 through 572, and so on. Accordingly, the subscriber can always view display of the HOT CHANNEL while other channels are rotated.

Note that use of time slots in content guide 750-1 is shown by way of non-limiting example only and that content guide 750-1 can be configured to present any type of content such as on broadcasted content, video on demand content, IPTV content, web data, etc. Corresponding content may be available at any time of day.

In one embodiment, in a manner as previously discussed, the data analyzer engine 140 receives content consumption feedback 155 indicating different content currently consumed by subscribers in a cable network environment. The data analyzer engine 140 analyzes the content consumption feedback 155 to identify popularity levels of different consumed content amongst the subscribers.

Note that a digital asset (i.e., particular content) may be available on multiple channels. For example, a digital asset can be broadcasted on a hi-definition channel; the digital asset can be broadcasted on a standard definition channel; the digital asset can be available on a video on demand channel; the digital asset may be available as IPTV on corresponding data channels; etc. The consumption of a particular digital asset can be monitored on any of one or more of the channels (IPTV channels, video on demand channels, linear channels, etc.) to determine its respective popularity. Thus, popularity may be based on consumption of a digital asset across multiple possible channels.

Further, in a manner as previously discussed, the data analyzer engine 140 produces current content consumption trends 135 indicating which content (digital asset) is more popular content than others. In this example, based on content consumption feedback 155, assume that the data analyzer engine 140 identifies that more subscribers tune to and view the content MOVIE ABC on the Disney channel than any other channel. Any suitable method can be used to identify most popularly viewed channel. For example, in one embodiment, each of the subscriber domains in network environment 100 can transmit information indicating currently consumed content to data analyzer engine 140. The data analyzer engine 140 can be configured to analyze the tuning feedback from one or more subscribers to identify which of one or more channels is most popular amongst the subscribers.

In such an instance, in this example embodiment, the notification resource 141 produces content guide 750-1 to include multiple selectable channels (such as channel 556, channel 557, channel 558, etc.) from which content is available for retrieval over a shared communication link 191 in the network environment 100 (such as a cable network environment). As shown and as previously discussed, the content guide 750-1 can be configured to include a selectable viewing option 780 (labeled as HOT CHANNEL) to view a rendition of the most popular identified content (such as MOVIE ABC). In this example embodiment, the selectable viewing option 780 indicates which available content is currently the most popular content consumed amongst subscribers in network environment 100 at or around 7:01 pm. Unlike linear content scheduled in respective time slots of content guide 750-1, the row of information presented in HOT CHANNEL may not be known until appropriate feedback is received indicating what content is most popular.

Assume in this example that a user operating playback device 110-1 initiates display of content guide 750-1 on respective display screen 130-1. In such an instance, as previously discussed, the user is able to view content guide 750-1 to identify and select available content in different timeslots for viewing. Assume further in this example embodiment that the user of playback device 110-1 moves selection window 760 to the HOT CHANNEL (such as over selectable viewing option 780) as shown in FIG. 8.

Figure 8:
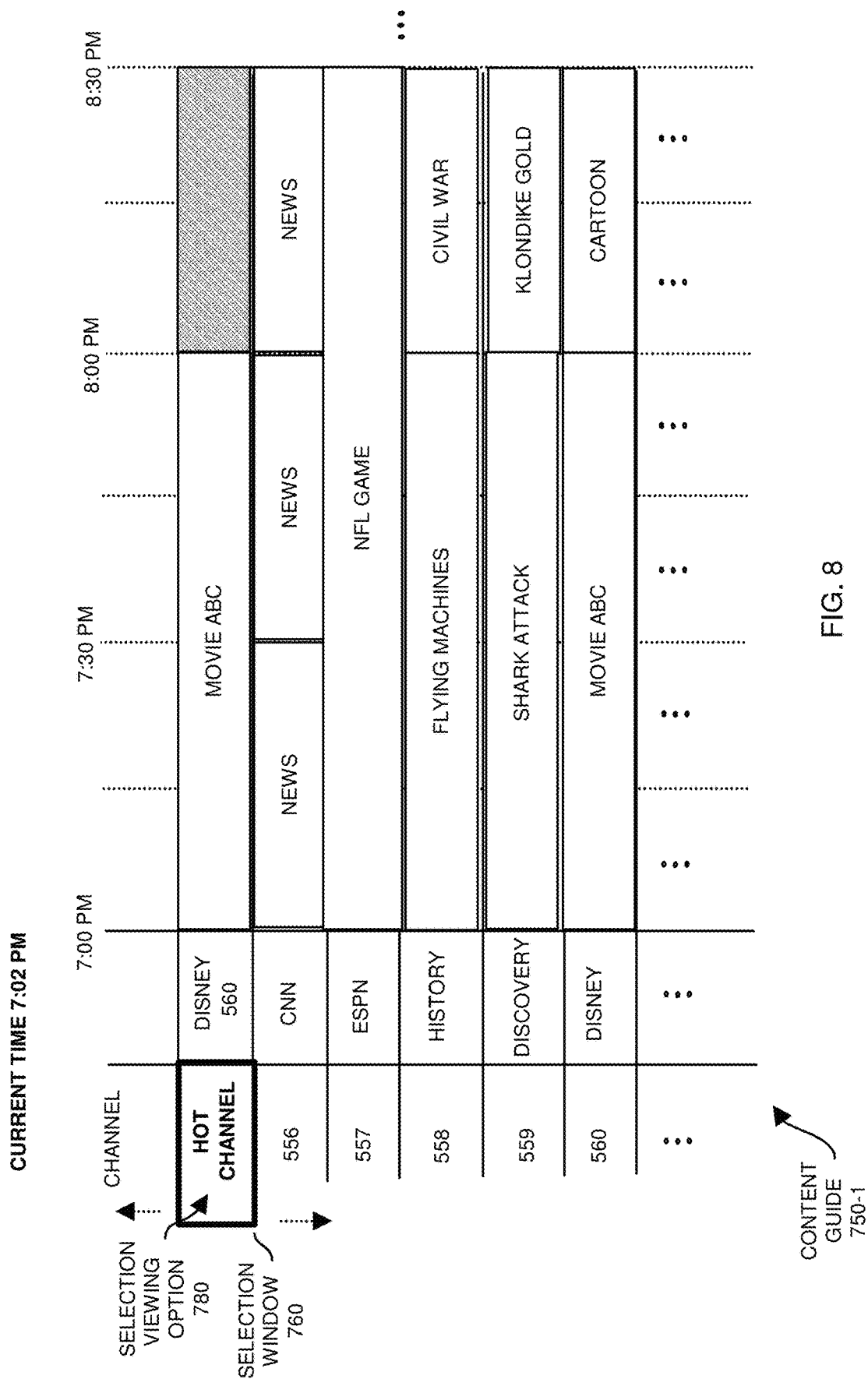
FIG. 8 is an example diagram illustrating notification of popular consumed content in a content guide according to embodiments herein.

FIG. 8 is an example diagram illustrating notification of popular consumed content in a content guide according to embodiments herein.

In this example embodiment, assume that based on received feedback, MOVIE ABC on the DISNEY channel is deemed to be the most popular content. In response to selection of the selectable viewing option 780 (HOT CHANNEL), the corresponding playback device 110-1 tunes to an appropriate channel to playback the corresponding MOVIE ABC on the DISNEY channel.

Note that in one embodiment, the shared communication link 191 can be configured to include a supplemental channel (such as an extra channel in a respective channel lineup) on which to transmit a copy of the most popular content. For example, the supplemental channel allocated in shared communication link 191 can be allocated to transmit most popular consumed content amongst the multiple selectable channels. During operation, in response to detecting that particular content (such as MOVIE ABC on DISNEY) is currently the most popular consumed content, the distribution resource 125 can be configured to transmit a copy of the most popular consumed content on the supplemental channel. Thus, streaming content such as MOVIE ABC can be available to a respective subscriber on channel 560 as well as on the HOT channel.

In such an instance, selection of the selectable viewing option 780 can cause the playback device 110-1 to tune to the supplemental channel (HOT CHANNEL) to playback a copy of the most popular content. Accordingly, during the timeslot between 7 and 8 pm, the user of playback device 110-1 can select the HOT CHANNEL to tune to and playback the MOVIE ABC. Alternatively, the user of playback device 110-1 can select original channel 560 (assigned to content provider DISNEY) to tune to and play back the MOVIE ABC.

In accordance with another embodiment, due to bandwidth constraints, it may be undesirable to allocate a supplemental channel (extra channel) to transmit of copy of most popular content in respective timeslots. In such an instance, if the supplemental channel is not available or present in a channel lineup, the playback device 110-1 can be redirected to tune channel 560 to view the popular content as specified by the selectable viewing option 780 (HOT CHANNEL). Accordingly, in response to receiving user selection of the selectable viewing option 780 from the content guide 750-1, the playback device 110-1 can be configured to tune to channel 560 as specified in the content guide 750-1 on which the more popular content is available.

In one non-limiting example embodiment, display screen 130-1 (such as a large screen television) can be a primary display screen on which a respective subscriber displays selected content. The content guide 750 can be displayed on the display screen 130-1 or a disparately located display screen with respect to the primary display screen. The disparately located display screen can be any suitable type of resource such as a (handheld) remote controller device that is used by the user viewing display screen 130-1 to make content selections and control display of content on the display screen 130-1.

Figure 9:
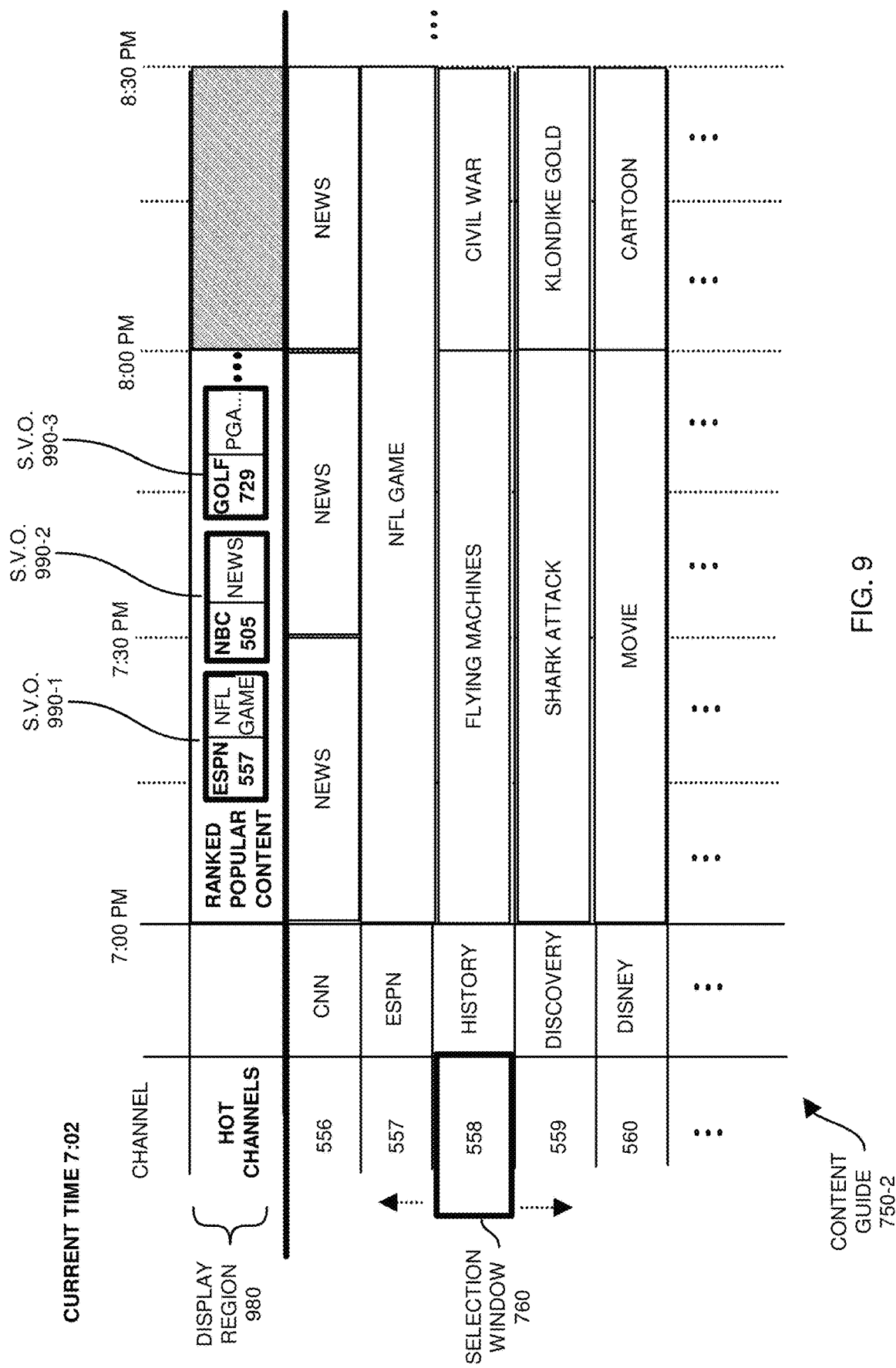
FIG. 9 is an example diagram illustrating ranking of popular consumed content in a content guide according to embodiments herein.

FIG. 9 is an example diagram illustrating notification of popular consumed content in a content guide according to embodiments herein.

In accordance with one embodiment, the content guide 750-2 as displayed on a respective display screen 130-1 can be configured to specify multiple instances of detected popular consumed content and/or corresponding channels.

For example, as shown, the display region 980 can include selectable viewing options 990 (e.g., selectable viewing option 990-1, selectable viewing option 990-2, selectable viewing option 990-3, . . . ) corresponding to popular viewed channels ESPN channel 557, NBC channel 505, GOLF channel 729, and so on. Accordingly, via display region 980 (HOT CHANNELS), the rendition of content guide 750-2 indicates that channel 557, channel 505, channel 729, etc., are currently most popular channels.

In this non-limiting example embodiment, selectable viewing option 990-1 enables selection of first content such as the NFL GAME on channel 557; selectable viewing option 990-2 enables selection of second content such as NEWS on channel 505; selectable viewing option 990-3 enables selection of third content such as PGA TOUR on channel 729; and so on. In response to receiving selection of a respective selectable viewing option, the corresponding playback device tunes to the corresponding channel.

In one embodiment, as shown, each of the selectable viewing options includes one or more symbols specifying channel and/or content information. For example, the first symbol or image "ESPN 557" in selectable viewing option 990-1 indicates a respective channel (i.e., 557) on which corresponding content NFL GAME is available; the symbol or image "NBC 505" in selectable viewing option 990-2 indicates a respective channel (i.e., 505) on which corresponding content NEWS is available; and so on.

The titles of content such as "NFL GAME", "NEWS", etc., in the respective selectable viewing options 990 are also symbols or images indicating a title or identifier of corresponding content available on a respective popular channel.

Note that the selectable viewing options 990 (collectively, selectable viewing option 990-1, selectable viewing option 990-2, selectable viewing option 990-3, . . . ) in display region 980 can be ranked depending on popularity. For example, selectable viewing option 990-1 specifies a most popular channel and corresponding most popular viewed content; selectable viewing option 990-2 specifies a next most popular channel and corresponding next most popular viewed content; and so on.

As previously discussed, the data analyzer engine 140 can be configured to classify a respective subscriber depending on a type of content they like to consume. In one embodiment, the playback device initiates display of the content guide 750-2 to display a ranking of content associated with a corresponding subscriber class to which the subscriber is assigned.

In accordance with further embodiments, a user operating playback device 110-1 can select amongst the HOT CHANNELS selectable viewing options 990 to initiate playback of corresponding content. For example, assume that the user selects selectable viewing option 990-2. This channel and/or content selection can be achieved in any suitable manner such as moving selection window 760 over a respective selectable viewing option and pressing a respective OK button on a remote control device.

In this example embodiment, in response to receiving selection of the selectable viewing option 990-2 from display region 980 in content guide 750-2, the playback device 110-1 tunes to channel 505 for playback of respective content NEWS on display screen 130-1.

As discussed herein, content can be available via IPTV or other suitable protocol. In certain instances, tuning to a respective channel can include communicating with an appropriate server resource in network environment 100 to retrieve the content over a packet-switched network. The server resource transmits the content as data packets. The data packets include a network address of the requesting playback device to facilitate delivery.

The content (such as digital assets) deemed most popular and included in the hot channels (identities of which are displayed in display region 980) may be available for retrieval from multiple different channels. For example, a particular digital asset as referenced by the hot channels may be retrievable from a first hi-definition channel; the particular digital asset as referenced by the hot channel may be retrievable from a second standard-definition channel; the digital asset as referenced by the hot channel may be retrievable from a video on demand channel; etc. These different viewing options can be made available to a viewer such that the viewer is able to select amongst different possible sources to playback content deemed to be most popular.

As a further example, after determining most popular one or more digital assets, the respective content guide 750-2 can be configured to include multiple viewing options for selection by a respective user to view the most popular digital asset, but from different channels. As an example, an NFL game such as the Superbowl game may be deemed the most popular digital asset. The NFL game may be available on channel 557 (such as ESPN), channel 505 (such as NBC), video on demand channel 765, and so on.

In accordance with the above example, embodiments herein can include producing display region 980 to include a selectable viewing option for each channel on which the NFL game is available for viewing such that the viewer can select amongst multiple different channels to view the popular content. In other words, a user can select a first selectable viewing option 990-1 in the hot channel display region of the content guide to view the NFL game (digital asset) on channel 557; a user can select a second selectable viewing option 990-2 in the hot channel display region of the content guide to view the NEWS (digital asset) on channel 505; a user can select a third selectable viewing option in the hot channel display region of the content guide to view Golf game on channel 729; and so on. Accordingly, embodiments herein can include displaying multiple channels on which the most popular digital asset is available for retrieval.

Figure 10:
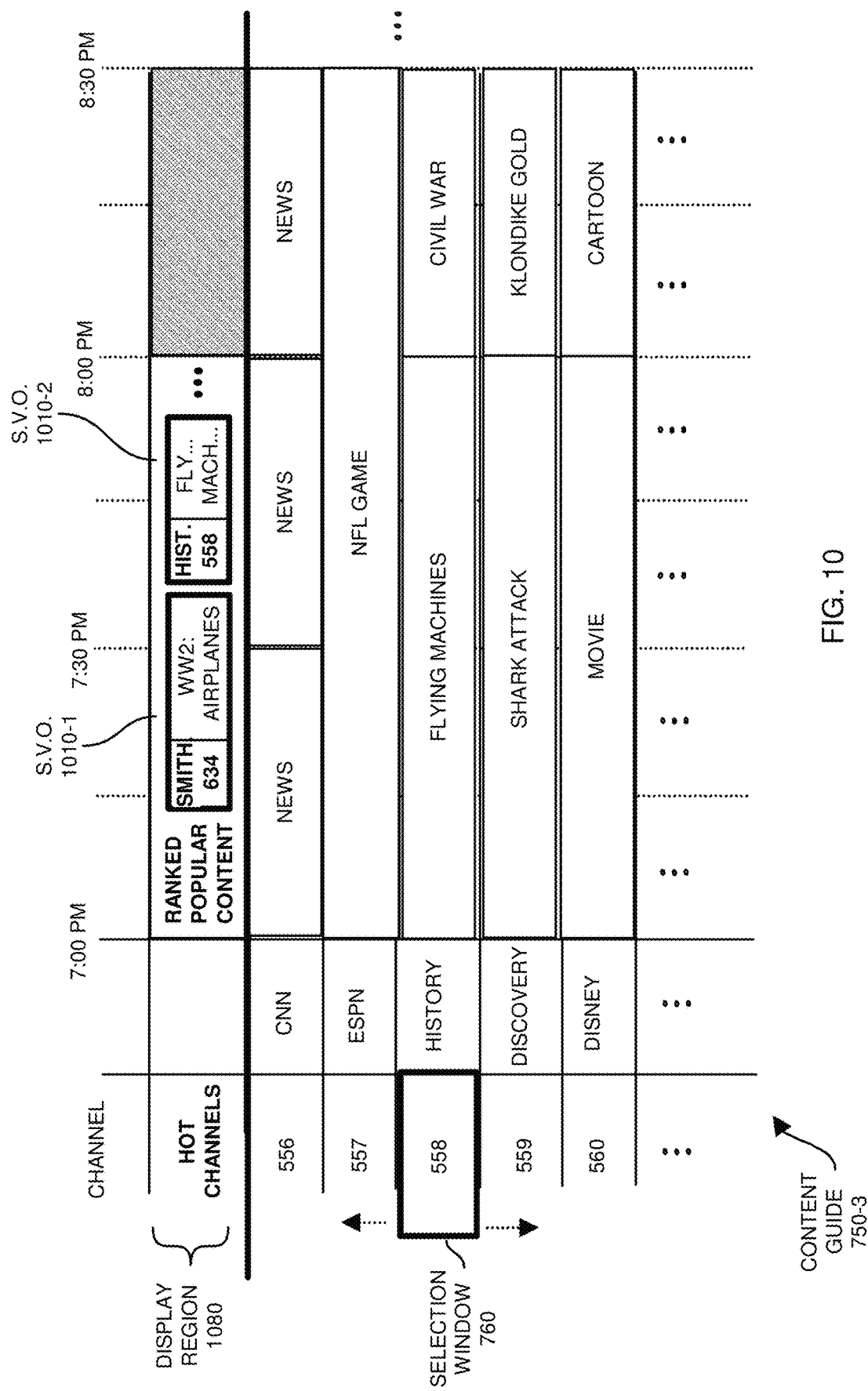
FIG. 10 is an example diagram illustrating ranking of consumed content for a respective genre according to embodiments herein.

FIG. 10 is an example diagram illustrating ranking of popular consumed content by genre according to embodiments herein.

As previously discussed, a respective user viewing content guide 750-3 on display screen 130-1 can provide appropriate input to move selection window 760 around content guide 750-3 (such as up and down column of channels) to specify a channel of interest. In one embodiment, the ranking of popular content in display region 1080 varies depending on a respective channel in the selection window 760.

For example, the user can navigate the selection window 760 over channel 558 as shown. In response to detecting selection window 760 over channel 558, the playback device 110-1 identifies a genre in which the selected content (FLYING MACHINES) resides. As previously discussed, the data analyzer engine 140 can be configured to process received feedback 155 and identify alternative channels broadcasting content in the same genre as the selected channel. Based on ranking information produced by data analyzer engine 140 for the genre, the playback device 110-1 identifies a ranking of other available content in the particular genre. In this example embodiment, WW2: Airplanes and Flying Machines, etc., fall within the same genre.

In this example, the content guide 750-3 displays multiple selectable viewing options in display region 1080 including selectable viewing option 1010-1, selectable viewing option 1010-2, and so on. Selectable viewing option 1010-2 represents the content FLYING MACHINES on channel 558, and indicates that such content is a second most popular content in a respective ranking of currently viewed content amongst subscribers in that genre. In this example embodiment, selectable viewing option 1010-1 represents the content WW2 AIRPLANES on channel 634, and indicates that such content is a first most popular content in a respective ranking of currently viewed content amongst subscribers in that genre. Thus, a subscriber can view identities of content from competing service providers. For example, a first content service provider (Smithsonian channel) supplies content on channel 634; a second content service provider (History channel) supplies content on channel 558; and so on.

In this example, the user viewing content guide 760 may initially be interested in viewing content FLYING MACHINES. Hence, the user may navigate selection window 760 over channel 558 in content guide 750-3. However, after review of the ranking of content in the genre in which FLYING MACHINES resides (as specified by HOT CHANNEL information in display region 1080), the user may decide to view channel 634 (via selection of selectable viewing option 1010-1) instead of channel 558 because the content WW2 AIRPLANES appears to be more interesting or more popular to the viewer. As discussed herein, note again that popularity can be based on current consumption, previous consumption of a particular program, or a combination of both.

Figure 11:
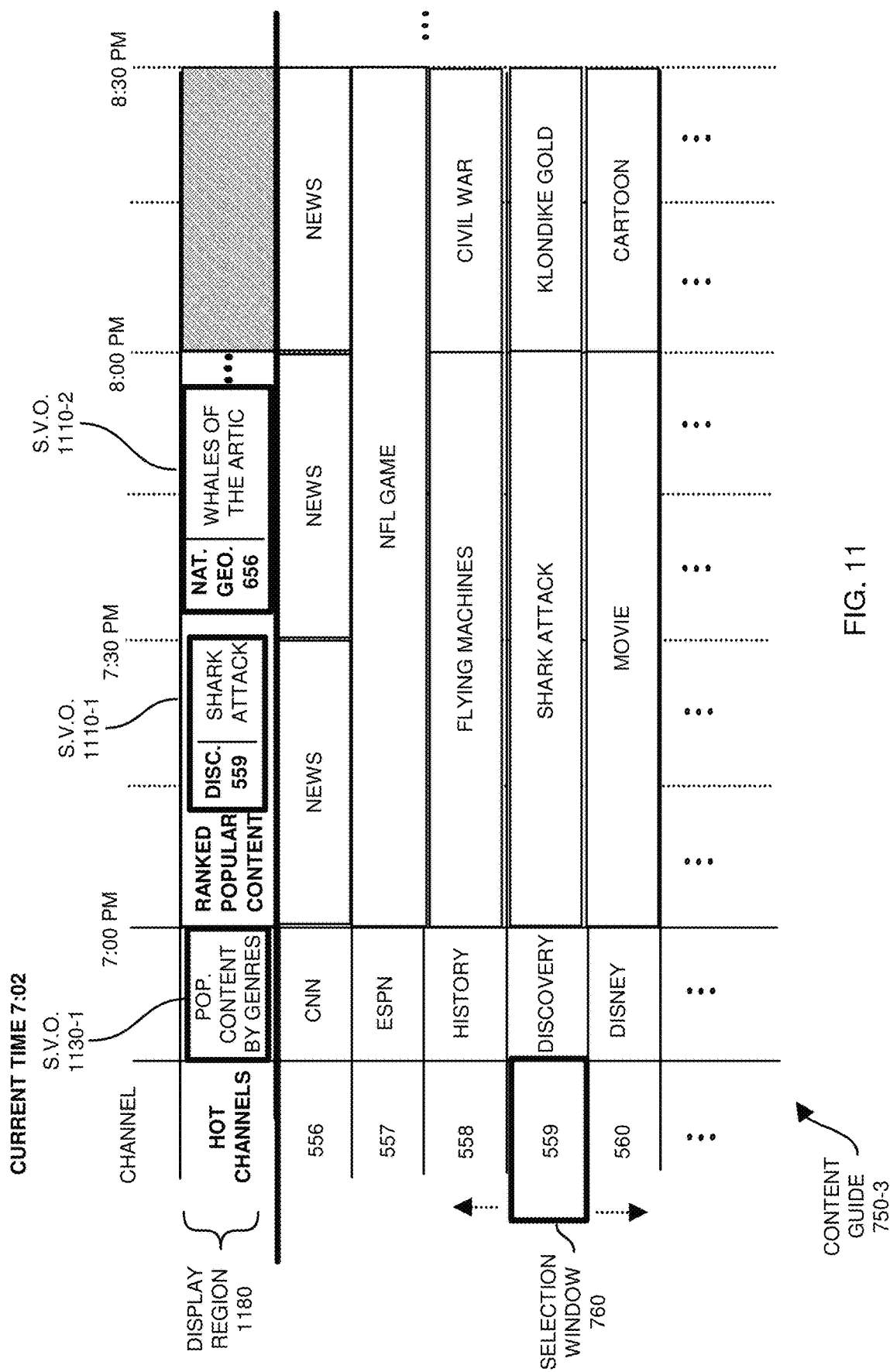
FIG. 11 is an example diagram illustrating ranking of consumed content for a respective genre according to embodiments herein.

Assume in this example that the user operating playback device 110-1 and viewing content guide 750-3 moves the selection window 760 over channel 559 as shown in FIG. 11. Content available on channel 559 is a different genre than the genre of content on channel 558.

FIG. 11 is an example diagram illustrating a ranking of popular consumed content by genre according to embodiments herein.

As shown in FIG. 11, the user can navigate the selection window 760 over channel 559. In response to detecting selection window 760 over channel 559, the playback device 110-1 identifies a genre in which the selected channel/content (SHARK ATTACK) resides. Based on ranking information produced by data analyzer engine 140 for the genre, the playback device 110-1 identifies a ranking of other available content in the respective genre associated with the current channel SHARK ATTACK.

In this example, the content guide 750-3 displays multiple selectable viewing options in display region 1180 including selectable viewing option 1110-1, selectable viewing option 1110-2, and so on.

Selectable viewing option 1110-1 (most popular content in the genre) represents the content SHARK ATTACK on channel 559, and indicates that such content is first most popular content in a respective ranking of currently viewed content amongst subscribers in that genre. Selectable viewing option 1110-2 represents the content WHALES OF THE ARCTIC on channel 656, and indicates that such content is second most popular content in a respective ranking of currently viewed content amongst subscribers in that genre. Display region 1180 can include any number of selectable viewing options 1110.

Based on browsing the content guide 750-3, the user viewing content guide 760 may initially be interested in viewing content SHARK ATTACK. However, after review of the ranking of content in the genre in which SHARK ATTACK resides (as specified by selectable viewing options 1110 in display region 1180), the user may decide to tune to and view channel 656 (via selection of selectable viewing option 1110-2) instead of channel 559 because the content WHALES OF THE ARCTIC appears to be more interesting to the viewer, even though it happens to be less popular.

Thus, a ranking of content may also be useful for displaying to a respective user so that the user is informed of channels on which similar types of content is available even though a user does not always select most popular ranked content.

In one embodiment, the content guide 750-3 includes selectable viewing option 1130-1. Selection of the selectable viewing option 1130-1 enables the respective user to view popular content by different genres as shown in FIG. 12.

Figure 12:
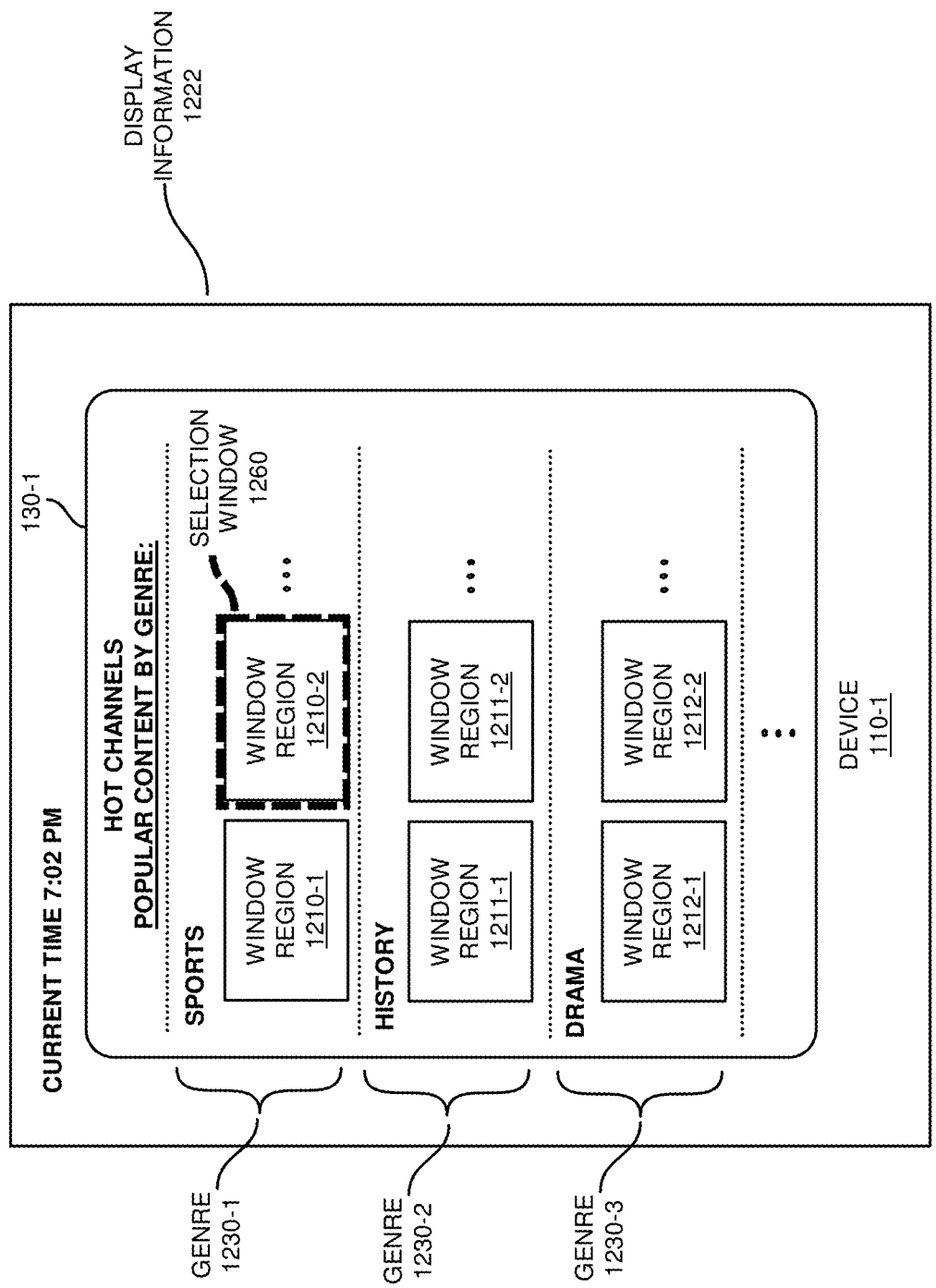
FIG. 12 is an example diagram illustrating ranking of popular consumed content by genre according to embodiments herein.

FIG. 12 is an example diagram illustrating ranking of popular consumed content by genre according to embodiments herein.

In response to appropriate input such as receiving selection of selectable viewing option 1130-1 from content guide 750-3 (or other suitable selectable viewing option displayed on display screen 130-1) in FIG. 11, the playback device 110-1 can be configured to initiate display of display information 1222 (FIG. 12) including identities of popular currently consumed by genre.

Note that if sufficient space is available in content guide 750-3 to display extra information, then the display information 1222 can be displayed in a respective display region of content guide 750-3.

Alternatively, if there is insufficient space available in content guide 750-3, the display information 1222 can be displayed in lieu of or as an overlay display notification with respect to the content guide 750-3. Thus, as an alternative to presenting a listing of popular content in a respective content guide, embodiments herein can include displaying popular content by different genres.

In this example embodiment, sports genre 1230-1 includes window region 1210-1, window region 1210-2, etc., to display information (such as content identity information, channel information from which corresponding content can be retrieved, etc.) associated with currently popular consumed content pertaining to the sports genre; history genre 1230-2 includes window region 1211-1, window region 1211-2, etc., to display information or identities associated with currently popular consumed content pertaining to history genre; drama genre 1230-3 includes window region 1212-1, window region 1212-2, etc., to display information or identities associated with currently popular consumed content pertaining to drama; and so on.

Each window region can be configured to display information associated with corresponding ranked content. For example, window region 1210-1 can be configured to display an identity (such as images, text, symbols, . . . ) associated with first most popular (currently consumed) content in the sports genre 1230-1; window region 1210-2 can be configured to display an identity (such as images, text, . . . ) associated with second most popular (currently consumed) content in the sports genre 1230-1; and so on.

Window region 1211-1 can be configured to display an identity (such as images, text, . . . ) associated with first most popular (currently consumed) content in the history genre 1230-2; window region 1211-2 can be configured to display an identity (such as images, text, . . . ) associated with second most popular (currently consumed) content in the history genre 1230-2; and so on.

Window region 1212-1 can be configured to display an identity (such as images, text, . . . ) associated with first most popular (currently consumed) content in the drama genre 1230-3; window region 1212-2 can be configured to display an identity (such as images, text, . . . ) associated with second most popular (currently consumed) content in the drama genre 1230-3; and so on.

In one non-limiting example embodiment, as a possible alternative to playing back static images associated with popular content in respective window regions, embodiments herein can include playing back a streaming rendition of corresponding content in each window. For example, the streaming content can be a short clip or trailer representing the content available on a respective channel (as represented by the window region). Alternatively, the streaming content displayed in respective window regions can be actual renditions of the content currently transmitted on a corresponding channel.

More specifically, window region 1210-1 can be configured to display and play back a rendition of first most popular content in genre 1230-1 as currently available on channel 557; window region 1210-2 can be configured to display and play back a rendition of second most popular content in genre 1230-1 as currently available on channel 692; and so on.

Window region 1211-1 can be configured to display and play back a rendition of first most popular content in genre 1230-2 as currently available on channel 634; window region 1211-2 can be configured to display and play back a rendition of second most popular content in genre 1230-2 as currently available on channel 558; and so on.

Window region 1212-1 can be configured to display and play back a rendition of first most popular content in genre 1230-3 as currently available on channel 456; window region 1212-2 can be configured to display and play back a rendition of second most popular content in genre 1230-3 as currently available on channel 467; and so on.

Note that the audio portion associated with simultaneous play back of different streaming content (moving images) in display information 1222 may conflict with each other. In one embodiment, display information 1222 includes selection window 1260 navigated about the display screen 130-1 to select respective content.

By way of a non-limiting example, movement of the selection window 1260 over window region 1210-1 can cause the playback device 110-1 to playback audio associated with content played back in window region 1210-1 while audio associated with all other window regions is muted so as not to interfere with the audio associated with the rendition of content played back in currently selected window region 1210-1.

Subsequent movement of the selection window 1260 over window region 1210-2 (as shown) causes the playback device 110-1 to playback audio associated with content played back in window region 1210-2 while audio associated with all other window regions is muted so as not to interfere with the audio associated with the rendition of content played back in window region 1210-2.

In this manner, a respective use of a playback device can view and listen to audio associated with different content amongst the different genres.

In accordance with an alternative embodiment, the corresponding playback of content associated with a window region may not be activated until a respective user navigates the selection window 1260 over a respective window region. For example, in response to the user navigating the selection window 1260 over window region 1210-2, the playback device 110-1 initiates playback of a trailer or current content on channel 692 while all other window regions display only respective static images.

Thereafter, in response to the user navigating the selection window 1260 over window region 1211-2, the playback device 110-1 initiates playback of a corresponding trailer or current content associated with channel 558, while all other window regions display only respective static images.

Accordingly, in such an embodiment, the user can navigate the selection window 692 to sample viewing of different content.

In one embodiment, playback of the currently selected content in each window region as selected by the selection window 1260 can include initially playing back a low-resolution rendition of the corresponding content. For example, as previously discussed window region 1210-1 (when selected by selection window 1260) can be configured to playback a low-resolution rendition of content currently transmitted in accordance with a high resolution format on channel 557; window region 1210-2 (when selected by selection window 1260) can be configured to playback a low-resolution rendition of content currently transmitted in accordance with a high resolution format on channel 692; window region 1211-1 (when selected by selection window 1260) can be configured to playback a low-resolution rendition of content currently transmitted in accordance with a high resolution format on channel 634; window region 1210-2 (when selected by selection window 1260) can be configured to playback a low-resolution rendition of content currently transmitted in accordance with a high resolution format on channel 558; and so on.

In one non-limiting example embodiment, the images displayed in respective window regions 1210, 1211, 1212, etc., initially can be still images from corresponding video. Selection of a window region via 1210-2 can cause the video to playback in the selection window while other window regions display still images representative of available video. Alternatively, each of the videos can be played back simultaneously in window regions 1210, 1211, 1212, etc.

Eventually, the user of playback device 110-1 will identify content that he/she wishes to view in full resolution. Assume in this example embodiment that the user provides input selecting to view the content in window region 1210-1 in a higher resolution. This can be achieved by any suitable action such as selecting an OK button on a remote controller.

In such an instance, in response to receiving selection of the window region and play back of corresponding content identified in window region 1210-2, the playback device 110-1 tunes to the corresponding channel 692. Subsequent to tuning, the playback device 110-1 initiates display of a substantially full screen playback rendition of the selected content on channel 692 on the display screen 130-1. As mentioned, the substantially full screen rendition of the content on channel 692 can be displayed in accordance with a resolution (high definition resolution) that is substantially greater than a resolution of content displayed in the window region 1210-1 (which is a low resolution sample).

Note that embodiments are not limited to selecting and displaying popular content available only on linear channels. The content deemed most popular may be stored in a repository. The user may select playback of the content from the repository.

In certain instances, such as in linear television, determining what content will be most popular content in a current time slot is not possible until after some amount of time such as one or more minutes of the content is available for selection by viewers in a time slot. In accordance with one embodiment, if no history of consumption is available for a respective digital asset (new content) to be made available for the first time, the hot channel initially can display a popularity of the same show based on consumption of the show in a previous week. For example, historical information can indicate that a particular sitcom X on a corresponding channel was the most popular content in the previous week for a given timeslot such as between 8:00 and 9:00 pm on Wednesday night. In response to detecting that the sitcom X was most popular last week on Wednesday night between 8:00 and 9:00 pm, between 7:55 pm and 8:00 pm (before it is known whether this week's show will be popular) of the current night, the content guide indicates that the sitcom X will most likely be the most popular content at 8 pm on Wednesday based on only the historical information.

After 8:00 pm, embodiments herein include receiving feedback indicating which of the content is most popular amongst viewers. Eventually, some time on or after 8:00 pm, collected consumption data can indicate that sitcom Y is most popular this week instead of sitcom X. After a segment of time such as a minute or two, assuming that sitcom Y is determined as being most popular this week, the content guide can be updated to indicate that sitcom Y is most popular instead of sitcom X (even though sitcom X was most popular last week). Thus, embodiments herein can include making an initial guess as to what content is to be the popular and then providing an indication of actual most popular content after results are analyzed.

Further embodiments herein can include weighting historical content consumption information of most popular content with current received consumption information to determine what content to indicate as most popular in a respective content guide. For example, as mentioned, up until 8:00 pm, the content guide can initially indicate that sitcom X will be most popular content because no data is available for the upcoming timeslot between 8 and 9 pm. Thus, content popularity is heavily weighted toward a previous week of content consumption. After 8:00 pm, more and more data is received indicating popularity of content for the current night and time slot. In one embodiment, such as at 8:02 pm, the popularity of content can be based more heavily on the current detected content consumption (such as last two minutes between 8:00 and 8:02 pm) as opposed to basing popularity on a previous week of content consumption.

More specifically, before 8:00 pm, historical data is used to identify what likely will be most popular. Between 8:00 pm and 8:02, embodiments herein can include varying the weight from historical content consumption to current content consumption. For example, at 8:01 pm, the content guide can use on 50% of the historical content consumption information (such as from a previous week) and 50% of current content consumption information (such as a tally of content consumption information collected between 8:00 pm and 8:01 pm) to determine the most popular show. Thus, at 8:01 pm, the most popular channel as indicated by the content guide can be based on a weighting of the historical content consumption information as well as a weighting of the current content consumption information. As mentioned, before 8 pm, the most popular content as indicated by content guide can be based 100% on content consumption in the previous week. After 8:02 pm, the most popular content as indicated by content guide can be based 100% on current content consumption after 8 pm.

Any suitable variation of weighting old content consumption information and new content consumption information is possible between 8:00 pm and 8:02 pm in this example.

Also, the two-minute time span of varying weights of content consumption information is shown by way of non-limiting example only.

Figure 13:
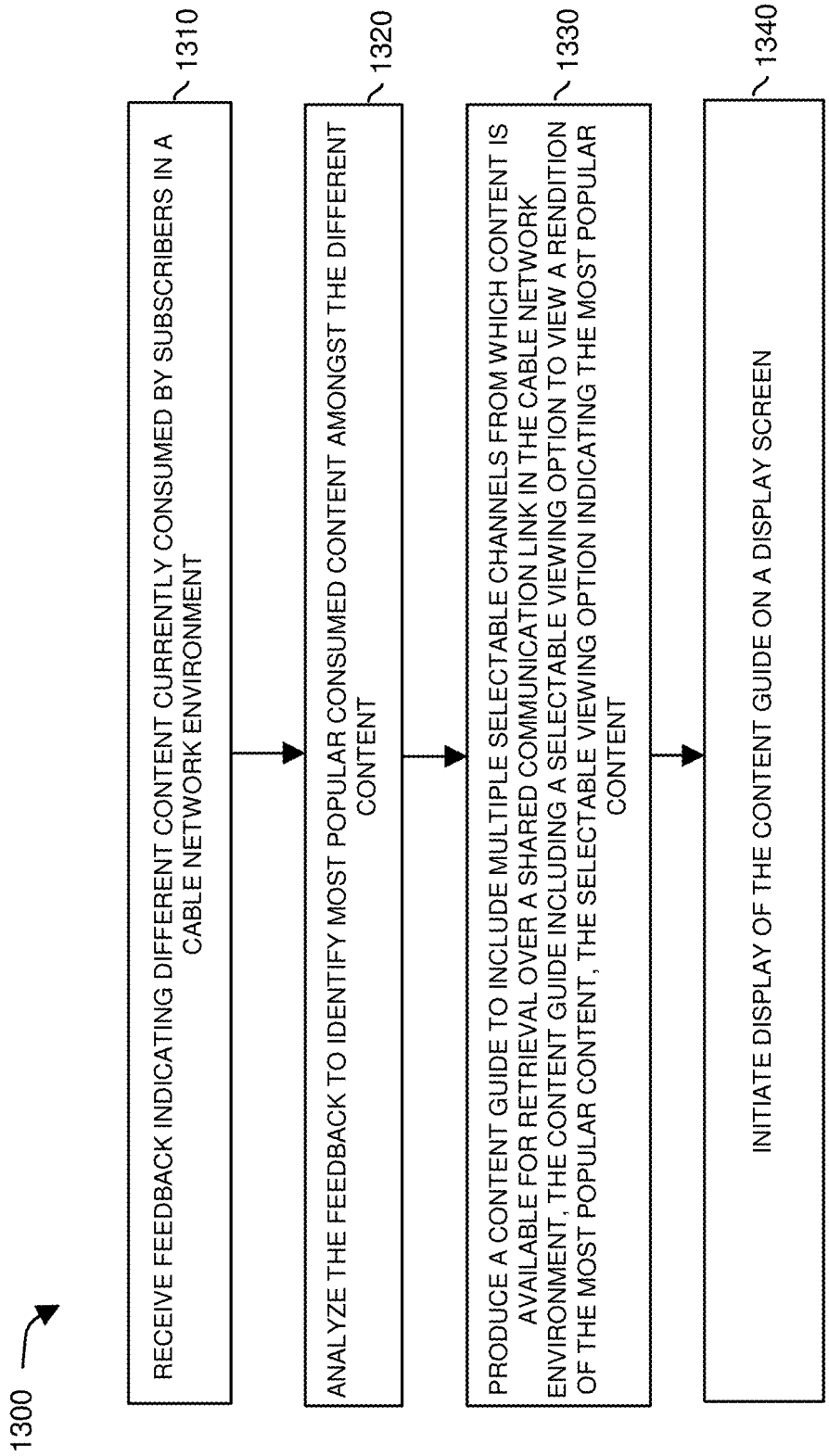
FIG. 13 is an example diagram illustrating a method of providing notification of popular content in a content guide according to embodiments herein.

FIG. 13 is an example diagram illustrating a method of providing notification of content popularity in a content guide according to embodiments herein.

In processing block 1310, the data analyzer engine 140 receives content consumption feedback 155 indicating different content currently consumed by subscribers in a cable network environment.

In processing block 1320, the data analyzer engine 140 analyzes the content consumption feedback 150 to identify most popular consumed content amongst the different available content.

In processing block 1330, the data analyzer engine 140 produces a content guide 750 to include multiple selectable channels from which content is available for retrieval over shared communication link 191-1 in the cable network environment. The content guide 750 includes a selectable viewing option to view a rendition of more popular consumed content. In one embodiment, the selectable viewing option in the content guide 750 indicates the most popular content consumed by subscribers as indicated by content consumption feedback 155.

In processing block 1340, the data analyzer engine 140 initiates display of the content guide 750 on a respective display screen such as display screen 130-1.

Figure 14:
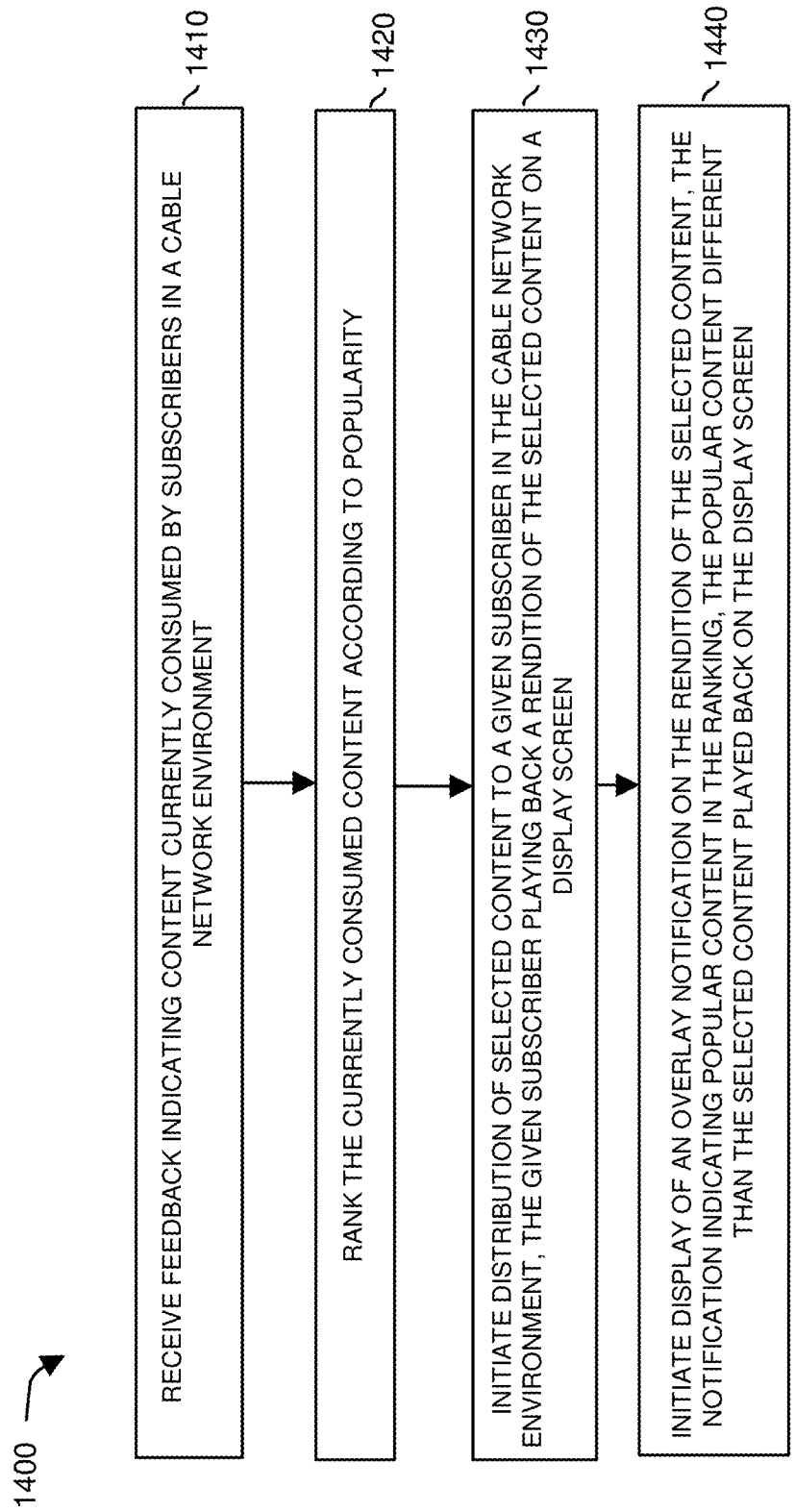
FIG. 14 is an example diagram illustrating a method of providing notification of popular consumed content according to embodiments herein.

FIG. 14 is an example diagram illustrating a method of providing notification of popularly consumed content according to embodiments herein.

In processing block 1410, the data analyzer engine 140 receives content consumption feedback 110-1 indicating content currently consumed by subscribers in a cable network environment.

In processing block 1420, the data analyzer engine 140 ranks the currently consumed content (as specified by the content consumption feedback 155) according to popularity.

In processing block 1430, the data analyzer engine 140 initiates distribution of selected content to a given subscriber in the cable network environment. The given subscriber plays back a rendition of the selected content on a display screen such as display screen 130-1.

In processing block 1440, the playback device 110-1 initiates display of an overlay notification (such as via display information 422, display information 1222, etc.) on the rendition of the selected content. In one embodiment, the notification indicates popular content in the ranking. The popular content can be different than the selected content currently played back on the display screen 130-1. Accordingly, a respective subscriber operating device 110-1 can be notified of most popular content while playing back other content.

In accordance with yet further embodiments, a respective playback device 110-1 initiates display of a notification on the display screen in response to detecting that previously selected content currently played back on the display screen 130-1 is not the most popular content as indicated by the ranking. For example, the rendition of content currently displayed on display screen 130-1 may not be the most popular content. The overlay notification on currently displayed content can indicate that another channel, data stream, title of content, etc., is the most popular currently consumed content in a network. In response to selection of a selectable viewing option in the overlay notification, the device 110-1 can tune to the most popular content.

Accordingly, as previously discussed, a respective subscriber can be notified that the content they selected for playback is not the most popular currently consumed content in a network environment.

Referring again to FIG. 1, note that embodiments herein can include automatically storing popular content in resource 117-1 (or other suitable resource internal or external with respect to subscriber domain 150-1) even though the respective subscriber (e.g., one or more users operating devices 110) in subscriber domain 150-1 do not currently select and play back most popular content.

For example, resource 117-1 (or other suitable storage resource) can include a digital video recorder and corresponding repository to store streaming content available over shared communication link 191. The resource 117-1 can include multiple tuner circuits to tune to different channels of streaming content available over shared communication link 191. In one example embodiment, while the user tunes to and plays back content identified as being less popular content, the resource 117 stores popular content available on one or more channels designated as being HOT CHANNELS.

More specifically, the user of device 110-1 can provide input to resource 117-1 to select and tune to a first channel. In response to receiving the input, the resource 117-1 tunes a first tuner in the resource 117-1 to the first selected channel as received over shared communication link 191 for playback of content on display screen 130-1 of device 110-1. The first channel can be any suitable type of channel such as a broadcast channel (e.g., a linear television channel), video on demand channel, etc. While the user views less popular content on device 110-1, the resource 117-1 can receive input from notification resource 141 indicating which content available to subscriber domain 150-1 is popular consumed content by other subscribers in shared network 190-3.

In such an instance, in response to receiving the notification of most popular consumed content (such as notification of one or more HOT CHANNELS) in network 190-3, the resource 117-1 tunes one or more unused tuners to the hot channels and initiates storage of the streaming content on one or more of the hot channels in a respective repository.

While the user views corresponding unpopular content on display screen 130-1, the resource 117-1 (or other suitable resource) can be configured to provide a respective notification on display screen 130-1 to indicate that the currently viewed content from the first tuner circuit is not the most popular content. If the user of device 110-1 decides to view the most popular content (in lieu of the currently viewed less popular content), the user inputs an appropriate command to view portions of stored streaming content from the hot channel. In one embodiment, in response to receiving the command to switch to playback of the more popular content, the resource 117-1 streams the more popular content stored in a respective resource such as a digital video recorder to device 110-1.

Accordingly, one or more unused tuners in resource 117-1 can be used to tune and store most popular consumed content on one or more available hot channels (i.e., channels that convey most popular content). The device 110-1 can then switch to playback of the stored hot channel content (in lieu of viewing the less popular content on the first tuner circuit) by providing appropriate control input.

In one embodiment, in response to receiving input to playback the stored hot channel content, the resource 117-1 initiates playback of the hot channel content from the beginning of the respective data stream. For example, as shown in FIG. 7, the user may select channel 558 to view flying machines on the HISTORY™ broadcast channel between 7 PM and 7:15 PM. The first tuner in resource 117-1 tunes to channel 558 in shared communication link 191-1 and forwards such content to device 110-1 for playback.

At 7:02 PM, the resource 117-1 can receive notification that the movie ABC on channel 560 is the most popular available content (see FIG. 7). If the resource 117-1 is configured to automatically store hot channel content, in response to receiving the notification that movie ABC on channel 560 is the most popular content, the resource 117-1 uses a tuner to automatically tune to channel 560 and record the corresponding content movie ABC. Thus, content available on a respective hot channel can be recorded even though it is not currently selected for immediate playback on display screen 130-1 of device 110-1.

Assume that a user operating device 110-1 decides to view the movie ABC on the hot channel. In one embodiment, the user views content guide at or around 7:15 PM and selects viewing option 780 (in FIG. 7). In response to the selection, the resource 117-1 initiates playback of the movie ABC from the beginning. That is, the resource 117-1 streams the stored content from appropriate storage. Accordingly, even though the user decides to switch to the hot channel midstream of playing back respective content in a timeslot (such as after a portion of the popular content has been broadcasted), the user is able to watch the most popular content from the beginning.

Figure 23:
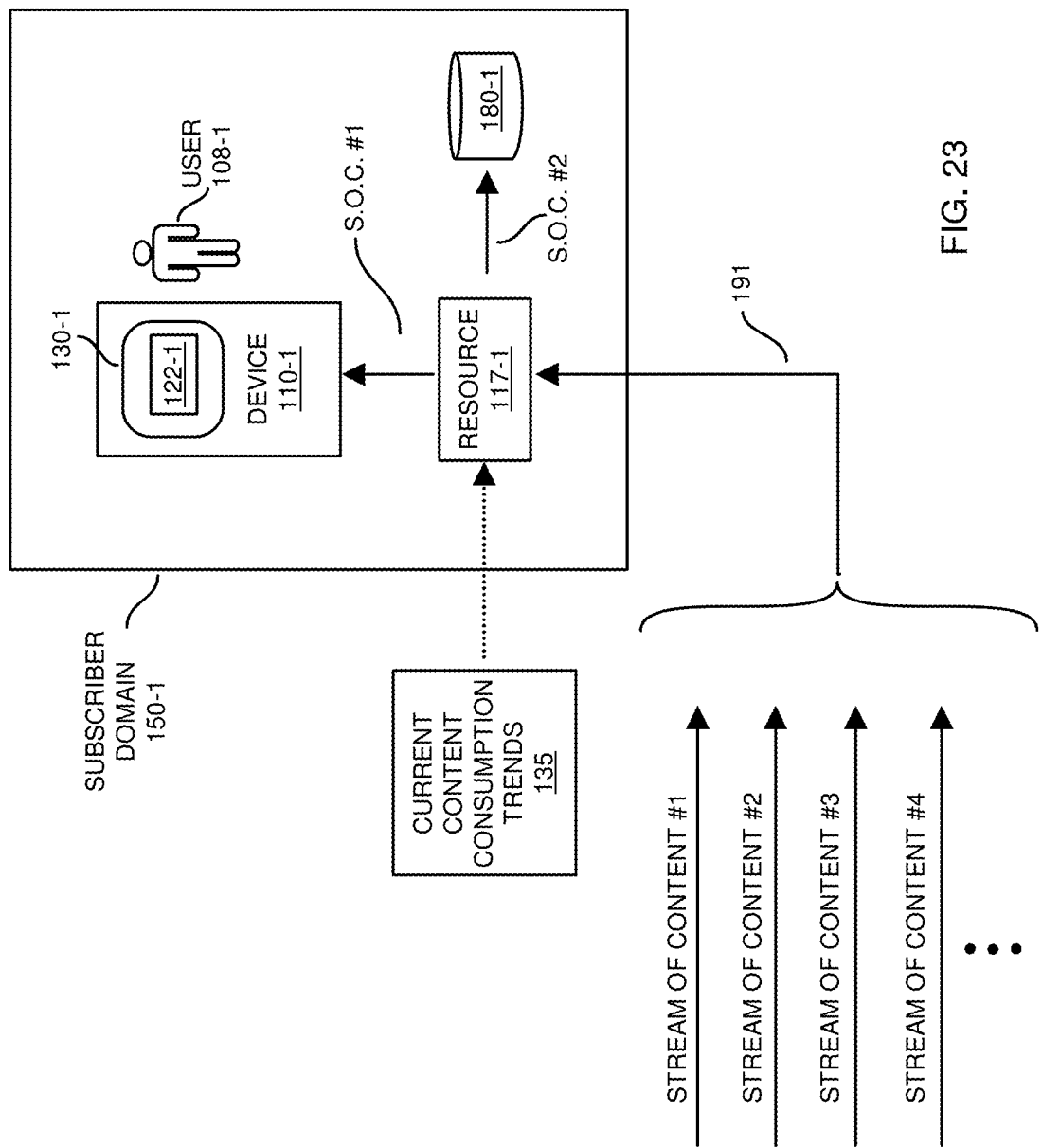
FIG. 23 is an example diagram illustrating storage of popular content in a repository during streaming of less popular content according to embodiments herein.

FIG. 23 is an example diagram illustrating storage of popular content in a repository during streaming and playback of less popular consumed content according to embodiments herein.

As shown, one embodiment herein includes storing popular content in a repository while a respective subscriber views less popular content. For example, a resource 117-1 (such as a media management resource) can be configured to tune to a respective channel selected by user 108-1 to retrieve stream of content #1. The selected channel on which stream of content #1 is available may be one of multiple channels received over shared communication link 191. Subsequent to applying appropriate processing such as decryption, decoding, etc., resource 117-1 transmits stream of content #1 to device 110-1 for playback.

Resource 117-1 can be configured to monitor current content consumption trends 135 as produced by data analyzer engine 140 to detect popular streamed content available over shared communication link 191. For example, assume in this example embodiment that current content consumption trends 135 indicates that stream of content #2 is most popular consumed content amongst viewers in network 190-3.

In response to receiving the notification of most popular content, the resource 117-1 initiates storage of the stream of content #2 in repository 180-1 (or possibly remote repository 180-2 in FIG. 1) for subsequent selective playback on the playback device 110-1. Accordingly, a user 108-1 operating device 110-1 can select unpopular content such as stream of content #1 for playback.

Note that the user 108-1 may not be aware of the availability of stream of content #2 or that such content is most popular amongst current viewers. During playback of the stream of content #1 (less popular content in this example), the resource 117-1 can be configured to initiate display of a message on display screen 130-1 of the playback device 110-1. The message can indicate the availability of the stream of content #2 for playback from a local or remote storage resource (such as a digital video recorder). By way of a non-limiting example, the displayed message can indicate that the second content available to the user is more popular than the first content displayed on the corresponding display screen 130-1. Accordingly, a subscriber can be apprised that they are not watching most popular consumed content.

After learning that stream of content #2 is popular content, the user 108-1 operating the playback device 110-1 may generate a request to play back the stream of content #2 (i.e., content stored in repository 180-1 in response to detecting that it is popular content) on the playback device 110-1 instead of playing back the stream of content #1. In one embodiment, in response to receiving a request from a user 108-1 of the playback device 110-1 to switch to playback the stream of content #2: the resource 117-1 discontinues playback of the stream of content #1 on display screen 130-1 of the playback device 110-1. The resource 117-1 then initiates streaming of the stream of content #2 from repository 180-1 to the playback device 110-1.

In one embodiment, the resource 117-1 automatically starts playing back the stream of content #2 (such as a video data stream) from the beginning such that the user 108-1 can view an entirety of the stream of content #2. The resource 117-1 can continue storing any remainder of the stream of content #2 (as it is broadcasted over shared communication link 191) into repository 180-1 if the user 108-1 happens to select stream of content #2 as it is concurrently being stored in repository 180-1. Accordingly, via anticipatory storage of popular stream of content #2 in repository 180-1, the user 108-1 is provided access to best possible content.

As previously discussed, each of multiple users in a respective network environment 100 can be monitored to determine which content is most desirable for viewing by a respective user. The best possible content or the content deemed to be most popular can be content in a particular genre or profile in which the user has been assigned. Accordingly, what is deemed most popular content may be different for each of multiple users depending on their consumption profile. In one embodiment, the resource 117-1 receives notification of content that is deemed popular amongst subscribers that fall within a particular viewing profile in which the subscriber such as user 108-1 is assigned.

By way of further non-limiting example, the stream of content #1 and stream of content #2 can be simultaneously transmitted over the shared communication link 191 to resource 117-1. For example, the stream of content #1 may be available to subscribers in network 190-3 on a first broadcast channel of shared communication link 191; the stream of content #2 may be available to subscribers in network 190-3 on a second broadcast channel of shared communication link 191; and so on. The stream of content #1 and stream of content #2 may be available in the same or substantially the same time slot.

In one embodiment, the stream of content #2 can be received over the hot channel, which broadcasts most popular content to multiple subscribers. As discussed above, it may require a minute or two of time after initially streaming content in a time slot to determine what content is most consumed by subscribers in the respective network environment 100. If desired, any suitable amount of time such as a minute or two can be used to delay transmission of respective content over the designated hot channel.

More specifically, as previously discussed, Movie ABC can be transmitted over a respective channel between the time segment 7 PM and 8 PM. After appropriate analyzing amongst channels, the data analyzer engine 140 may produce content consumption information indicating that Movie ABC is the multiple most popular available content at or around 7:01 PM.

In response to detecting that the movie ABC is most popular, the distribution resource 125 can be configured to transmit the Movie ABC over a designated broadcast channel (such as the hot channel) to viewers in network 190-3. Because of the delay in determining the most popular content, the hot channel can transmit movie ABC in its entirety between 7:01 and 8:01 PM. In other words, the hot channel can be configured to broadcast the same movie ABC as channel 560 to subscribers over shared communication link 191, but the content in the hot channel (supplemental channel) can be delayed by a minute or two with respect to the movie ABC played back on channel 560 between 7 and 8 PM (see FIG. 7).

As mentioned, the hot channel (i.e., a supplemental channel in a channel lineup) can be configured to transmit the most popular content for each of multiple channels. For example, the hot channel can play back most popular content movie ABC between 7:01 and 8:01 PM (e.g., a delay of move ABC available in time slot 7-8 PM on channel 560); assuming that Klondike Gold is the most popular content in time segment 8-9 PM as detected around 8:01 PM, the hot channel can be configured to play back most popular content Klondike Gold between 8:01 and 9:01 PM (e.g., a delay of Klondike Gold available in time slot 8-9 PM on channel 559); and so on.

In one embodiment, resource 117-1 tunes to the hot channel and stores movie ABC (such as stream of content #2) in repository 180-1 for later retrieval while user 108-1 initiates playback of stream of content #1 on the device 110-1.

If desired, the resource 117-1 can be configured to continuously record the content transmitted on the hot channel so that the user 108-1 does not miss the ability to view popular content. If storage is limited, old content can be overwritten with newly received streaming content over the hot channel.

Figure 24:
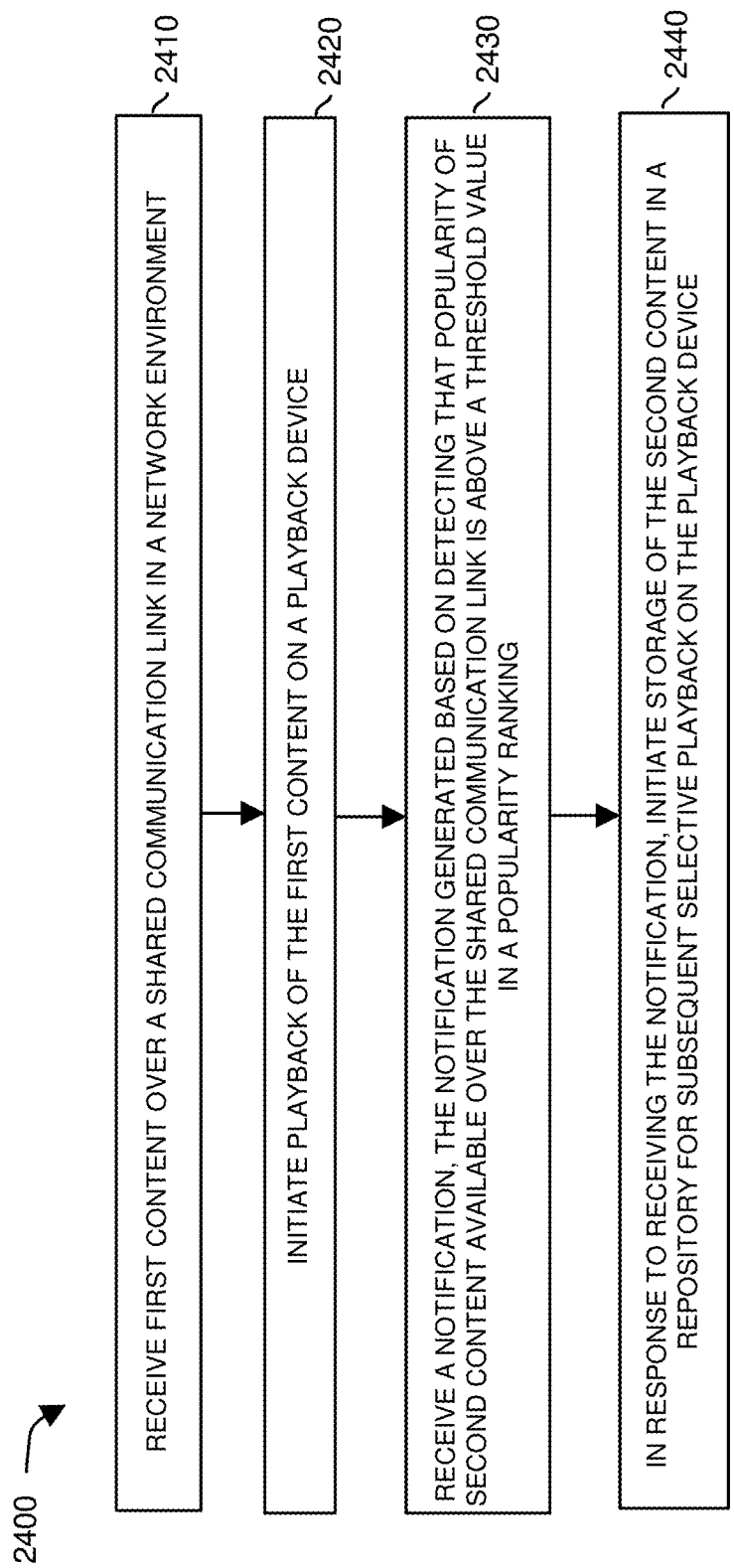
FIG. 24 is an example diagram illustrating a method of implementing storage of content based on popularity in anticipation of a subsequent according to embodiments herein.

FIG. 24 is an example diagram illustrating a method of implementing storage of content based on popularity according to embodiments herein.

In processing block 2410, the resource 117-1 receives first content (such as stream of content #1) over a shared communication link 191 in a network environment 100.

In processing block 2420, the resource 117-1 initiates playback of the first content on playback device 110-1.

In processing block 2430, the resource 117-1 receives notification such as current content consumption trends 135, popularity ranking information, etc. The notification can be generated based on detecting that popularity of second content (such as stream of content #2) available over the shared communication link 191 is popular above a threshold value in a respective popularity ranking. As previously discussed, resource 117-1 can be configured to store content that is deemed to be more popular above a threshold value as specified by content consumption trending information.

In processing block 2440, in response to receiving the notification, the resource 117-1 initiates storage of the second content (such as stream of content #2) in a repository 180-1 (or other suitable resource) for subsequent selective playback on the device 110-1 via input from user 108-1.

In accordance with further embodiments, note that multiple channels of content can be recorded in the cloud (or at another suitable location in a subscriber domain) without knowing in advance whether or not corresponding channels will convey the most popular content.

Figure 25:
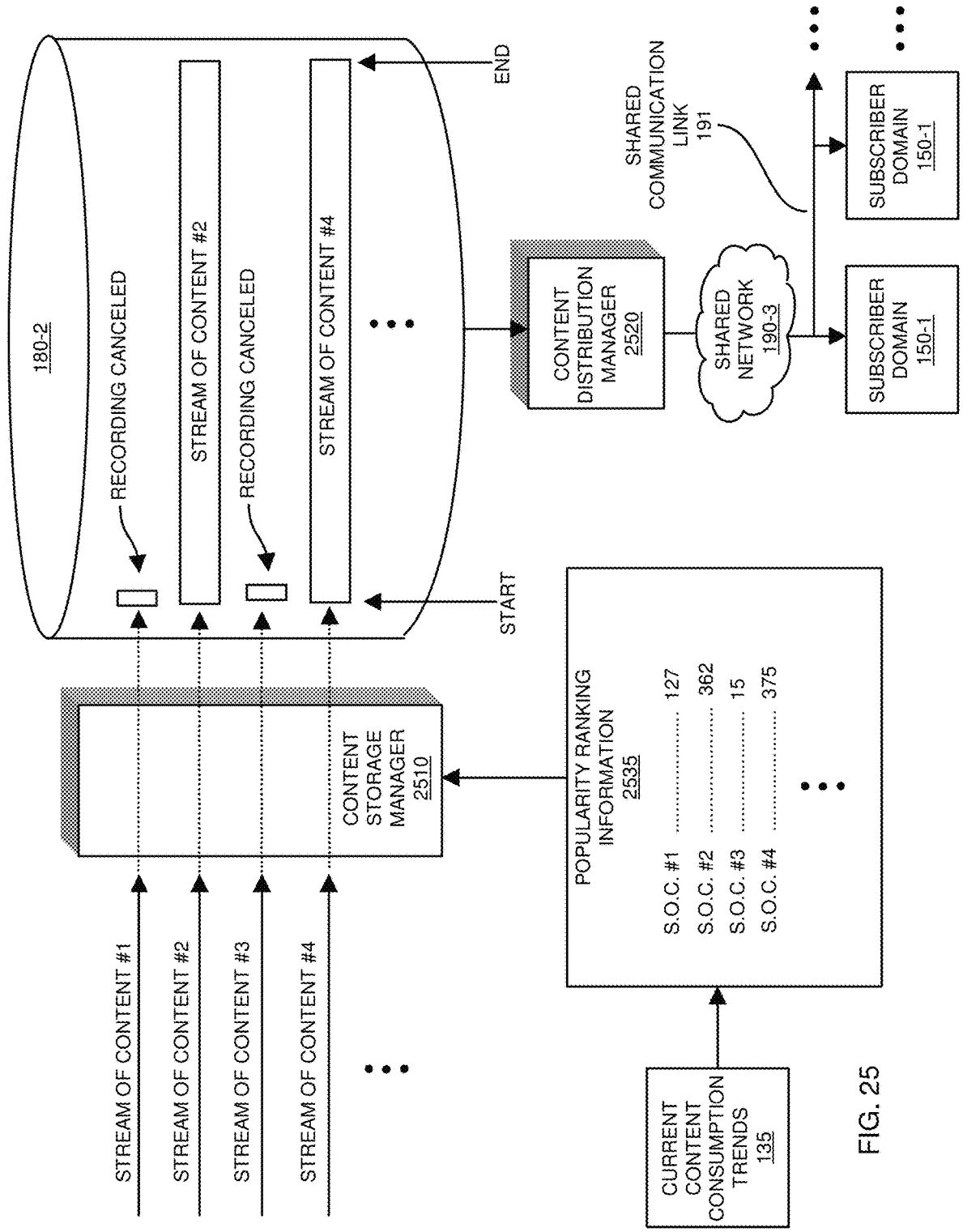
FIG. 25 is an example diagram illustrating cancellation of recording multiple streams of content based on popularity ranking information according to embodiments herein.

For example, FIG. 25 is an example diagram illustrating modification of recording multiple streams of content based on popularity ranking information according to embodiments herein.

In this example embodiment, content storage manager 2510 resides in any suitable location in network environment 100. The content storage manager 2510 initially stores a number of available streams of content (such as stream of content #1, stream of content #2, stream of content #3, stream of content #4, etc.) available over shared communication link 191 in a respective repository 180-2. As discussed herein, the content storage manager 2510 modifies recording of the streams of content depending on popularity ranking information 2535 as derived from current content consumption trends 135. For example, in one embodiment, the content storage manager 2510 can be configured to cancel certain recordings of content depending on popularity of the respective content.

More specifically, in one embodiment, content storage manager 2510 in network environment 100 receives a set of multiple streams of content such as stream of content #1, stream of content #2, stream of content #3, etc.). In one non-limiting example embodiment, the streams of content are the same content transmitted on channels of shared communication link 191 and are thus selectable for viewing by respective subscribers. Initially, the content management resource 2510 initiates storage of the set of multiple streams of content (e.g., stream of content #1, stream of content #2, stream of content #3, stream of content #4, etc.) in a respective repository 180-2 as shown in anticipation that at least one of the multiple streams of content will be detected as being popular amongst viewers.

In one embodiment, assume that the multiple streams of content are simultaneously transmitted streams (over respective channels of shared communication link 191) in a scheduled time slot such as between 7 and 8 PM.

Because storage capacity in repository 180-2 may be limited, it may not be desirable to store an entirety of every possible stream of content. In one example embodiment, based on popularity ranking information 2535 indicating a popularity of the multiple streams of content amongst subscribers in network environment 100, the content management resource 2510 discontinues storage of less popular content such as at least one of but fewer-than-all of the streams of content in the set of originally recorded content.

As a more specific example, the set of multiple streams of content can include stream of content #1, stream of content #2, stream of content #3, and so on. Because it may not be known yet whether content will be popular or not at an outset of recording the streams of content in repository 180-2, the content management resource 2510 obtains and stores initial portions of the stream of content #1 in the repository 180-2; the content management resource 2510 stores initial portions of the stream of content #2 in the repository 180-2; the content management resource 2510 stores initial portions of the stream of content #3 in the repository 180-2; the content management resource 2510 stores initial portions of the stream of content #4 in the repository 180-2; and so on. The content storage manager 2510 can be configured to start storage of content at the beginning or start of the respective streams when they are initially broadcasted such as at 7 PM.

Via popularity ranking information 2535 received at or around 7:01 pm, assume that the content storage manager 2310 detects that stream of content #4 is the most popular viewed content with 375,000 subscribers tuned to playback stream of content #4; assume that the content storage manager 2510 detects that stream of content #2 is the second most popular viewed content with 362,000 subscribers tuned to playback stream of content #2; and so on.

Assume that relatively few subscribers tune to stream of content #1 and stream of content #2 in this example. Accordingly, stream of content #1 and stream of content #3 represent less popular content.

At or around time 7:01 PM, in response to detecting that a magnitude of the viewers (subscribers) in the network environment 100 selecting the stream of content #1 and #3 for playback in a scheduled time slot is substantially less than a magnitude of the viewers (subscribers) in the network environment 100 selecting the stream of content #2 and #4 for playback in the scheduled time slot, the content management resource 2510 discontinues storage of the stream of content #1 and #3 (non-popular content) in repository 180-2 by canceling the recording of stream of content #1 and stream of content #3. Because the content storage manager 2310 detects that stream of content #2 and stream of content #4 are popular content (potentially above a threshold popularity value), the content storage manager 2510 continues to store these streams of content in repository 180-2 as shown.

Thus, the content management resource 2510 can be sure to store more popular content in repository 180-2 (or other suitable resource) without knowing in advance which of the content to be broadcasted will be most popular.

Note that subsequent to storage of at least a portion of a respective popular stream of content, the subscribers can access the repository at any point (such as from the beginning up to a current point of recording linear content) in the data stream. The subscribers therefore have access to most popular content. In this example embodiment, storage capacity is not wasted because an entirety of only popular content is stored for retrieval by respective subscribers. That is, as mentioned, storage of certain less popular streams of content is canceled.

Note that the repository 180-2 can be disposed at any suitable location such as in the network environment 100 at a remote location with respect to subscriber domains 150 in which the viewers reside. As shown, content distribution manager 2520 provides the subscriber domains access to the repository 180-2 over shared communication link 191.

Figure 26:
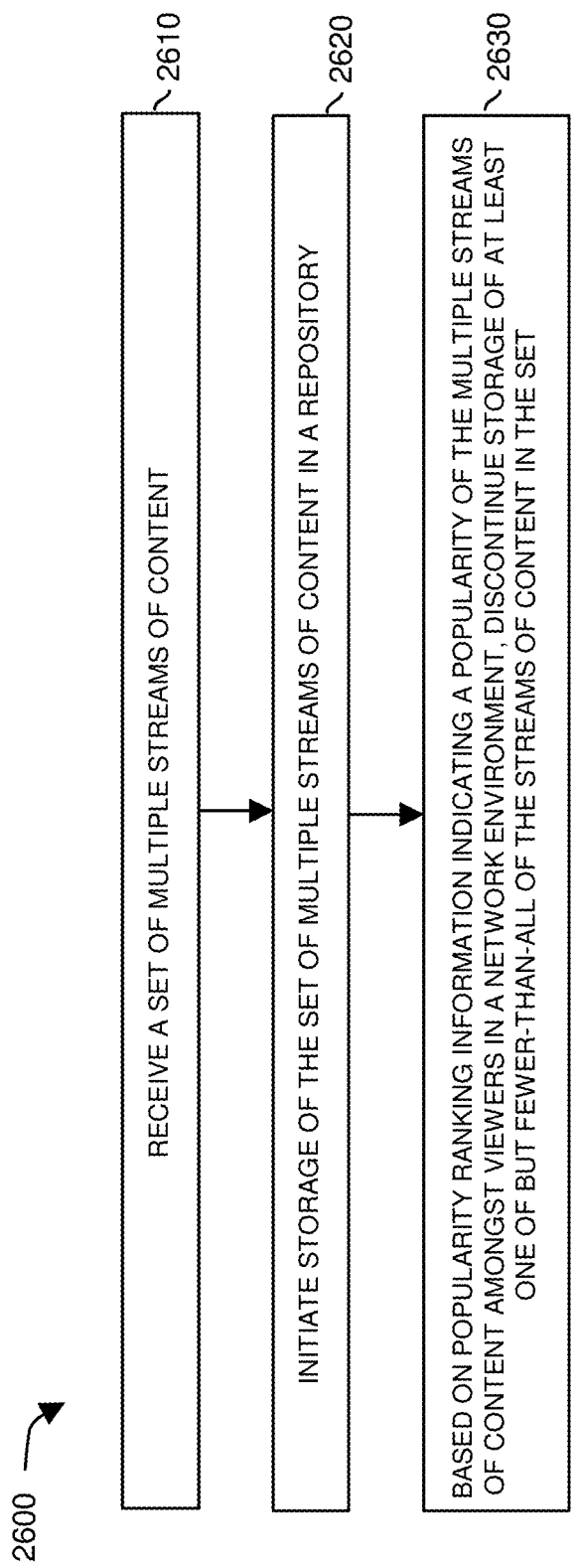
FIG. 26 is an example diagram illustrating a method of storing content in a repository according to embodiments herein.

FIG. 26 is an example diagram illustrating a method of storing content in a repository according to embodiments herein.

In processing block 2610, the content storage manager 2510 receives a set of multiple streams of content.

In processing block 2620, the content storage manager 2510 initiates storage of the set of multiple streams of content in repository 180-2.

In processing block 2630, based on popularity ranking information 2535 indicating a popularity of the multiple streams of content amongst viewers in a network environment 100, the content storage manager 2510 selectively discontinues storage of at least one of but fewer-than-all of the streams of content in the set.

Figure 27:
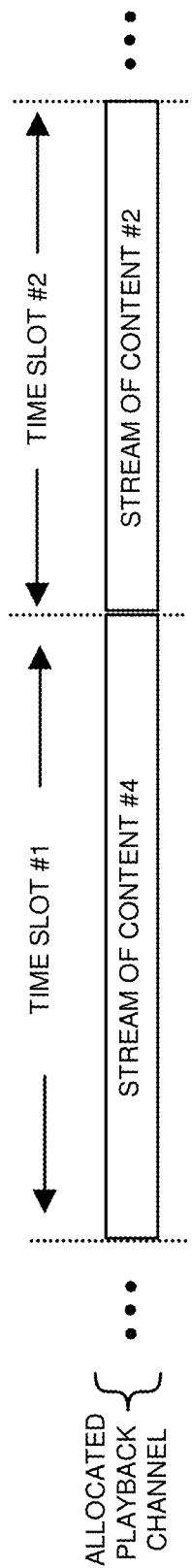
FIG. 27 is an example diagram illustrating transmission of multiple streams of content in an allocated hot channel according to embodiments herein.

FIG. 27 is an example diagram illustrating transmission of multiple streams of content in an allocated hot channel according to embodiments herein.

As previously discussed, embodiments herein can include identifying more popular content (such as content retrieved via video on demand or other suitable channels) consumed in a respective network environment 100 and then making the popular content available in a linear playback channel.

For example, as mentioned, data analyzer engine 140 can be configured to monitor consumption of multiple streams of content amongst multiple subscribers in a network environment 100. In a manner as previously discussed, based on the consumption, the data analyzer engine 140 or other suitable resource produces popularity ranking information 2535 indicating a popularity of the multiple streams of content amongst the multiple subscribers.

As mentioned, the streams of content monitored by the data analyzer engine 140 can be any suitable type of content such as video on demand in which content is transmitted to subscribers in newly allocated channels (e.g., switched digital video channels, IPTV channels, etc.).

In one embodiment, the data analyzer engine 140 (or other suitable resource) utilizes the popularity ranking information to identify a fewer-than-all portion (subset) of the multiple streams of content to make available in a playback channel (allocated hot channel or supplemental channel) accessible to multiple subscribers.

In a further example embodiment, a network manager resource allocates the hot channel to broadcast popular content as indicated by the popularity ranking information 2535 produced by data analyzer engine 140. Based on the popularity ranking information 2535, the network manager resource schedules broadcast transmission of the subset of multiple streams of content (e.g., content deemed as being more popular amongst subscribers) over the allocated hot channel. When the hot channel is a broadcast channel, each of multiple subscribers can simultaneously tune to the same broadcast signal (in the hot channel) to view respective popular content.

In this example embodiment, the data analyzer engine 140 produces information indicating that stream of content #4 and stream of content #2 are most popular content viewed by subscribers as previously discussed. In this instance, the distribution resource 125 produces the hot channel (i.e., allocated playback channel) to include a broadcast of stream of content #4 in time segment #1; the distribution resource 125 produces the hot channel to include a broadcast of stream of content #2 in time segment #2; and so on. Because stream of content #1 and stream of content #3 represent unpopular content, the distribution resource 125 prevents transmission of the stream of content #1 and stream of content #3 over the hot channel to subscribers in network environment 100.

Note that the streams of content (stream of content #1, stream of content #2, stream of content #3, stream of content #4, etc.) may be content transmitted in any suitable transmission protocol and channels. For example, as previously discussed, the streams of content can be transmitted in broadcast channels, streams of content can be transmitted in video on demand channels; streams of content can be transmitted as IPTV data channels, and so on.

One embodiment herein includes monitoring consumption of video on demand channels in shared communication link 191 to determine which content is most popular. Video on demand channels can be provided via switched digital video. That is, when a subscriber requests to view video on demand content, the distribution resource allocates a specific channel for use by the subscriber to receive requested content. In one non-limiting example embodiment, the hot channel can be a broadcast channel in which popular streams of content are transmitted in a broadcast manner. Thus, video on demand channels can be monitored for popular content. A broadcast channel can be used to transmit the popular content as detected on video on demand channels.

Figure 28:
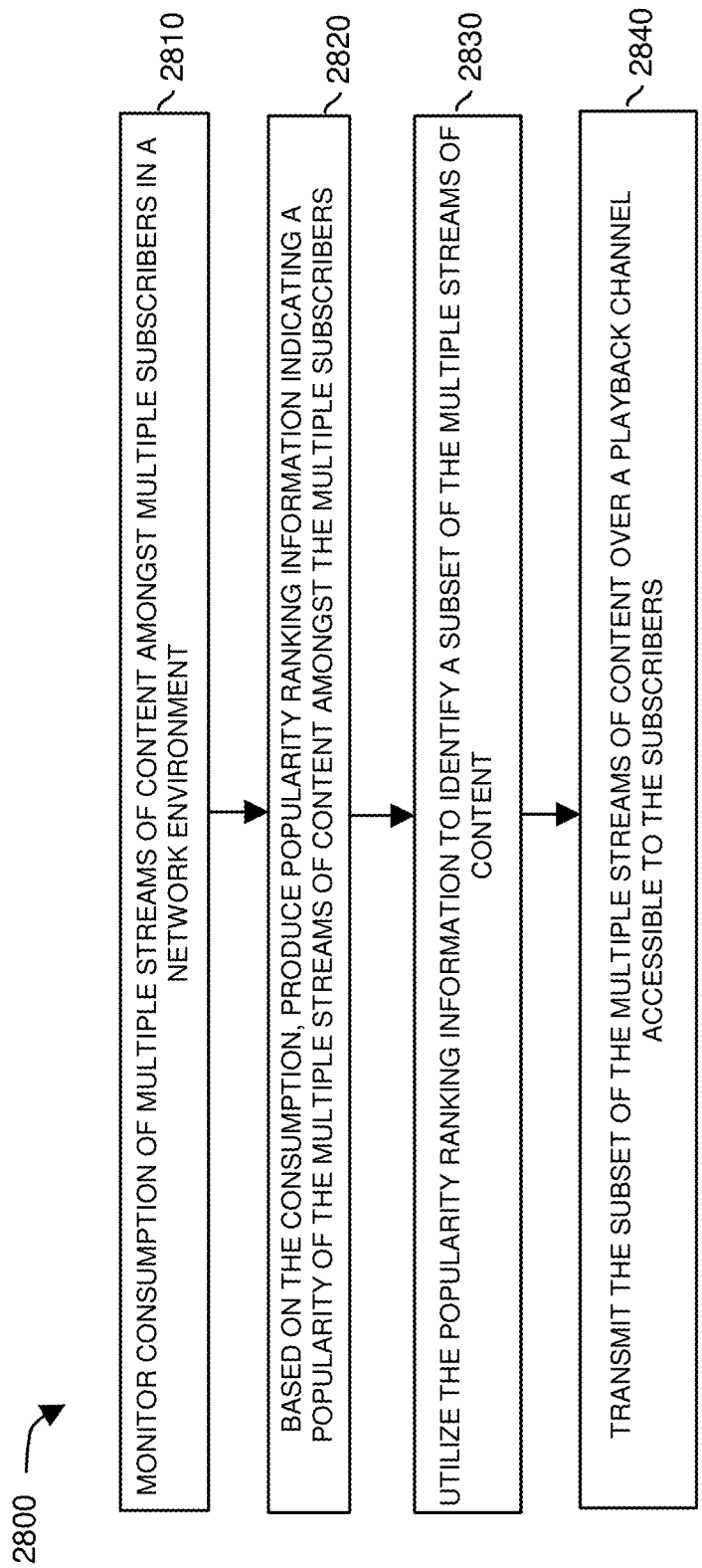
FIG. 28 is an example diagram illustrating a method of detecting popular content and initiating playback of respective content over an allocated hot channel according to embodiments herein.

FIG. 28 is an example diagram illustrating a method of detecting popular content and initiating playback of respective content over an allocated hot channel according to embodiments herein.

In processing block 2810, a resource such as data analyzer engine 140 monitors consumption of multiple streams of content amongst multiple subscribers in a network environment 100.

In processing block 2820, based on the consumption, the data analyzer engine 140 or other suitable resource produces popularity ranking information 2535 indicating a popularity of the multiple streams of content amongst the multiple subscribers.

In processing block 2830, a media management resource such as distribution resource 125 utilizes the popularity ranking information to identify a subset of the multiple streams of content.

In processing block 2840, the distribution resource 125 transmits the subset of the multiple streams of content (i.e., popular content) over a playback channel (such as a supplemental channel) accessible to the subscribers.

Figure 15:
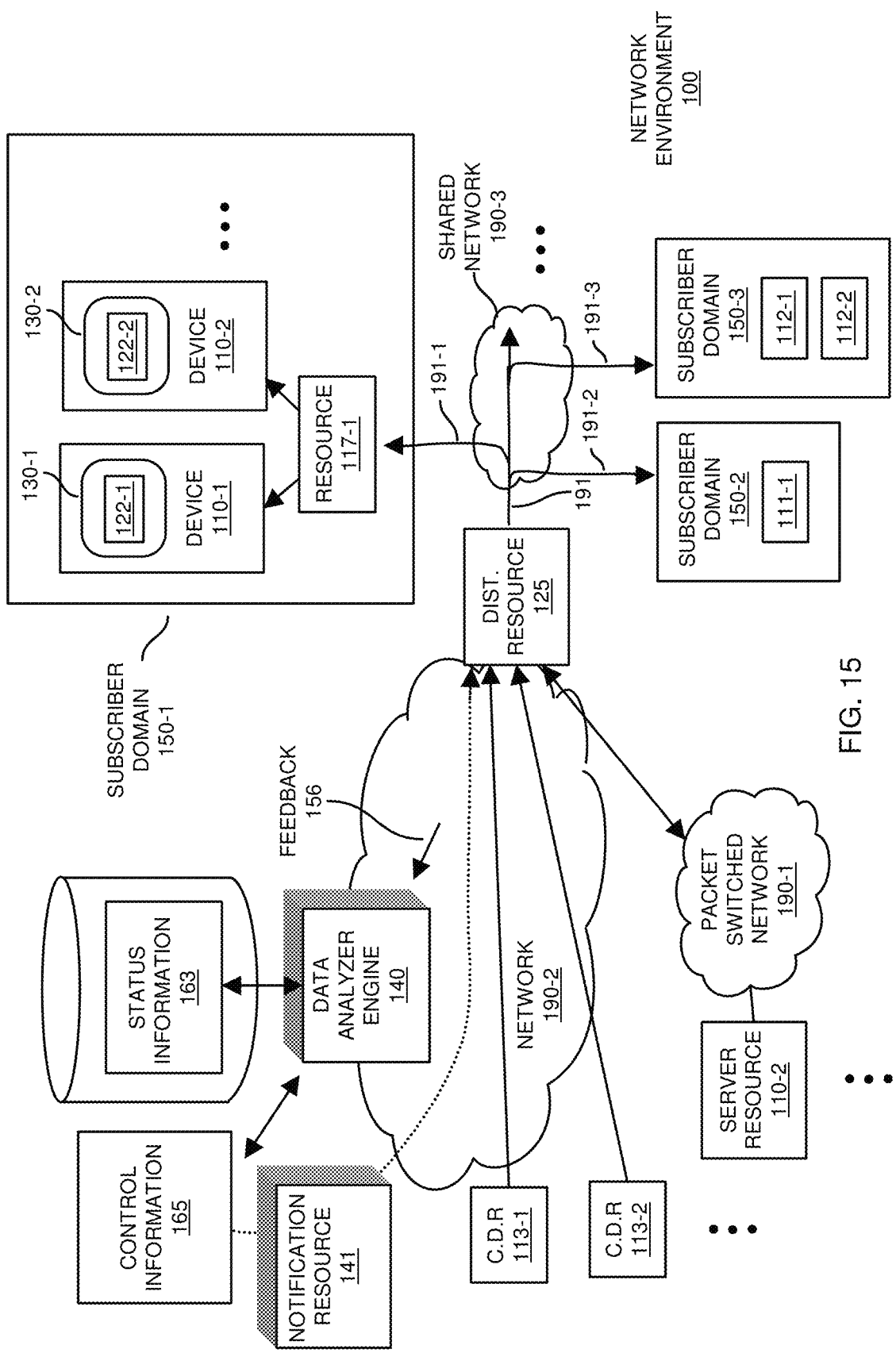
FIG. 15 is an example diagram illustrating processing of feedback and generation of control information according to embodiments herein.

FIG. 15 is an example diagram illustrating processing of feedback and generation of control information according to embodiments herein.

As previously discussed, network environment 100 can include data analyzer engine 140. In one embodiment, the data analyzer engine 140 receives feedback 156 associated with delivery of content to multiple subscriber domains 150.

Each of the subscriber domains 150 can include one or more playback devices operating to retrieve content for consumption. Consumption can include playback of content, storage of content, etc.

In this example embodiment, subscriber domain 150-1 includes playback devices 110-1, 110-2, etc. Subscriber domain 150-2 includes playback device 111-1. Subscriber domain 150-3 includes playback devices 112-1, 112-2, etc.

The playback devices residing within a respective subscriber domain may compete for available bandwidth in shared communication link 191. For example, playback device 110-1 may compete with playback device 110-2 for a portion of available bandwidth allocated to subscriber domain 150-1 to retrieve content.

In addition to competition for use of bandwidth amongst playback devices within subscriber domains, the playback devices residing in different subscriber domains may compete amongst each other for available bandwidth in shared communication link 191. For example, playback device 110-1 operating in subscriber domain 150-1 may compete with playback device 111-1 (in subscriber domain 150-2) and playback device 112-1 (in subscriber domain 150-3) for available bandwidth to retrieve content over shared communication link.

The feedback 156 can include status information specifying, for each of multiple subscriber domains 150 in the cable network environment network environment, usage of available bandwidth in shared communication link 191. Additionally or alternatively, feedback 156 can specify information such as: currently consumed content by a respective playback device, attributes of the playback device such as screen size, an encoding format used to retrieve content, buffering capability in a respective playback device, metering information such as a tally of past usage of available bandwidth, and so on.

In one embodiment, the available bandwidth is allocated for delivery of content made available by a corresponding cable network service provider. Each of the subscribers associated with respective subscriber domains 150 subscribes to services provided by the cable network service provider. A portion of bandwidth in shared communication link 191 can be allocated to support IPTV (Internet Protocol TeleVision) in which content is delivered in accordance with the Internet protocol suite over a packet-switched network such as the Internet.

In certain instances, each of the respective playback devices includes one or more media player applications configured to retrieve adaptive bit rate encoded content. Each media player application can be configured to retrieve content at a highest bit rate to playback a highest level of quality possible without regard to other users. Embodiments herein include controlling the "greedy" algorithms in the respective media player applications to promote fairness and optimization of bandwidth.

Feedback 156 can be received over any suitable communication link. By way of a non-limiting example, each of multiple resources such as playback devices, cable modems, etc., can be configured to establish a respective communication link (such as an over-the-top link) with data analyzer engine 140 to provide feedback 156. Via communications over respective communication links, the resources provide the data analyzer engine 140 with appropriate feedback 156.

As mentioned, feedback 156 can be or include any suitable information such as status information associated with playback devices, content delivery resources (such as cable modem termination systems, routers, etc., in network environment facilitating delivery of content to subscriber domains). Feedback 156 can be or include status information such as content consumption information specifying which content is currently consumed by each of the playback devices, content selection information (such as type of content selected for playback on a respective playback device), subscriber attributes associated with the user consuming respective content, device information indicating a type of playback device playing back content, size of display screen, etc.

As shown, the data analyzer engine 140 stores feedback 156 as status information 163 in a respective repository.

In one example embodiment, the data analyzer engine 140 is configured to analyze the feedback 156 (stored as status information 163) to identify attributes of current content consumption by playback devices operated in the subscriber domains 150. Based on the analyzed feedback, the data analyzer engine 140 produces control information 165 specifying data flow control rates in which one or more of the playback devices in network environment 100 are able to retrieve content over a shared communication link 191 in the cable network environment 100. The control information can be used to control algorithms in the respective media player applications to promote fairness and optimization of bandwidth amongst multiple users in the same or different subscriber domains.

Subsequent to generation of control information 165, notification resource 141 such as a server resource initiates delivery of portions of the control information 165 to one or more resources in shared network 190-3.

In a manner as previously discussed, feedback 156 can be received in real-time, substantially real-time, etc.

Any of multiple different resources (e.g., playback devices, cable modems, distribution resource 125, etc.) in the shared network 190-3 can be configured to receive control information. The control information is used to control flow of data to each of the playback devices 110-1, 110-2, 111-1, etc.

For example, in one embodiment, notification resource 141 can be configured to transmit control information 165 to each of one or more playback devices over shared network 190-3. A respective media player application in the target playback device can be configured to receive the data flow control settings and limit retrieval of content and use of bandwidth in shared communication link 191 based on the control settings as specified by received control information for that playback device.

In accordance with another embodiment, the notification resource 141 can be configured to transmit control information 165 to resource 117-1 (such as a control mode, server resource, router, etc.). Resource 117-1 can be configured to facilitate distribution of content received from distribution resource 125 to respective playback devices 110 in subscriber domain 150-1. For example, in accordance with the received control information from notification resource 141 for each playback device, the resource 117-1 can control a rate of transmitting data to the playback devices 110 in the subscriber domain 150-1. Accordingly, the resource 117-1 can be configured to limit retrieval of content and use of bandwidth in shared communication link 191 based on the control settings as specified by received control information 165.

In accordance with yet another embodiment, the notification resource 141 can be configured to transmit control information 165 to distribution resource 125 (such as a cable modem termination system, server resource, etc.). Distribution resource 125 can be configured to facilitate distribution of content received over network 190-2 to respective playback devices 110 in subscriber domain 150-1. For example, in accordance with the received control information for each playback device, the resource 117-1 controls a rate of transmitting data to the playback devices 110. Accordingly, the resource 117-1 can be configured to limit retrieval of content and use of bandwidth in shared communication link 191 based on the control settings as specified by received control information 165.

Thus, data flow control can be achieved at any suitable location in network environment 100.

As further discussed below, depending on feedback 156, the control information 165 can specify allocation of specific portions of available bandwidth to the multiple playback devices in different subscriber domains 150 depending on current operating conditions.

Figure 16:
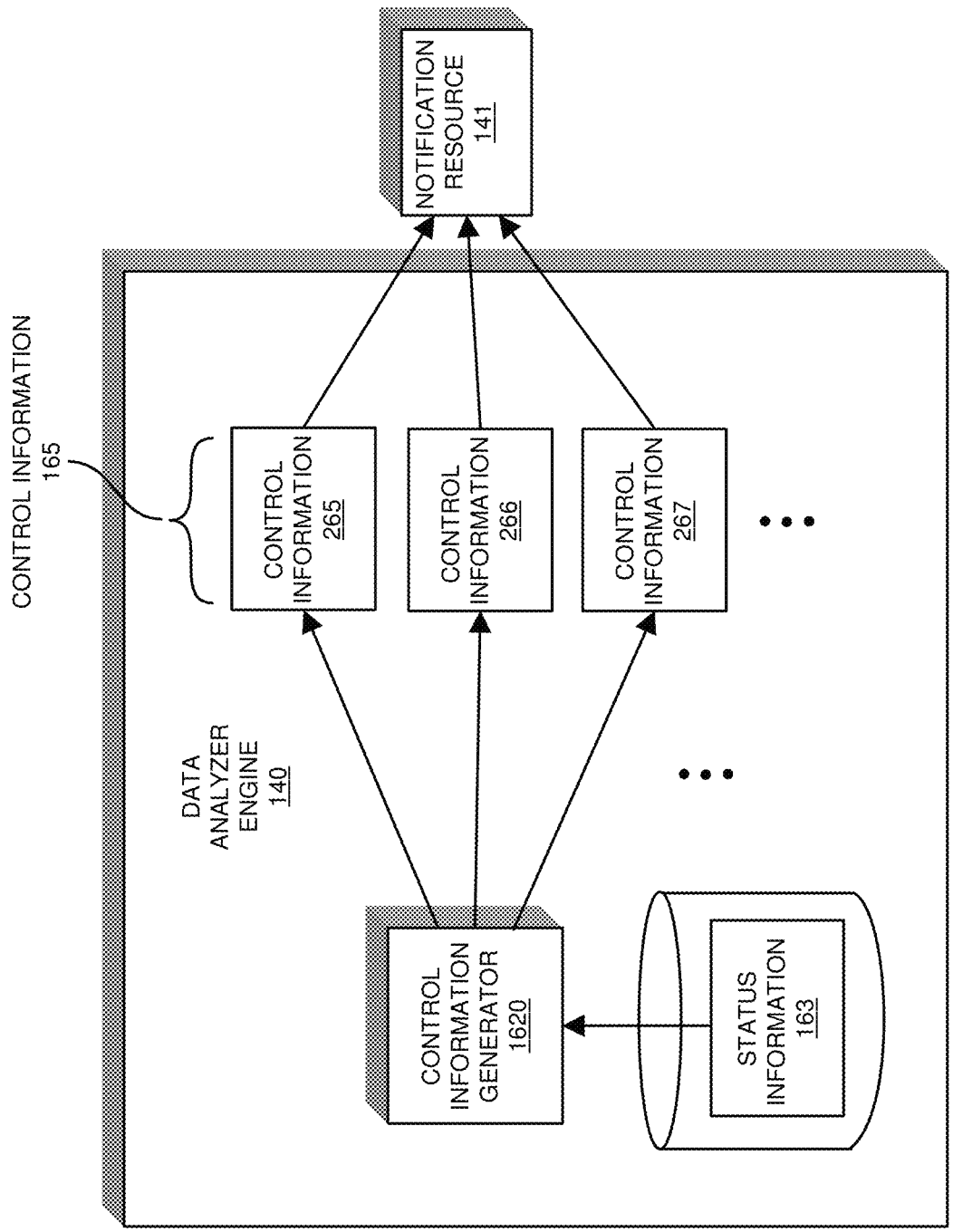
FIG. 16 is an example diagram illustrating generation of control information for subscribers in a cable network environment according to embodiments herein.

FIG. 16 is an example diagram illustrating generation of control information for one or more subscribers in a cable network environment according to embodiments herein.

In one embodiment, data analyzer engine 140 includes control information generator 1620. As shown, control information generator 1620 processes status information 163 (stored feedback 156) and produces control information 165 such as control information 265, control information 266, control information 267, etc.

As previously discussed, the control information 165 specifies data flow settings associated with each of the subscriber domains 150. More specifically, control information 265 specifies data flow settings associated with subscriber domain 150-1; control information 266 specifies data flow settings associated with subscriber domain 150-2; control information 267 specifies data flow settings associated with subscriber domain 150-3; and so on.

As previously discussed, notification resource 141 initiates distribution of the control information 165 to appropriate resources in network environment 100.

Figure 17:
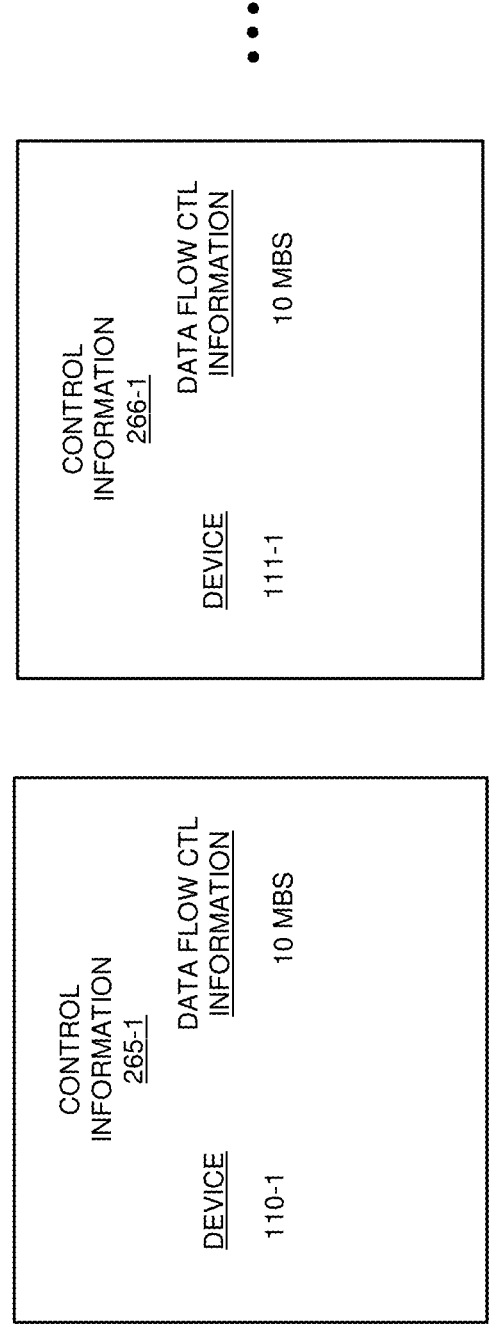
FIG. 17 is an example diagram illustrating generated control information for subscribers in a cable network environment according to embodiments herein.

FIG. 17 is an example diagram illustrating generation of control information for one or more subscribers in a cable network environment according to embodiments herein.

Assume in this example embodiment that playback device 110-1 is operated in subscriber domain 150-1 to retrieve first content; playback device 111-1 is operated in subscriber domain 150-2 to retrieve second content; and so on.

Each of the subscriber domains can subscribe to a respective cable network subscriber plan enabling retrieval of streaming content at a maximum bit rate of 10 MBS (Mega Bits per Second). A limited portion of bandwidth can be allocated to support delivery of adaptive bit rate encoded content to the playback devices. The playback device can be configured to retrieve content at a highest bit rate available.

Additional details of adaptive bit rate consumption are discussed in related U.S. patent application Ser. No. 13/441,335 entitled "Variability in Available Levels of Quality of Encoded Content" filed on Apr. 6, 2012, the entire teachings of which are incorporated herein by this reference. Retrieval of content can include obtaining a manifest file and retrieving data packets of different levels of quality of encoded data from a server resource depending on bandwidth availability.

Assuming that there is sufficient allocated bandwidth available for distributing content to the playback devices, the control information generator 1620 produces respective control information enabling the playback devices to retrieve at a maximum possible bit rate assigned to the respective subscriber domains.

For example, in this example embodiment, because appropriate bandwidth is available in shared communication link 191, the control information generator 1620 generates control information 265-1 for controlling a data flow rate associated with playback device 110-1 (in subscriber domain 150-1) to be the maximum allowable retrieval rate of 10 MBS; the control information generator 1620 generates control information 266-1 for controlling a data flow rate associated with playback device 111-1 (in subscriber domain 150-2) to be the maximum allowable retrieval rate of 10 MBS.

Accordingly, embodiments herein can include generating the control information to include data flow control rates specifying maximum rates at which each of the playback devices in a respective subscriber domain are able to retrieve adaptive bit rate encoded content transmitted over the shared communication link 191.

Assume that an additional user in subscriber domain 150-1 suddenly operates playback device 110-2 in subscriber domain 150-1 to retrieve content while playback device 110-1 is operated to retrieve requested content. In such an instance, constantly updated feedback 156 indicates that the playback device 110-2 now operates to retrieve content.

Figure 18:
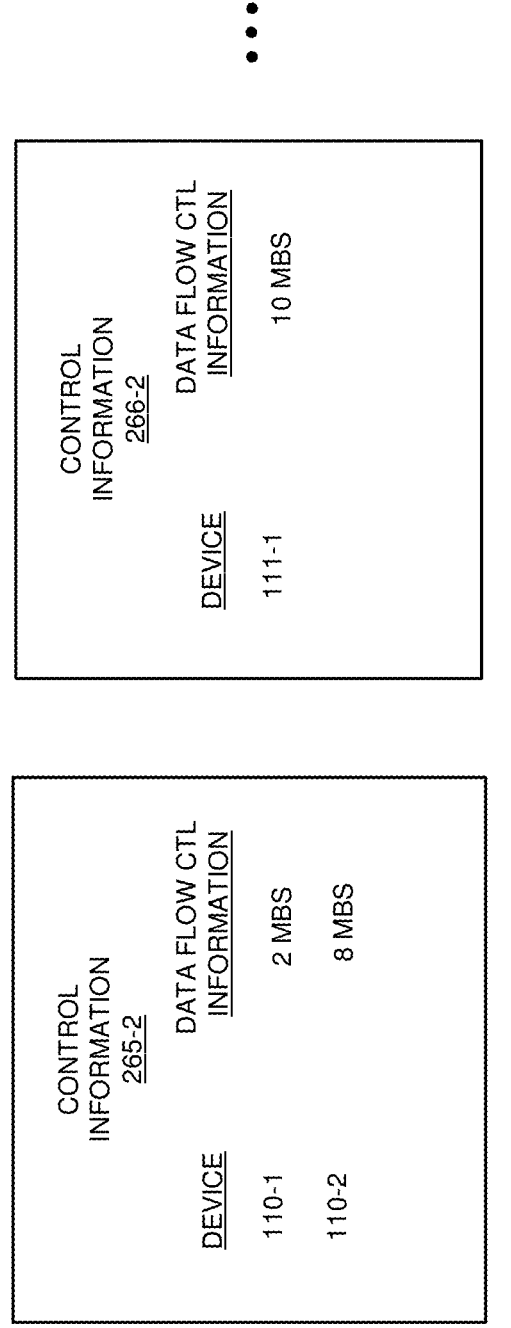
FIG. 18 is an example diagram illustrating generated of control information for subscribers in a cable network environment according to embodiments herein.

In response to detecting additional streaming of content by playback device 110-2, the control information generator 1620 generates the control information 165 as shown in FIG. 18

Referring now to FIG. 18, as previously discussed, subscriber domain 150-1 can be limited to use of a maximum of 10 MBS of available bandwidth allocated to support retrieval of content in accordance with a protocol such as IPTV. In such an instance, as previously discussed, each of the playback devices 110-1 and 110-2 may now compete for use of the limited bandwidth available to the subscriber domain 150-1.

To promote fairness and optimization of allocated bandwidth, the control information generator 1620 generates appropriate data flow control settings for each playback device depending on newly received feedback 156. For example, the feedback 156 can indicate information such as that the playback device 110-1 is an iPod™ having a relatively small display screen compared to playback device 110-2 having large display screen (of potentially much higher resolution).

In such an instance, based on newly received feedback 156, the control information generator 1620 generates control information specifying a reallocation of a portion of available 10 MBS bandwidth to the first playback device 110-1 and a portion of available 10 MBS bandwidth to the second playback device 110-2.

More specifically, because the playback device 110-1 has a small display screen in this example, the control information generator 1620 allocates 2 MBS bandwidth to playback device 110-1. Because the playback device 110-2 has a large display screen with more pixels, the control information generator 1620 allocates 8 MBS bandwidth to playback device 110-2.

As another example, the feedback 156 can indicate that a user of the playback device 110-1 requests to retrieve and play back a first type of content such as a newscast (requiring low bandwidth for streaming respective data). The feedback 156 can indicate that a user of the playback device 110-2 requests to retrieve and play back a second type of content such as a sports event. The sports event may capture many scene changes and require a higher bandwidth. In such an instance, to accommodate both users in subscriber domain 150-1, based on detected content type, the control information generator 1620 can be configured to generate data flow control settings allocating a much higher amount (such as 8 MBS) of the available 10 MBS to the media player application in playback device 110-2 and allocating a lower amount (2 MBS) of the available 10 MBS to the playback device 110-1. Accordingly, embodiments herein include producing the control information based at least in part on types of content consumed by the playback device devices.

Thus, within a respective subscriber domain, embodiments herein include providing a better aggregate experience amongst the user. For example, embodiments herein include producing control information indicating rates at which different respective playback devices in a subscriber domain are able to retrieve content over a shared communication link based on the type of streaming content.

In one embodiment, as mentioned, the notification resource 141 transmits the data flow control settings to each of the playback devices 110-1 and 110-2. By way of a non-limiting example, the control information 265-2 includes data flow control rate settings specifying a first maximum rate (such as 2 MBS) at which the first playback device 110-1 is assigned to retrieve adaptive bit rate encoded content transmitted over an allocated portion of the shared communication link 191. The control information 265-2 includes data flow control rate settings specifying a second maximum rate (such as 8 MBS) at which the second playback device 110-2 is assigned to retrieve adaptive bit rate encoded content transmitted over an allocated portion of the shared communication link 191.

Accordingly, the control information generator 1620 can receive feedback 156 indicating attributes of the playback devices 110 and assign the data flow control rates to the playback devices based on a type associated with each playback device. In a manner as previously discussed, each of the playback devices 110 can be configured to receive respective data flow control settings and limit retrieval of content in accordance with such settings. That is, in this example embodiment, a media player application in the playback device 110-1 limits retrieval of first streaming content over shared communication link 191 to less than 2 MBS. A media player application in the playback device 110-2 limits retrieval of second streaming content over shared communication link 191 to less than 8 MBS.

In this manner, the control information generator 1620 can be configured to specify maximum rates at which each of the playback devices in different subscriber domains 150 of the cable network environment 100 are able to retrieve adaptive bit rate encoded content transmitted over the shared communication link 191.

In accordance with yet further embodiments, certain identified members in the subscriber domain 150-1 can be allowed to retrieve data at a higher respective level of quality and/or higher bit rate than other members. For example, status information 163 can include user setting information indicating different levels of delivery service within a respective subscriber domain. A parent user in the subscriber domain 150-1 can be assigned a higher bit rate for retrieving content than a respective child operating a playback device.

As previously discussed, embodiments herein can include detecting an identity of a respective user operating a playback device and allocating a bit rate for retrieving or transmitting content based on identity of the user.

Detecting an identity of a user operating a respective playback device can be achieved in any suitable manner. In one embodiment, a user operating a respective playback device provides respective user information at login of first using the playback device. For example, embodiments herein can require users in a respective subscriber domain to login and provide identity information (such as password and/or username) when using a respective playback device to retrieve and playback content.

Based on the identity information, the users in the subscriber domain 150-1 can be allocated different amounts of available bandwidth over a respective communication link. In this example embodiment, via status information 163, assume that the control information generator 1620 detects that playback device 110-2 is operated by a first user (such as a parent) in subscriber domain 150-1. Assume that the control information generator 1620 detects that a second user operates a playback device 110-1 in the subscriber domain 150-1. The second user may be a child of the parent.

Based on different delivery service levels assigned to the users as indicated by status information 163, the control information generator 1620 generates respective control information to allocate a substantially higher portion of available bandwidth on the shared communication link 191-1 for use by the playback device 110-2 (operated by the parent) than an amount of available bandwidth allocated for use by the playback device 110-1 (operated by the child).

Based on received identity information indicating which user operates each playback device, assume in this example embodiment that the control information generator 1620 allocates 8 megabits per second (of available 10 megabits per second bandwidth) to the playback device 110-2 operated by the parent and that the control information generator 1620 allocates 2 megabits per second of the available bandwidth (10 megabits per second) to communication device 110-1. Accordingly, embodiments herein include providing fair use of bandwidth amongst members in a subscriber domain based on a level of delivery service assigned to the users in the subscriber domain 150.

Note that identities of users can be determined based on device information such as unique network addresses assigned to the different devices operating in the subscriber domain. For example, the playback device 110-1 can be assigned a first network address (i.e., first unique identifier value); playback device 110-2 can be assigned a second network address (i.e., second unique identifier value); and so on. The feedback 156 can include playback device information such as the network address of the device requesting the content. If it is known that the parent always operates the playback device 110-2 and the child always operates the playback device 110-1, then the network address assigned to the respective playback device can be used as a basis of determining the bit rate that is to be allocated to the playback device to retrieve or transmit content.

Note that the different ways of controlling rates of delivering content to different members in a respective subscriber domain are beneficial over conventional techniques. For example, each subscriber domain in network environment 100 can be allocated a substantially fixed amount of bandwidth to receive and/or transmit content over network 190-2 and network 190-3. As mentioned, multiple users in subscriber domain 150-1 operate different communication devices 110 and may compete amongst each other to retrieve available content. Controlling content flow rates to the different users (based on user identity, device type, type of streamed content, etc.) provides a better aggregate experience to the users in a respective subscriber domain because bandwidth is not needlessly wasted in streaming situations where extra consumption of bandwidth by a user is not needed or desired.

More specifically, in accordance with the examples as discussed above: a younger viewer operating a respective communication device to play back content may not notice a degradation in a level of quality of content delivery at a lower bit rate, the extra bandwidth can be allocated to an older viewer; certain content may not warrant a high data rate because the content may include slow changing scenes requiring only a low bit rate; a communication device may have a small display screen that does not require high bandwidth rates, the extra bandwidth can be allocated to a different user; different users can be assigned different levels of delivery service within a respective subscriber domain depending on identity of viewers; and so on.

Figure 19:
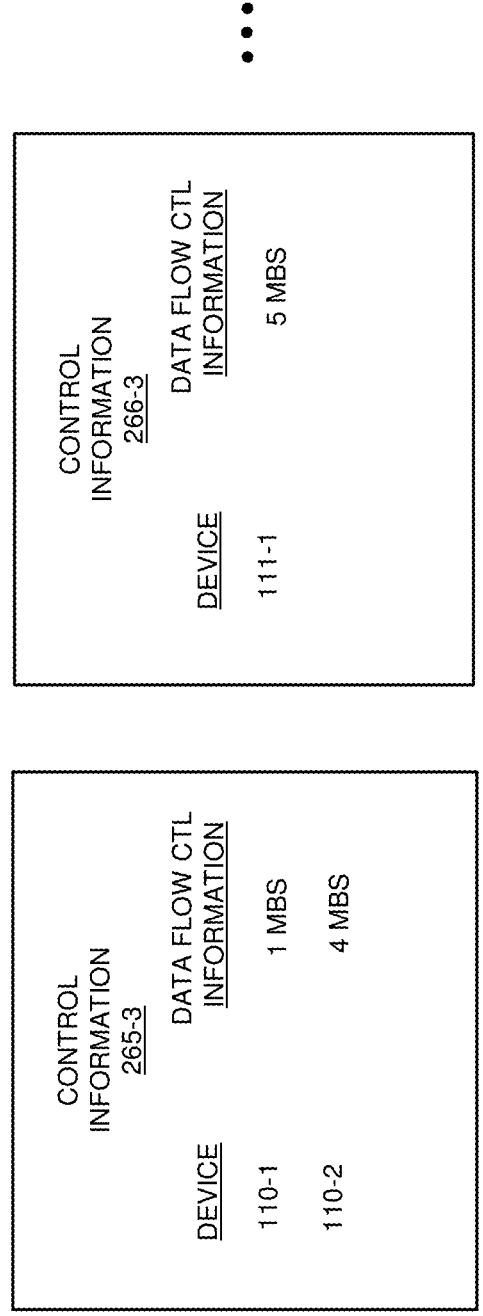
FIG. 19 is an example diagram illustrating generated control information for subscribers in a cable network environment according to embodiments herein.

FIG. 19 is an example diagram illustrating control information for one or more subscribers in a cable network environment according to embodiments herein.

As previously discussed, a predetermined amount of bandwidth may be available to deliver adaptive bit rate content to subscriber domains. In certain instances, a substantially high number of users may attempt to use the allocated bandwidth, resulting in congestion and the need to limit each subscriber domain to use of less than 10 MBS.

Assume in this example that feedback 156 indicates that a substantially high number of users in subscriber domains 150 request retrieval of content. In response to the high use of allocated bandwidth, the control information generator reduces the data flow control settings at the subscriber domain level by 50%. That is, the control information generator 1620 reduces total bandwidth to subscriber domain 150-1 to 5 megabits per second as opposed to 10 megabits per second; control information generator 1620 reduces total bandwidth to subscriber domain 150-2 to 5 megabits per second as opposed to 10 megabits per second. In this instance, control information generator 1620 reduces data flow control settings for playback device 110-1 to 1 MBS; the control information generator 1620 reduces data flow control settings for playback device 110-2 to 4 MBS; the control information generator 1620 reduces data flow control settings for playback device 110-1 to 5 MBS; and so on.

Accordingly, each of the subscriber domains and respective playback devices can receive a reduced portion of bandwidth to retrieve content. The control information generator 1620 apportions the available bandwidth amongst users in the respective subscriber domain.

Figure 20:
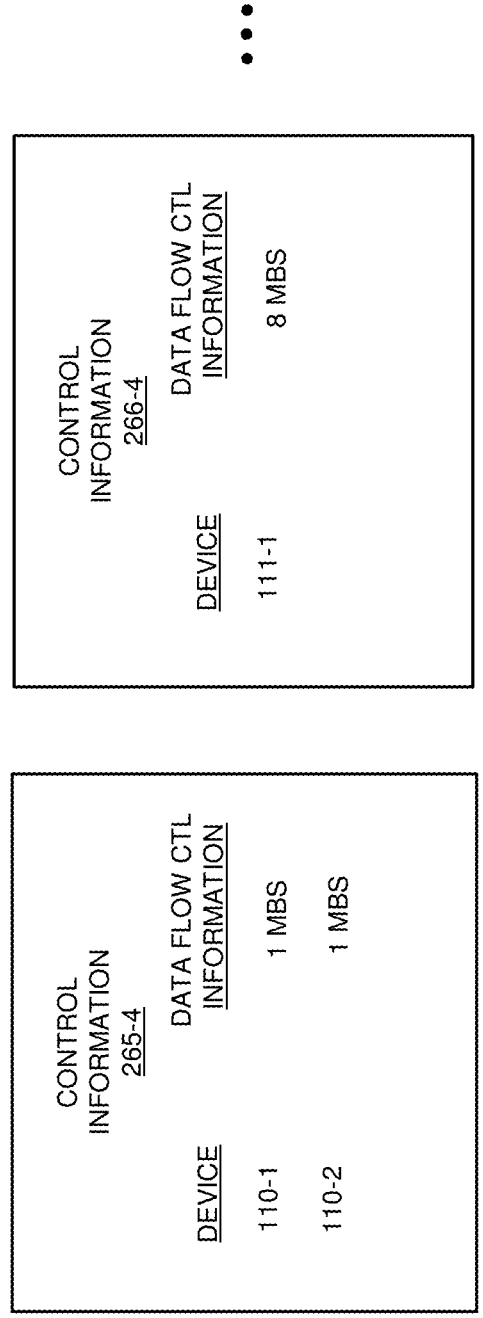
FIG. 20 is an example diagram illustrating generated control information for subscribers in a cable network environment according to embodiments herein.

FIG. 20 is an example diagram illustrating control information for one or more subscribers in a cable network environment according to embodiments herein.

In order to further optimize use of the available allocated bandwidth, the control information generator 1620 can be configured to reduce bandwidth allocated to each of the playback devices across subscriber domains to promote further fairness and optimization in network environment 100.

For example, assume that there is insufficient bandwidth to allow each subscriber domain to be allocated 10 MBS. Assume further that feedback 156 indicates that: i) playback device 110-1 currently plays back a newscast requiring relatively low bandwidth; ii) playback device 110-2 currently plays back a cartoon requiring relatively low bandwidth; iii) playback device 110-3 currently plays back a sports event content requiring relatively high bandwidth.

To accommodate each of the users, as well as promote fairness and optimization in real-time or substantially real-time, the control information generator 1620 generates respective control information 265-4 indicating allocation of 1 MBS to playback device 110-1; allocation of 1 MBS to playback device 110-2. Control information generator 1620 generates respective control information 266-4 indicating allocation of 8 MBS to playback device 111-1. Thus, the bandwidth saved by reducing bandwidth allocated to the playback devices 110-1 and 110-2 in subscriber domain 150-1 and allocating more bandwidth for use by playback device 111-1 in subscriber domain 150-2.

Thus, smart decisions can be made to apportion use of bandwidth amongst subscriber domains.

Figure 21:
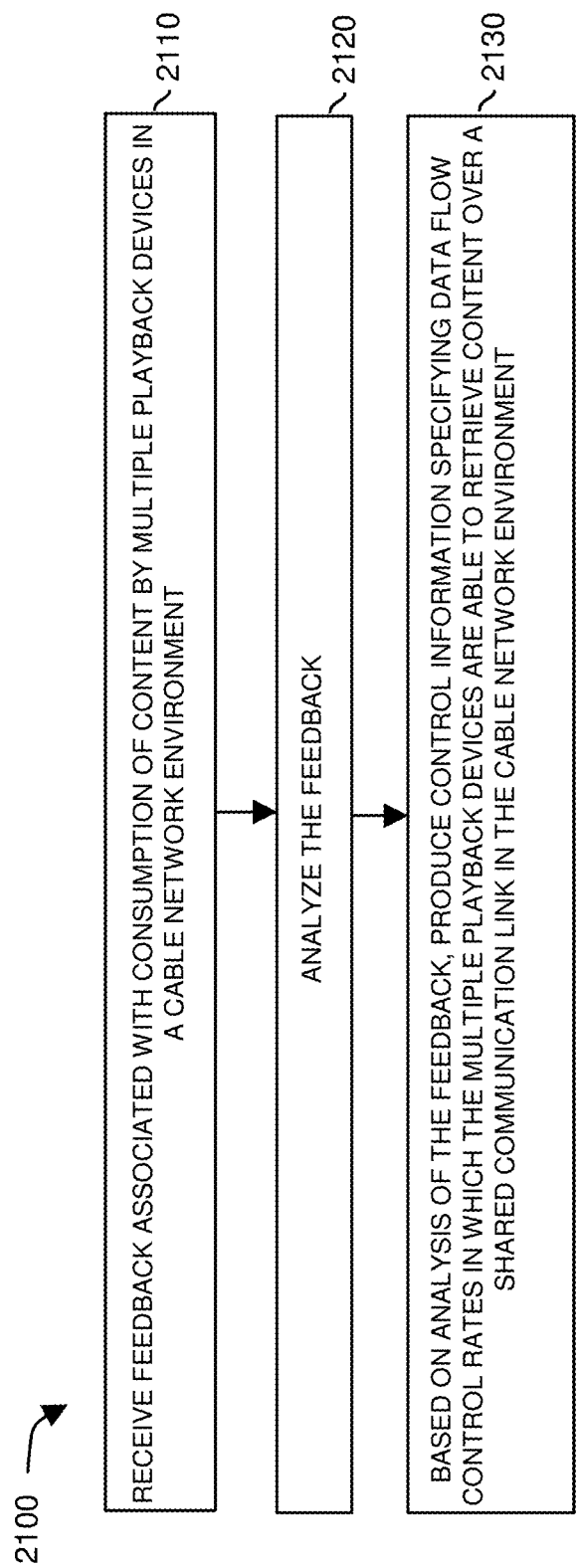
FIG. 21 is an example diagram illustrating a method of receiving feedback and generating control information according to embodiments herein.

FIG. 21 is an example diagram illustrating a method of controlling data flow control settings according to embodiments herein.

In processing block 2110, the data analyzer engine 140 receives feedback 156 associated with consumption of content by subscriber domains 150 and/or multiple playback devices 110, 111, etc., in a cable network environment 100.

In processing block 2120, the data analyzer engine 140 analyzes the feedback 156.

In processing block 2130, based on analysis of the feedback 156, the data analyzer engine 140 produces control information 165 specifying data flow control rates in which the multiple playback devices 110, 111, etc., are able to retrieve content over a shared communication link 191 in the cable network environment 100.

Figure 22:
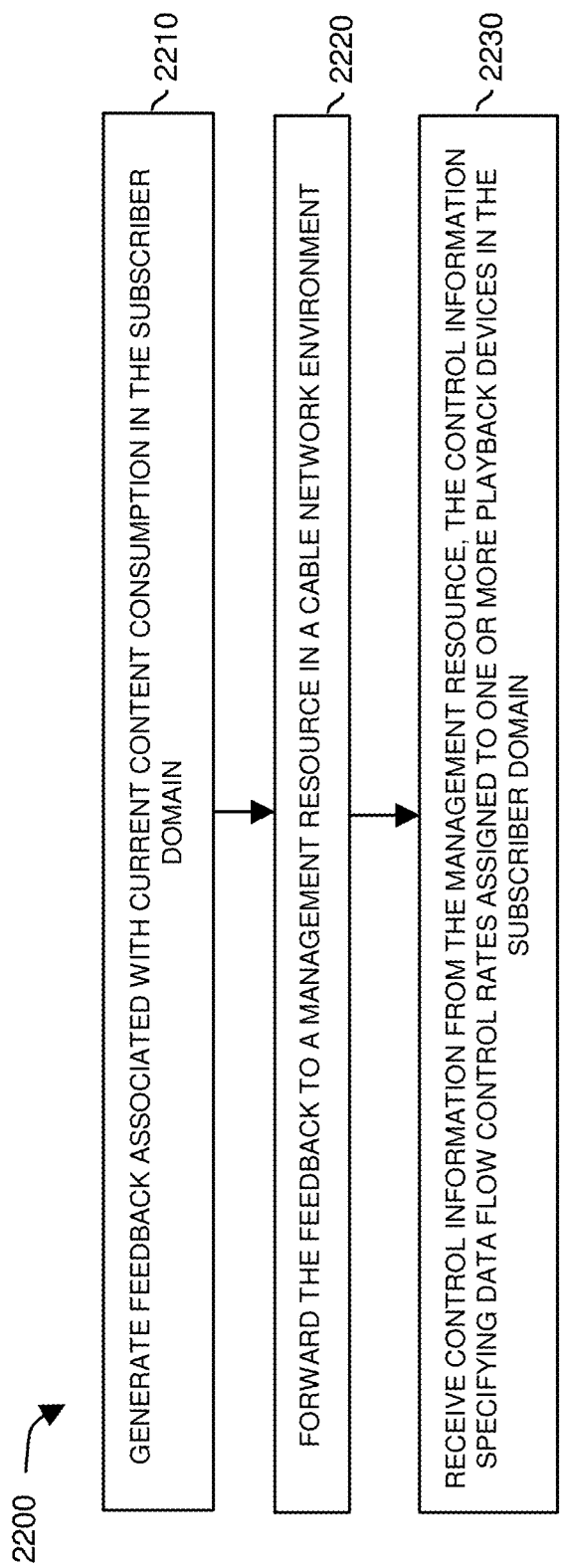
FIG. 22 is an example diagram illustrating a method of receiving feedback and generating control information according to embodiments herein.

FIG. 22 is an example diagram illustrating a method of controlling data flow control settings according to embodiments herein.

In processing block 2210, a hardware resource (such as resource 117-1, playback device 110-2, playback device 110-2, etc.) generates feedback 156 associated with current content consumption in the subscriber domain 150-1.

In processing block 2220, the hardware resource forwards the feedback 156 to a management resource (such an embodiment data analyzer engine 140) in network environment 100.

In processing block 2230, the hardware resource receives control information 165 from the management resource. The control information 165 specifies data flow control rates assigned to one or more playback devices in the subscriber domain 150-1.

Note again that techniques herein are well suited for analyzing content consumption information, providing notification of popular content, and generating control information. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via computer processor hardware, executing operations of:
        receiving content ranking information indicating popularity rankings of different content currently consumed by subscribers in a network environment, the content ranking information indicating an identity of currently popular content amongst the different content;
        selecting, based on a popularity ranking of the currently popular content as indicated by the content ranking information, the identity of the currently popular content for inclusion in a content guide;
        producing the content guide to include identities of multiple selectable channels from which the different content is available over a shared communication link in the network environment, the content guide including a selectable supplemental channel viewing option in addition to the identities of the multiple selectable channels, the selectable supplemental channel viewing option indicating an identity of a particular selectable channel of the multiple selectable channels that currently transmits a rendition of the currently popular content as specified by the content ranking information; and
        initiating display of the content guide on a display screen;
    wherein the particular selectable channel is a first selectable channel of the multiple selectable channels, the method further comprising:
        populating the selectable supplemental channel viewing option to indicate that the first selectable channel supplies first most popular ranked content as indicated by ranking information during a first time slot; and
        populating the selectable supplemental channel viewing option to indicate that a second channel of the multiple selectable channels supplies second most popular ranked content as indicated by the ranking information during the first time slot.

2. The method as in claim 1, wherein the selectable supplemental channel viewing option represents an independent channel with respect to the multiple selectable channels in the content guide, the independent channel allocated to transmit a copy of the currently popular content, the currently popular content being most popularly consumed content amongst the multiple selectable channels, the method further comprising:
    in response to detecting the most popularly consumed content, transmitting the copy of the most popularly consumed content over the independent channel.

3. The method as in claim 1 further comprising:
    in response to receiving selection of the selectable supplemental channel viewing option from the content guide, tuning to the particular selectable channel to playback the rendition of the currently popular content on the display screen.

4. The method as in claim 1 further comprising:
    receiving selection of a genre amongst multiple genres; and
    in response to receiving selection of the selectable supplemental channel viewing option from the content guide, displaying identities of most popularly ranked content for the selected genre.

5. The method as in claim 1, wherein the display screen is disparately located with respect to a primary display screen controlled by a respective subscriber to view content selected for viewing from the content guide; and
    wherein the primary display screen is part of a remote controller device used to select content for viewing and playback of content on the primary display screen.

6. The method as in claim 1, wherein the different content includes different streams of broadcasted content consumed by the subscribers, the method further comprising:
    receiving feedback indicating the different streams of broadcasted content currently consumed by the subscribers in the network environment; and
    analyzing the feedback in substantially real-time to produce the content ranking information, the content ranking information indicating popularity rankings of the different streams of broadcasted content.

7. The method as in claim 1 further comprising:
displaying the selectable supplemental channel viewing option in the content guide as an independently selectable channel with respect to the multiple selectable channels.

8. The method as in claim 7 further comprising:
initiating display of the content guide to include time slot information indicating a respective time slot in which the different content is broadcasted over the shared communication link.

9. The method as in claim 8, wherein the content ranking information is derived from content viewing selections by a group of the multiple subscribers viewing the different content in the respective time slot.

10. The method as in claim 1, wherein initiating display of the content guide includes:
statically displaying the selectable supplemental channel viewing option in the content guide at a fixed location on the display screen as a less-than-all portion of the multiple selectable channels displayed on the display screen changes.

11. The method as in claim 1 further comprising:
initiating display of the identity of the particular selectable channel of the multiple selectable channels, the content ranking information indicating that the particular selectable channel supplies most popular viewed content to the subscribers; and
initiating simultaneous display of the identity of the particular selectable channel and the selectable supplemental channel viewing option in the content guide, the selectable supplemental channel viewing option indicating a respective title of the most popular viewed content currently available for viewing over the particular selectable channel.

12. The method as in claim 11 further comprising:
producing the particular selectable channel to indicate availability of the respective title of the most popular viewed content over the particular selectable channel.

13. The method as in claim 1 further comprising:
producing the displayed content guide to include numerical channel identity information, the numerical channel identity information indicating a respective channel number assigned to each of the multiple selectable channels.

14. The method as in claim 1 further comprising:
producing the selectable supplemental channel viewing option to indicate an identity of the particular selectable channel and a respective title of the currently popular content currently supplied over the particular selectable channel.

15. The method as in claim 1 further comprising:
populating the selectable supplemental channel viewing option to indicate that the selectable supplemental channel viewing option supplies currently most popular ranked content as indicated by the ranking information during a first time slot.

16. The method as in claim 1 further comprising:
identifying a class to which a given subscriber is assigned;
utilizing the content ranking information to identify currently most popular content falling in the class assigned to the subscriber; and
populating the selectable supplemental channel viewing option in the content guide to indicate the currently most popular content falling in the class assigned to the given subscriber.

17. The method as in claim 1 further comprising:
populating the selectable supplemental channel viewing option to include identities of multiple selectable channels identified by the content ranking information as broadcasting most popular content in multiple different genres.

18. The method as in claim 1 further comprising:
populating the selectable supplemental channel viewing option to include a ranking of identities of a list of selectable channels identified by the content ranking information as broadcasting popular content in a single genre.

19. The method as in claim 1 further comprising:
producing the displayed content guide to include a first selectable display window to display the selectable supplemental channel viewing option and a second selectable display window to display an identity of the particular selectable channel, the first display window disparately located with respect to the second display window on the display screen.

20. The method as in claim 1, wherein initiating display of the content guide includes:
while statically displaying the selectable supplemental channel viewing option in the content guide in a first display region of the display screen, varying display of a portion of identities of the multiple selectable channels displayed in a second display region on the display screen.

21. The method as in claim 1 further comprising:
displaying the identity of a title of the currently popular content in a display region corresponding to the selectable supplemental channel viewing option, display of the identity of the title of content in the display region indicating that the title is popularly viewed according to the content ranking information.

22. The method as in claim 21, wherein the display region indicates a respective time slot in which the particular selectable channel currently transmits the rendition of the currently popular content as specified by the content ranking information.

23. The method as in claim 22, wherein the respective time slot is a first time slot of multiple time slots; and
wherein the display region includes a second time slot, the second time slot unpopulated with any title of content.

24. The method as in claim 23, wherein the respective time slot displays the identity of the title of the currently popular content.

25. The method as in claim 1 further comprising:
providing a visual indication in the content guide that the selectable supplemental channel viewing option represents a supplemental selectable channel from which to select the currently popular content for playback.

26. The method as in claim 25, wherein initiating display of the content guide includes:
statically displaying the selectable supplemental channel viewing option in the content guide at a fixed location on the display screen as a less-than-all portion of the multiple selectable channels displayed on the display screen dynamically changes based on input from a user.

27. The method as in claim 1, wherein the selectable supplemental channel viewing option represents an independent channel with respect to the multiple selectable channels in the content guide, the independent channel allocated to transmit a copy of the popularly ranked content, the popularly ranked content being most popular consumed content amongst the multiple selectable channels.

28. The method as in claim 27 further comprising:

in response to detecting the most popular consumed content as indicated by the content ranking information, transmitting a copy of the most popular consumed content over the independent channel; and in response to receiving selection of the supplemental channel viewing option from the content guide displayed on the display screen, tuning to the independent channel as specified in the content guide on which the popularly ranked content is available.

29. The method as in claim 1, wherein the supplemental channel viewing option is displayed in the content guide as a separate selectable channel with respect to the particular selectable channel of the multiple selectable channels.

30. The method as in claim 29, wherein both the supplemental channel viewing option and the particular selectable channel in the content guide visually indicate the identity of the currently popular content.

31. The method as in claim 1, wherein the currently popular content is available for retrieval over the shared communication link via both the particular selectable channel and the selectable supplemental channel viewing option, the supplemental channel viewing option and the particular selectable channel simultaneously displayed in the content guide on the display screen.

32. The method as in claim 1, wherein an identity of the particular selectable channel is represented by a symbol; and wherein the content guide displays: i) a first rendition of the symbol in the supplemental channel viewing option, and ii) a second rendition of the symbol in the particular selectable channel.

33. The method as in claim 1, wherein the popular content includes first content and second content, the method further comprising:

in response to receiving selection of the selectable supplemental channel viewing option from the content guide, initiating display of multiple window regions including a first window region and a second window region on the display screen, the first window region displaying playback of a rendition of the first content, the second window region displaying playback of a rendition of the second content.

34. The method as in claim 33 further comprising:

receiving the first content over a first channel of the multiple selectable channels identified in the content guide; and receiving the second content over a second channel of the multiple selectable channels identified in the content guide.

35. A computer system comprising:

computer processor hardware; and a hardware storage resource, the computer processor hardware coupled to communicate with the hardware storage resource, the hardware storage resource storing instructions that, when executed by the computer processor hardware, cause the computer processor hardware to:

receive content ranking information indicating popularity rankings of different content currently consumed by subscribers in a network environment, the content ranking information indicating an identity of currently popular content amongst the different content;

select, based on a ranking of the currently popular content as indicated by the content ranking information, the identity of the currently popular content for inclusion in a content guide produce the content guide to include identities of multiple selectable channels from which the different content is available over a shared communication link in the network environment, the content guide including a selectable supplemental channel viewing option in addition to the identities of the multiple selectable channels, the selectable supplemental channel viewing option indicating an identity of a particular selectable channel of the multiple selectable channels that currently transmits a rendition of the currently popular content as specified by the content ranking information; and initiate display of the content guide on a display screen;

wherein the popular content includes first content and second content available for retrieval in the network environment, the computer processor hardware further operable to: in response to receiving selection of the selectable supplemental channel viewing option from the content guide, initiate display of multiple window regions including a first window region and a second window region on the display screen, the first window region displaying playback of a rendition of the first content, the second window region displaying playback of a rendition of the second content;

wherein the first content is received over a first channel of the multiple selectable channels identified in the content guide;

wherein the second content is received over a second channel of the multiple selectable channels identified in the content guide;

wherein the second window region plays back the rendition of the second content at a first resolution, the computer processor hardware further operable to:

in response to receiving selection of the second window region: i) tune to the second channel to receive the second content; and ii) initiate display of a substantially full screen playback rendition of the second content on the display screen, the substantially full screen rendition of the second content being displayed in accordance with a second resolution, the second resolution substantially greater than the first resolution.

36. The computer system as in claim 35, wherein the selectable supplemental channel viewing option represents an independent channel with respect to the multiple selectable channels in the content guide, the independent channel allocated to transmit a copy of most popular consumed content amongst the multiple selectable channels as specified by the content ranking information, the computer processor hardware further operable to:

in response to detecting the most popular consumed content, transmit the copy of the most popular consumed content over the independent channel.

37. The computer system as in claim 35, wherein the computer processor hardware is further operable to:

in response to receiving selection of the selectable supplemental channel viewing option from the content guide, tune to a corresponding channel as specified in the content guide on which the popular content is available.

38. The computer system as in claim 35, wherein the popular content includes first content and second content available for retrieval in the network environment, the computer processor hardware further operable to:
  in response to receiving selection of the selectable supplemental channel viewing option from the content guide:
    initiate display of a first symbol on the display screen, the first symbol representing the first content, the first symbol indicating that the first content is amongst the popular content; and
    initiate display of a second symbol on the display screen, the second symbol representing the second content, the second symbol indicating that the second content is amongst the popular content.

39. The computer system as in claim 35, wherein the display screen is disparately located with respect to a primary display screen controlled by a respective subscriber to view content selected for viewing from the content guide.

40. A method comprising: via computer processor hardware, executing operations of:
  receiving content ranking information indicating popularity rankings of different content currently consumed by subscribers in a network environment, the content ranking information indicating an identity of currently popular content amongst the different content;
  selecting, based on a popularity ranking of the currently popular content as indicated by the content ranking information, the identity of the currently popular content for inclusion in a content guide;
  producing the content guide to include identities of multiple selectable channels from which the different content is available over a shared communication link in the network environment, the content guide including a selectable supplemental channel viewing option in addition to the identities of the multiple selectable channels, the selectable supplemental channel viewing option indicating an identity of a particular selectable channel of the multiple selectable channels that currently transmits a rendition of the currently popular content as specified by the content ranking information; and
  initiating display of the content guide on a display screen;
  wherein the popular content includes first content and second content, the method further comprising: in response to receiving selection of the selectable supplemental channel viewing option from the content guide, initiating display of multiple window regions including a first window region and a second window region on the display screen, the first window region displaying playback of a rendition of the first content, the second window region displaying playback of a rendition of the second content;
the method further comprising:
receiving the first content over a first channel of the multiple selectable channels identified in the content guide; and
receiving the second content over a second channel of the multiple selectable channels identified in the content guide;
wherein the second window region plays back the rendition of the second content at a first resolution, the method further comprising:
in response to receiving selection of the second window region:
  initiate display of a substantially full screen playback rendition of the second content on the display screen, the substantially full screen playback rendition of the second content being displayed in accordance with a second resolution, the second resolution substantially greater than the first resolution.

* * * * *